(12) United States Patent
Herken

(10) Patent No.: US 11,651,401 B2
(45) Date of Patent: May 16, 2023

(54) TRANSACTIONAL PLATFORM

(71) Applicant: MINE ZERO GmbH, Berlin (DE)

(72) Inventor: Rolf Herken, San Francisco, CA (US)

(73) Assignee: MINE ZERO GMBH, Berlin (DE)

( * ) Notice: Subject to any disclaimer, the term of this patent is extended or adjusted under 35 U.S.C. 154(b) by 273 days.

(21) Appl. No.: 17/149,572

(22) Filed: Jan. 14, 2021

(65) Prior Publication Data

US 2021/0279780 A1  Sep. 9, 2021

Related U.S. Application Data

(63) Continuation of application No. 15/557,229, filed as application No. PCT/US2016/022232 on Mar. 12, 2016, now abandoned.

(Continued)

(51) Int. Cl.

| | |
|---|---|
| G06Q 30/06 | (2023.01) |
| G06Q 10/10 | (2023.01) |
| G06Q 20/12 | (2012.01) |
| G06Q 30/02 | (2023.01) |
| G06Q 50/00 | (2012.01) |
| H04L 51/04 | (2022.01) |
| G06Q 30/0601 | (2023.01) |
| G06Q 10/107 | (2023.01) |
| G06Q 10/109 | (2023.01) |
| G06Q 30/0201 | (2023.01) |

(Continued)

(52) U.S. Cl.
CPC ......... *G06Q 30/0601* (2013.01); *G06Q 10/10* (2013.01); *G06Q 10/107* (2013.01); *G06Q 10/109* (2013.01); *G06Q 20/12* (2013.01); *G06Q 30/0206* (2013.01); *G06Q 30/0213* (2013.01); *H04L 63/0428* (2013.01); *H04L 65/1069* (2013.01); *G06Q 50/01* (2013.01); *H04L 51/04* (2013.01)

(58) Field of Classification Search
CPC .... G06Q 10/10; G06Q 10/107; G06Q 10/109; G06Q 20/12; G06Q 20/32; G06Q 20/384; G06Q 30/0206; G06Q 30/0213; G06Q 30/06–0645; G06Q 30/08; G06Q 50/01; H04L 51/04; H04L 63/0428; H04L 65/1069

See application file for complete search history.

(56) References Cited

U.S. PATENT DOCUMENTS

| | | |
|---|---|---|
| 2002/0116348 A1 | 8/2002 | Phillips |
| 2004/0030627 A1 | 2/2004 | Sedukhin |

(Continued)

FOREIGN PATENT DOCUMENTS

| | | |
|---|---|---|
| WO | WO2007/044500 | 4/2007 |

OTHER PUBLICATIONS

M. Sirbu and J. D. Tygar, "NetBill: an Internet commerce system optimized for network-delivered services," in IEEE Personal Communications, vol. 2, No. 4, pp. 34-39, Aug. 1995, doi: 10.1109/98.403456. (Year: 1995).*

*Primary Examiner* — Adam L Levine
(74) *Attorney, Agent, or Firm* — Jacobs & Kim LLP; David Jacobs

(57) ABSTRACT

The present invention provides, among other aspects, methods, systems, devices and software products (computer program products) for creating and maintaining a transactional platform and network for offering, providing, selling and purchasing services, content and time.

13 Claims, 37 Drawing Sheets

Related U.S. Application Data

(60) Provisional application No. 62/132,489, filed on Mar. 12, 2015.

(51) Int. Cl.
 *G06Q 30/0207* (2023.01)
 *H04L 9/40* (2022.01)
 *H04L 65/1069* (2022.01)

(56) References Cited

U.S. PATENT DOCUMENTS

| | | |
|---|---|---|
| 2006/0212350 A1 | 9/2006 | Ellis |
| 2007/0067297 A1 | 3/2007 | Kublickis |
| 2007/0226340 A1 | 9/2007 | Hastings |
| 2008/0147741 A1* | 6/2008 | Gonen .................. G06Q 10/10 |
| 2009/0037309 A1* | 2/2009 | Altberg .................. G06Q 30/00 |
| | | 705/35 |
| 2009/0115837 A1 | 5/2009 | Moshrefi |
| 2009/0235069 A1 | 9/2009 | Sonnega |
| 2010/0114739 A1 | 5/2010 | Johnston |
| 2011/0099112 A1 | 4/2011 | Mages |
| 2011/0196776 A1 | 8/2011 | Rash |
| 2012/0109772 A1 | 5/2012 | Chernenko |
| 2012/0303460 A1 | 11/2012 | Smth |
| 2013/0039543 A1 | 2/2013 | Fuhr |
| 2013/0054471 A1 | 2/2013 | Samid |
| 2013/0211944 A1* | 8/2013 | Momin .................. G06Q 30/06 |
| | | 705/26.2 |
| 2014/0006518 A1 | 1/2014 | Sinkov |
| 2014/0019173 A1 | 1/2014 | Spindler |
| 2014/0058849 A1 | 2/2014 | Saifee et al. |
| 2014/0108283 A1* | 4/2014 | Agrawal .......... G06Q 10/06398 |
| | | 705/321 |
| 2014/0164184 A1 | 6/2014 | Akolkar et al. |
| 2014/0164187 A1* | 6/2014 | Dietz ................ G06Q 30/0625 |
| | | 705/26.62 |
| 2014/0279352 A1* | 9/2014 | Schaefer ................ G06Q 40/04 |
| | | 705/37 |
| 2015/0052009 A1 | 2/2015 | Ketchel |
| 2015/0058171 A1 | 2/2015 | Sandhu |
| 2015/0356663 A1 | 12/2015 | Ketchel et al. |
| 2016/0267475 A1 | 9/2016 | Xu et al. |

\* cited by examiner

400

401. ENABLE SUPERVISION OF THE PROVIDER'S PROVIDING OF TIME OR SERVICES TO THE CONSUMER, BY ANY ONE OR MORE OF THE FOLLOWING:

CAUSE THE PROVIDING OF A DISPLAY, ON A DISPLAY SCREEN, OF A REPRESENTATION OF SERVICES OR TIME BEING PROVIDED BY THE PROVIDER TO THE CONSUMER

PROVIDE A VIDEO CAMERA ELEMENT AND ENABLE VIDEO MONITORING OF THE PROVIDER IN PROVIDING SERVICES OR TIME TO THE CONSUMER

RECORD AND VERIFY ON-LINE/OFF-LINE OR START/STOP TIMES OF THE PROVIDER IN PROVIDING SERVICES OR TIME IN AN OFFLINE MANNER TO THE CONSUMER

501. EXECUTE STORED INSTRUCTIONS TO CAUSE A PROCESSING ELEMENT (IN THE SERVER OR IN ANOTHER COMPUTING DEVICE) TO UTILIZE A METRIC OF DEMAND FOR A GIVEN PROVIDER'S TIME, SERVICES OR CONTENT TO MODIFY A SPECIFIED MAXIMUM PRICE OF THE PROVIDER'S TIME, SERVICES OR CONTENT, INCLUDING ANY ONE OR MORE OF THE FOLLOWING:

USE A SELECTED METRIC OF DEMAND FOR THE PROVIDER'S TIME, SERVICES OR CONTENT ("SUCCESS") TO MODIFY A SPECIFIED MAXIMUM PRICE OF THE PROVIDER'S TIME, SERVICES OR CONTENT, WHEREIN "SUCCESS" IS A METRIC COMPRISING THE PRODUCT OF PRODUCTIVITY MULTIPLIED BY WORKLOAD, WHEREIN PRODUCTIVITY IS A RATIO OF ACTUAL PRICE TO MAXIMUM PRICE, MULTIPLIED BY A RATIO OF QUANTITY SOLD TO QUANTITY OFFERED, WHEREIN QUANTITY IS A QUANTITY OF TIME

USE A SPECIFIED SUCCESS THRESHOLD; POSITIVE MODIFICATION OF THE SPECIFIED MAXIMUM PRICE OCCURS AFTER MEASURED SUCCESS EXCEEDS THE SUCCESS THRESHOLD FOR A TIME PERIOD OF AT LEAST A SPECIFIED OBSERVATION PERIOD

USE A SPECIFIED SUCCESS THRESHOLD; NEGATIVE MODIFICATION OF THE SPECIFIED MAXIMUM PRICE OCCURS AFTER MEASURED SUCCESS IS LESS THAN A SPECIFIED NEGATIVE TRIGGERING THRESHOLD FOR A TIME PERIOD OF AT LEAST A SPECIFIED OBSERVATION PERIOD, WHEREIN THE NEGATIVE TRIGGERING THRESHOLD IS A FUNCTION OF THE SUCCESS THRESHOLD AND THE SPECIFIED MAXIMUM PRICE

AS "SUCCESS" INCREASES, INCREASE THE CALCULATED MAXIMUM PRICE

*FIG. 20*

601: EXECUTE, IN A PROCESSING ELEMENT (E.G., IN THE SERVER OR ANOTHER COMPUTING DEVICE), STORED PROGRAM INSTRUCTIONS, TO EXECUTE THE FOLLOWING:

ENABLE A USER TO CREATE AND MAINTAIN A FICTIONAL IDENTITY (PERSONA) FOR USE ON THE SYSTEM (SERVER AND COMPUTING DEVICES IN COMMUNICATION WITH THE SERVER VIA A COMMUNICATIONS NETWORK TO EXECUTE A METHOD ACCORDING TO THE INVENTION

WHEREIN USER-TO-USER AND PROVIDER/CONSUMER INTERACTION ON THE SYSTEM IS IMPLEMENTED THROUGH PERSONAS, AND WHEREIN THE PERSONAS COMPRISE PROVIDER PERSONAS AND CONSUMER PERSONAS

ENABLE A USER TO ELECT TO HAVE THE PERSONA BE ANONYMOUS, IN THAT THE PERSONA DOES NOT REVEAL OR INDICATE THE USER'S REAL-WORLD IDENTITY

ENABLE A USER TO ELECT TO HAVE THE PERSONA BE VISIBLE TO (I) NO OTHER USERS OF THE SYSTEM, (II) A SELECTED SET OF OTHER USERS OF THE SYSTEM, OR (III) ALL OTHER USERS OF THE SYSTEM

ENABLE A USER TO CREATE AND MAINTAIN MULTIPLE PERSONAS FOR USE ON THE SYSTEM

ENABLE MULTIPLE PERSONAS TO HAVE SELECTABLE LEVELS OF ANONYMITY AND VISIBILITY TO OTHER USERS, AND BE ASSOCIATED WITH PROVIDING OR PURCHASING OF DIFFERENT SERVICES OR CONTENT

ENABLE CONSUMERS OF SERVICES, CONTENT OR TIME VIA THE SYSTEM TO REMAIN ANONYMOUS TO PROVIDERS IN THE SYSTEM; AND WHEREIN PROVIDERS IN THE SYSTEM MAY OPT TO BE ANONYMOUS TO CONSUMERS OF THEIR SERVICES, CONTENT OR TIME VIA THE SYSTEM

*FIG. 21*

(CONT'D FROM FIG. 24A)

900b

907. ENABLE SERVER OR SYSTEM TO INCREASE OR DECREASE THE EASE OR DIFFICULTY OF EARNING A HIGHER PRICE LEVEL, TO MAINTAIN A SELECTED TARGET DISTRIBUTION OF PRICE LEVELS OF PROVIDER PERSONAS WITHIN THE SYSTEM)

908. ENABLE SERVER OR SYSTEM TO ESTABLISH AN INITIAL FEE ANNOUNCED TO BE CHARGED BY A PROVIDER PERSONA, VIA THE SYSTEM, AND PUBLISH THAT PROVIDER PERSONA'S INITIAL PRICE LEVEL WITHIN THE SYSTEM. (ADJACENT PRICE LEVELS DEFINE A PRICE RANGE OF A GIVEN PRICE LEVEL, WHICH IS BOUNDED BY THE MAXIMUM RATE OF THE GIVEN PRICE LEVEL AND THE MAXIMUM RATE OF THE PRICE LEVEL BELOW THE GIVEN PRICE LEVEL.)

909. ENABLE SERVER OR SYSTEM TO EXECUTE THE FOLLOWING:

[A] THE SERVER OR SYSTEM PUBLISHES PRICE INFORMATION FOR PROVIDER PERSONAS;
[B] SERVER ENABLES NEW PROVIDER PERSONA TO SELECT, VIA THE SYSTEM, HIS INITIAL PRICE LEVEL AND AN INITIAL PUBLISHED PRICE WITHIN THE PRICE RANGE CORRESPONDING TO THE SELECTED INITIAL PRICE LEVEL;
[C] THE SERVER DESIGNATES THE NEW PROVIDER PERSONA'S SELECTED INITIAL PRICE LEVEL, ASSOCIATED MAXIMUM RATE AND INITIAL PUBLISHED PRICE AS "TENTATIVE";
[D] THE SERVER, AFTER SELECTED OBSERVATION AND ADJUSTMENT, DESIGNATES THE PROVIDER PERSONA'S MAXIMUM RATE AS "ESTABLISHED" AT A PRICE LEVEL WHERE THE PROVIDER PERSONA'S OBSERVED SUCCESS IS AT OR ABOVE A SYSTEM-SELECTED MINIMUM VALUE; AND
[E] THEREAFTER, THE SERVER PUBLISHES THE ESTABLISHED MAXIMUM RATE FOR THE PROVIDER PERSONA, AND SUBSEQUENTLY THAT RATE CAN ONLY BE CHANGED BY THE SERVER OR SYSTEM

910. ENABLE SERVER OR SYSTEM TO DEFINE CATEGORIES OF PROVIDER PERSONAS, AND WHEREIN A PROVIDER PERSONA CAN CHARGE, VIA THE SYSTEM, AN INITIAL FEE THAT CORRESPONDS TO A DEFINED BASE LEVEL DEFINED BY THE SYSTEM FOR PROVIDERS OF THAT CATEGORY, OR A HIGHER, TENTATIVE FEE DURING AN INITIAL PROBATION PERIOD

911. ENABLE SERVER OR SYSTEM TO ESTABLISH CATEGORIES OF CERTIFIED PROFESSIONAL PROVIDERS (CPPs), AND A CPP OF A GIVEN CATEGORY CAN CHARGE, VIA THE SYSTEM, AN INITIAL FEE THAT IS THE STANDARD BASE LEVEL DEFINED IN THE SYSTEM FOR CPPs OF THAT CATEGORY (CONT'D ON FIG. 24C)

1301: IN THE SERVER, EXECUTE PROGRAM INSTRUCTIONS TO ENABLE A USER OF THE SERVER OR SYSTEM (THE SERVER AND OTHER COMPUTER PROCESSING DEVICES IN COMMUNICATION WITH THE SERVER VIA A COMMUNICATIONS NETWORK TO EXECUTE METHOD ASPECTS OF THE INVENTION) TO CREATE A USER PERSONA, WHEREIN BLOCKS OF A GIVEN USER PERSONA'S TIME CAN BE MADE GRAPHICALLY VISIBLE TO OTHER USER PERSONAS ON A PUBLIC CALENDAR SECTION OF A SYSTEM SCHEDULING CALENDAR, WHILE OTHER BLOCKS OF A GIVEN USER PERSONA'S TIME CAN BE KEPT PRIVATE

1302: IN THE SERVER, EXECUTE PROGRAM INSTRUCTIONS TO ENABLE SETTING OF SELECTED PRIORITY LEVELS FOR DIFFERENT BLOCKS OF AVAILABLE TIME IN THE SYSTEM SCHEDULING CALENDAR FOR A GIVEN USER PERSONA, WHEREIN THE PRIORITY LEVEL INDICATES WHICH BLOCKS OF TIME THE USER PERSONA PREFERS TO BE BOOKED FIRST

1303. IN THE SERVER, EXECUTE PROGRAM INSTRUCTIONS TO ENABLE A GIVEN USER TO ELECT TO HAVE A GIVEN PERSONA OWNED BY THE GIVEN USER BE EITHER LISTED OR UNLISTED

1304. IN THE SERVER, EXECUTE PROGRAM INSTRUCTIONS TO ENABLE A PERSONA TO BE DESIGNATED ANONYMOUS, WHEREIN AN ANONYMOUS PERSONA DOES NOT INDICATE THE PERSONA OWNER'S REAL-WORLD IDENTITY

1305. IN THE SERVER, EXECUTE PROGRAM INSTRUCTIONS TO ENABLE A USER WHO OWNS AN UNLISTED PERSONA TO ELECT TO REVEAL THE PERSONA TO SELECTED OTHER PERSONAS.

1306. IN THE SERVER, EXECUTE PROGRAM INSTRUCTIONS TO ENABLE A LISTED OR UNLISTED PERSONA OWNER TO SELECTIVELY PERMIT OR BLOCK VISIBILITY OF THE OWNED PERSONA TO ANY OTHER DESIGNATED PERSONAS

1307. IN THE SERVER, EXECUTE PROGRAM INSTRUCTIONS TO ENABLE THE OWNER OF AN UNLISTED PERSONA ON THE SYSTEM TO PERMIT VISIBILITY OF THE OWNED PERSONA TO OTHER PERSONAS IN A SPECIFIED RANGE OF PRICE LEVELS BELOW AND UP TO A PRICE LEVEL OF THE OWNED PERSONA

1308. IN THE SERVER, EXECUTE PROGRAM INSTRUCTIONS SO THAT VISIBILITY OF A PERSONA IN A HIGHER PRICE LEVEL CAN BE ENABLED FOR A PERSONA OF LOWER PRICE LEVEL IF THE PERSONA OF LOWER PRICE LEVEL PURCHASES A SELECTED AMOUNT OF CREDIT FOR SERVICES, CONTENT OR TIME OF THE HIGHER PRICE LEVEL PERSONA

1309. IN THE SERVER, EXECUTE PROGRAM INSTRUCTIONS SO THAT REFERENCES TO AN UNLISTED PERSONA ON THE SYSTEM ARE BLANKED OR OTHERWISE OBSCURED TO ANY PERSONA WITHOUT PERMISSION TO VIEW THE UNLISTED PERSONA

*FIG. 28*

TRANSACTIONAL PLATFORM

CROSS-REFERENCE TO RELATED APPLICATIONS, INCORPORATION BY REFERENCE

This application for patent is a Continuation of pending commonly-owned U.S. patent application Ser. No. 15/557,229 filed Sep. 11, 2017, which is a national phase entry (35 USC 371) of commonly-owned PCT Application PCT/US16/22232 filed Mar. 12, 2016, which claims the priority benefit of commonly-owned U.S. Provisional Application for Patent Ser. No. 62/132,489 filed Mar. 12, 2015, entitled "Transactional Platform", each of the above-referenced patent applications being incorporated by reference herein as if set forth herein in its entirety. Also incorporated by reference herein as if set forth herein in their entireties are the following U.S. Patent Application Publications:

| | |
|---|---|
| 20140058849 | Saifee et al. |
| 20140108283 | Agrawal |
| 20140164184 | Akolkar et al. |
| 20140164187 | Dietz et al. |
| 20140279352 | Schaefer et al. |
| 20150052009 | Ketchel |
| 20150058171 | Sandhu |
| 20150356663 | Ketchel et al. |

FIELD OF THE INVENTION

The present invention relates generally to methods, systems, devices and software products (computer program products) for creating and maintaining a transactional platform and network for offering, providing, selling and purchasing services, content and time.

BACKGROUND OF THE INVENTION

There exists a need for platforms and networks for facilitating the efficient offering, providing, selling and purchasing of services, content and time.

The present invention provides, among other aspects, methods, systems, devices and software products (computer program products) for creating and maintaining a transactional platform and network for offering, providing, selling and purchasing services, content and time.

Aspects, examples, embodiments and practices of the invention, whether in the form of methods, devices, systems or computer program code products (software or computer program products) will next be described in greater detail in the following Summary of the Invention and Detailed Description of the Invention, in conjunction with the attached drawing figures.

SUMMARY OF THE INVENTION

Exemplary embodiments and practices of the invention provide systems, devices, methods and computer program code (software) products for, among other aspects and possible applications, enabling a provider to provide services or content to a consumer and be financially compensated for the value of the services or content provided. In one aspect, the invention includes a server accessible to a plurality of users through respective client application programs ("apps") executing on respective client devices capable of communicating with the server via a network; and a storage element accessible to the server and storing instructions executable by the server, that when executed by the server enable the following:

matching, via the server, a user who offers to provide services or content ("Provider") with a user who wishes to buy the services or content ("Consumer");

calculating, via the server, a market price for the offered services or content of the Provider, the calculation via the server being based in part on a metric of demand for the Provider's services or content;

receiving an indication, at the server, of the Consumer's request to purchase services or content of the Provider at the calculated market price;

enabling payment from the Consumer to the Provider, via the server, for the Provider's service or content purchased by the Consumer at the calculated market price; and delivering a communications session containing the service or content purchased by the Consumer, from the Provider to the Consumer, via the server.

In another aspect, the invention enables a provider to sell his time to a consumer and be financially compensated for the value of the time provided. In this aspect, the invention includes a server accessible to a plurality of users through respective client application programs executing on respective client devices capable of communicating with the server via a network; and a storage element accessible to the server and storing instructions executable by the server, that when executed by the server enable the following:

matching, in the server, a user who offers to provide his time ("Provider") with a user who wishes to buy the Provider's time ("Consumer");

calculating, in the server, a market price for the time of the Provider, the market price being based in part on a metric of demand for the Provider's time;

receiving an indication, at the server, of the Consumer's request to purchase the Provider's time at the calculated market price;

enabling payment from the Consumer to the Provider, via the server, for the Provider's time purchased by the Consumer at the calculated market price; and delivering a communications session having a duration corresponding to the amount of the Provider's time purchased by the Consumer, from the Provider to the Consumer, via the server.

Another aspect of the invention enables a provider to sell his time or services to a consumer and be financially compensated for the value of the time or services provided. In this aspect, the invention includes a server accessible to a plurality of users through respective client application programs executing on respective client devices capable of communicating with the server via a network; and a storage element accessible to the server and storing instructions executable by the server, that when executed by the server enable the following:

matching, in the server, a user who offers to provide his time or services ("Provider") with a user who wishes to buy the Provider's time or services ("Consumer");

calculating, in the server, a market price for the time or services of the Provider, the market price being based in part on a metric of demand for the Provider's time or services;

receiving an indication, at the server, of the Consumer's request to purchase the Provider's time or services at the calculated market price; and enabling payment from the Consumer to the Provider, via the server, for the Provider's time or services purchased by the Consumer at the calculated market price.

Another aspect of the invention enables the supervision of the Provider's providing of time or services to the Consumer. The supervision can include a provision for display, on a display screen, of a representation of services or time being provided by the Provider to the Consumer. The supervision can also include a provision for video monitoring of the Provider in providing services or time to the Consumer. This may also include recording and verification of on-line/off-line or start/stop times of the Provider in providing services or time in an offline manner to the Consumer.

In another aspect of the invention, a metric of demand for a given provider's time, services or content is utilized by the server to modify a specified maximum price of the provider's time, services or content.

In a further aspect, the server can utilize a selected metric of demand for the Provider's time, services or content ("Success") to modify a specified maximum price of the provider's time, services or content, wherein "Success" is a metric comprising the product of productivity multiplied by workload, wherein productivity is a ratio of actual price to maximum price, multiplied by a ratio of quantity sold to quantity offered, wherein quantity is a quantity of time.

Another aspect of the invention includes a specified Success Threshold; and positive modification of the specified maximum price occurs after measured Success exceeds the Success Threshold for a time period of at least a specified Observation Period.

In another aspect, negative modification of the specified maximum price occurs after measured Success is less than a specified negative triggering threshold for a time period of at least a specified Observation Period, wherein the negative triggering threshold is a function of the Success Threshold and the specified maximum price.

In a further aspect of the invention, as "Success" increases, the system increases the calculated maximum price.

Another aspect of the invention includes calculating a monetary compensation component for a system-providing entity, the monetary percentage being based on a percentage of service fees generated on the system.

A further aspect of the invention enables a user to create and maintain a fictional identity (Persona) for use in transactions, wherein user-to-user and Provider/Consumer interaction is implemented through Personas, and wherein the Personas comprise Provider Personas and Consumer Personas. The user can be enabled to have the Persona be anonymous, in that the Persona does not reveal or indicate the user's real-world identity. Alternatively, the user can elect to have the Persona be visible to (i) no other users of the system, (ii) a selected set of other users of the system, or (iii) all other users of the system. Still further, the user can create and maintain multiple Personas for use on the system, and the multiple Personas may have different levels of anonymity and visibility to other users, and be associated with providing or purchasing of different services or content.

In a related aspect, a system, practice or computer program product (software) implementation of the invention can be configured to enable consumers of services, content or time via the system to remain anonymous to providers in the system; wherein providers in the system may opt to be anonymous to consumers of their services, content or time via the system.

The invention can also include a user database that functions as an intermediary between data corresponding to a given Persona, and a billing facility.

In one aspect of the invention, a method, computer program product or system implementation of the invention is configured so that all communications carried on the system between users of the system are treated as chargeable communications that incur a monetary fee. A given user can designate selected other users, or groups of users, of the system as "Friends" of the given user, wherein any communications carried on the system between users of the system, other than designated conversations between "Friends," are treated as a chargeable communication.

In a related aspect, a Consumer can use the system to charge a monetary fee in exchange for engaging with advertising content presented to the Consumer by an advertising Provider (an "Advertiser"). The invention can also enable the Advertiser to pay the Consumer a system-calculated value of the Consumer's time to engage with the Advertiser's advertising content.

A method, computer program product (software) or system according to the invention can calculate a system revenue component based on a percentage of fees Providers charge Consumers for provider services, content or time received via the system, plus a percentage of fees Consumers charge Advertisers for time spent by the Consumers engaging with advertisements via the system; and can calculate a system revenue component based on a subscription fee charged by a system-providing entity to users of the system.

In one aspect of the invention, a method, computer program product or system implementation of the invention is adapted for deployment inside a business enterprise for establishing an enterprise-internal marketplace for time.

In one aspect of the invention, respective client application programs communicate with a cloud-based system application program.

The client devices can include cellphones, tablets, laptop computers or desktop computers. The delivering of a communications session can be on a one-to-one or one-to-many basis. The delivering of a communications session on a one-to-many basis can be on a one-to-many-simultaneously (mass audience) basis. The invention can enable a Provider to set a minimum number of audience members, below which the communications session will not be delivered. The Provider can also set a minimum overall price, below which the communications session will not be delivered. In addition, the invention can set a fixed overall price, such that a greater number of audience members results in a lower price per audience member; or a fixed audience member price, such that a greater number of audience members results in a larger overall Provider payment.

In another aspect of the invention, a Provider can provide services, content or time via the system in exchange for monetary fees that are paid via the system, either to the provider or in selected part to a charity designated by the Provider.

In a further aspect, a method, computer program product or system implementation of the invention enables a user to reject advertising content, or to accept selected advertising content in exchange for a monetary fee payable via the system to the Consumer. A user can engage in a bi-directional conversation with a market research entity, via the system, in exchange for a fee payable to the user via the system.

Another aspect of the invention includes a Provider Finder that enables a user to search for a Provider meeting certain criteria set by the user. In one aspect, the Provider Finder provides and optimizes a category tree and order of search results that the user sees when conducting a search for a provider.

In another aspect of the invention, a selected number of hours and types of communications between designated Friends are exempt from monetary charges.

A further aspect of the invention includes a scheduler function, for scheduling a communications session, the scheduler function being operable in conjunction with a user's selected calendar utility. The scheduler function can be operable to indicate communications session scheduling conflicts, and enter appointments and reminders for communications sessions in the user's selected calendar utility.

Another aspect of the invention includes carrying privacy-protected commercial conversations, wherein the conversations are securely encrypted for protection from eavesdropping and data analysis by any party, including any administrator of the system and any system-executed software algorithms. The conversations can include any of speech, text, video, images, documents or music, static or dynamic content.

In a further aspect of the invention, a method, computer program product or system implementation of the invention enables a Real-time Private Conversation, via the system, between individual users, or between groups of users. A user can provide fee-based services, via the system, to one or more clients simultaneously via a Real-time Private Conversation.

In another aspect, a method, computer program product or system implementation of the invention collects a monetary fee from the Consumer and pays the Provider his fee, less a system commission calculated by the system and payable to a system function-providing entity.

In other aspects, the invention enables a communications platform for a user to create a social network, and enables a communications platform for a user to create a commercial network.

In a further aspect, a method, computer program product or system implementation of the invention enables a Provider to create and maintain at least one Provider Persona for use on the system to interact with a Consumer, wherein the system calculates a maximum rate that a given Provider Persona may charge ("Maximum Rate") for providing services, content or time via the system.

In one related aspect, the sum of time provided by all Provider Personas of a given Provider is limited by the system to less than or equal to a system-selected Daily Maximum, wherein the selected Daily Maximum is a system-selected percentage of 24 hours.

In a further aspect, a method, computer program product or system implementation of the invention, (a) the system utilizes a metric of demand for a Provider Persona's time, services or content ("Success") to modify a previously-calculated Maximum Rate for the Provider Persona; (b) "Success" is a metric comprising the product of productivity multiplied by workload, wherein productivity is a ratio of actual price to maximum price, multiplied by a ratio of quantity sold to quantity offered, wherein quantity is a quantity of time; and (c) the system enables the Provider Persona to charge the Maximum Rate, a pre-selected Discount Rate applicable to a plurality of Consumers, or a discounted rate negotiated with a given Consumer.

In a related aspect, the server determines the Provider Persona's Maximum Rate based on Provider Persona-specific sales data. The sales data comprises time slots offered, time slots purchased, and prices paid for time slots. The system maintains a Maximum Rate scale divided into tiers of increasing price ("Price Levels"), and each Provider Persona at a given Price Level has the same Maximum Rate. The server periodically executes a calculation, based in part on the Provider Persona's Success metric, as to whether to raise, lower, or leave unchanged the Provider Persona's Price Level and Maximum Rate. The system is operable to increase or decrease the ease or difficulty of earning a higher Price Level, to maintain a selected target distribution of Price Levels of Provider Personas within the system. An initial fee announced to be charged by a Provider Persona, via the system, establishes that Provider Persona's initial Price Level within the system. Adjacent Price Levels define a Price Range of a given Price Level, which is bounded by the Maximum Rate of the given Price Level and the Maximum Rate of the Price Level below the given Price Level.

In a related aspect of a method, computer program product or system implementation of the invention. (a) the system publishes price information for Provider Personas; (b) a new Provider Persona can select, via the system, his initial Price Level and an initial published price within the Price Range corresponding to the selected initial Price Level; (c) the new Provider Persona's selected initial Price Level, associated Maximum Rate and initial published price are designated, by the system, as "Tentative"; (d) after selected observation and adjustment by the system, the Provider Persona's Maximum Rate is designated, by the system, as "Established" at a Price Level where the Provider Persona's observed Success is at or above a system-selected minimum value; and (e) thereafter the established Maximum Rate for the Provider Persona are published by the system and subsequently can only be changed by the system.

In a further related aspect, the system defines categories of Provider Personas, and wherein a Provider Persona can charge, via the system, an initial fee that corresponds to a defined Base Level defined by the system for providers of that category, or a higher, tentative fee during an initial probation period. The system can designate categories of certified professional providers (CPPs). A CPP of a given category can charge, via the system, an initial fee that is the standard base level defined in the system for certified professional providers of that category. A CPP can offer, to the system, credentials and evidence that a fee they already charge outside of the system, which is higher than the standard base level defined in the system, meets fair market standards, and upon system approval the CPP can charge, via the system, their higher rate. System approval can be generated by a system-executed software algorithm. Alternatively, system approval can be entered into the system by a human system administrator. The system can propose a lower rate to the CPP, and the CPP can elect, via the system, to charge either the system-proposed lower rate or, upon system approval, the CPP's higher rate, and wherein the higher rate is designated the CPP's default rate.

In one aspect, the invention includes an Application Layer, a Services Layer, and an Infrastructure Layer.

The Application Layer can include social network, communication, Persona, scheduling, and payment functions. The Application Layer can also include cross-platform and multi-device application functions.

The Services layer can include software services for secure identity, secure communication, scheduling, and Provider pricing functions. Provider pricing functions can include Maximum Rate calculation functions.

The Infrastructure Layer can include business and operations data, secure financial transactions, and scalable system architecture.

In a further aspect, a method, computer program product or system implementation of the invention enables a Provider to create, via the system, different Provider Personas to provide services in different service categories. In a related aspect, a Provider can create, via the system, different Provider Personas to provide the same service, or different Provider Personas to provide different services in the same service category, wherein the amount of time or service collectively provided by the multiple Provider Personas owned by the same Provider is limited by the system to a selected quantity.

In a further aspect, a method, computer program product or system implementation of the invention enables a user to adjust settings, via the system, to indicate temporal availability of a given Persona to enter into a communications session. Temporal availability can include one of the following availability states: available any time, available if using this device, available now, and unavailable. A user can associate availability states with selected future time slots of a calendar maintained by a scheduling function of the system for the user.

In another aspect, the invention provides a Persona Database and a directory comprising a user view of the Persona Database; provides a search function enabling users to search, in the Persona Database, for Personas and Providers, based on selected search terms; enables users to browse, within the system, a directory of public Personas; enables users to browse the directory of public Personas, within the system, using search options, the search options comprising sorting and filtering. The sorting and filtering can include sorting and filtering by Providers' availability states and published price. The invention can organize directory entries in accordance with visibility parameters, such that a given Persona is visible only to a selected set of other Personas.

In other aspects, the invention provides a saved contacts list and a recent contacts list; a server-based system scheduling calendar, wherein the system scheduling calendar provides alerts to prevent double-booking of time slots and tools to reconcile appointments across multiple Personas of a given user.

In another aspect of the invention, a user can create a User Persona, wherein blocks of a given User Persona's time can be made graphically visible to other User Personas on a public calendar section of the system scheduling calendar, while other blocks of a given User Persona's time can be kept private. A User Persona can set selected priority levels for different blocks of available time in the system scheduling calendar, wherein the priority level indicates which blocks of time the User Persona prefers to be booked first. The system scheduling calendar can provide a graphical timeline operable to display a User Persona's past events and completed tasks, and future events.

In another aspect of the invention, the Services Layer comprises a server-based module or function that determines a Maximum Rate for a given Provider, based on the Provider's sales data maintained in the system.

In another aspect of the invention, server or system communications with and between users is encrypted. Communications with system infrastructure can be implemented through an SSL/TLS method. Communications between users of the system utilizes a public/private key method, wherein the key material never leaves the user's device. At least part of the key material can be one-time-use key material.

In other aspects of the invention, a given user can elect to have a given Persona owned by the given user be either listed or unlisted; a Persona can be anonymous, wherein an anonymous persona does not indicate the Persona owner's real-world identity; a user who owns an unlisted Persona can elect to reveal the Persona to selected other Personas; an owner of a listed or unlisted Persona can selectively permit or block visibility of the owned Persona to any other designated Personas.

In other aspects of the invention, the owner of an unlisted Persona can permit visibility of the owned Persona to other Personas in a specified range of Price Levels below and up to a Price Level of the owned Persona; visibility of a Persona in a higher Price Level can be enabled for a Persona of lower Price Level if the Persona of lower Price Level purchases a selected amount of credit for services, content or time of the higher Price Level Persona; and references to an unlisted Persona on the system are blanked or otherwise obscured to any Persona without permission to view the unlisted Persona.

In a further aspect, the invention comprises a Communications Infrastructure Layer, and the Communications Infrastructure Layer comprises communications encryption and privacy settings functions, billing detail functions, personal contact lists, text-based conversations and history, audio and video chat functions, and document sharing functions. The Communications Infrastructure Layer can also include a shared white board function, auxiliary interactive graphics, the ability to share the user's screen or window of another application, real-time text-based chat function, and check-in/check-out timestamp functions to measure offline activities performed by a Provider or a Provider Persona.

In other aspects of the invention, intra-system network traffic is strongly point-to-point encrypted; intra-system communications comprise videoconferencing functions; and intra-system communications can also include text messaging, voice communications or voice messaging.

In a further aspect, the invention provides a server/cloud infrastructure for telecommunications, comprising a cloud-based network of infrastructure nodes that serve as a local point of connection for each user. Intra-system communications incur a communications fee based on the target Persona's Maximum Rate or an agreed-upon lower rate. In another aspect, intra-system communications incur a communications fee less than or equal to the target Persona's Maximum Rate. In another aspect of the invention, the recipient of the communications is paid, via the system, the communications fee minus a system-provider compensation component, thereby to compensate the recipient for his time.

In related aspects of the invention, the Maximum Rate of a Provider Persona in a real-time communications session defines a maximum allowable price of the session; the price to send a text message within the system compensates the recipient Persona for a typical time required for a human reader to read and respond to a text message; the price to send the text message is based on the recipient Persona's Price Level and the size of the message; the invention is operable to generate a display of real-time cost information to the user generating the message, to indicate the communications cost of sending the message; the recipient of a message receives revenue for reading and responding to a message only if the original sender replies to the recipient's first response; and the recipient of a message can immediately initiate, via the system, a real-time communication in response to the message, or can schedule an appointment via the server/system.

Another aspect of the invention comprises an appointment scheduling function that includes the ability to specify which participants in a scheduled communications session are Provider Personas who can earn revenue, and which are Consumer Personas who will share fees. The appointment scheduling function can also include an appointment negotiation function that enables the amount of fees to be negotiated, if permitted by the Provider Persona on a given scheduled communications session. The appointment scheduling function can also include a facility to request an appointment at a rate lower than the Provider Persona's Maximum Rate, and wherein the appointment is only confirmed, via the system, if the Provider Persona and all participants agree to terms. The Provider Persona can determine in advance, via the system, to offer rates lower than his Maximum Rate to all, or to a subset, of users. In a related aspect, the invention enables the maintenance of a discount list comprising a non-public list of Personas that are allowed to communicate with a given Provider Persona at a discounted rate, or at a zero rate.

Another aspect of the invention enables a Provider to bill for offline work. In a related aspect, a given Provider's daily offline time billing, using an implementation of the invention, is limited to less than or equal to 24 hours/day.

Still another aspect of the invention enables Consumers to pay for services, content or time in, and to be paid in, a system-internal digital currency based on the value of Provider services, content or time established by system users through their activities on the system. The unit value of the system-internal digital currency can be tied to a system-calculated Maximum Rate of a hypothetical "standard person's" services, content or time.

In yet another aspect, the invention enables a Consumer Queue to be maintained for a given Provider, wherein a given Consumer can move up in a given Provider's Consumer Queue by paying in advance for a selected quantity of the Provider's services, content or time. In a related aspect, the Consumer can advance further in the queue by paying in advance for a greater quantity of the Provider's services, content or time.

In another aspect of the invention, Providers and Consumers can comprise software algorithm-based robots. In a related aspect, a method, computer code product or system-based implementation of the invention can be configured to not impose an upper limit on robot Provider time billing, wherein robot Provider time is billed at a fixed, system-specified rate.

In another aspect, a method, computer code product or system-based implementation of the invention limits a given user's total time billed using the invention, across all of a user's Personas, to less than or equal to 24 hours/day.

One aspect of the invention includes a method of enabling a provider to provide services or content to a consumer and be financially compensated for the value of the services or content provided, the method comprising: providing a server accessible to a plurality of users through respective client application programs executing on respective client devices capable of communicating with the server via a network; and providing a storage element accessible to the server and storing instructions executable by the server, that when executed by the server enable the server to: match, via the server, a user who offers to provide services or content ("Provider") with a user who wishes to buy the services or content ("Consumer"); calculate, via the server, a market price for the offered services or content of the Provider, the calculation via the server being based in part on a metric of demand for the Provider's services or content; receive an indication, at the server, of the Consumer's request to purchase services or content of the Provider at the calculated market price; arrange for payment from the Consumer to the Provider, via the server, for the Provider's service or content purchased by the Consumer at the calculated market price; and deliver a communications session containing the service or content purchased by the Consumer, from the Provider to the Consumer, via the server.

Another aspect of the invention includes a method of enabling a provider to sell his time to a consumer and be financially compensated for the value of the time provided, the method comprising: providing a server accessible to a plurality of users through respective client application programs executing on respective client devices capable of communicating with the server via a network; and providing a storage element accessible to the server and storing instructions executable by the server, that when executed by the server enable the server to: match, in the server, a user who offers to provide his time ("Provider") with a user who wishes to buy the Provider's time ("Consumer"); calculate, in the server, a market price for the time of the Provider, the market price being based in part on a metric of demand for the Provider's time; receive an indication, at the server, of the Consumer's request to purchase the Provider's time at the calculated market price; arrange for payment from the Consumer to the Provider, via the server, for the Provider's time purchased by the Consumer at the calculated market price; and deliver a communications session having a duration corresponding to the amount of the Provider's time purchased by the Consumer, from the Provider to the Consumer, via the server.

Another aspect of the invention provides a method of enabling a provider to sell his time or services to a consumer and be financially compensated for the value of the time or services provided, the method comprising: providing a server accessible to a plurality of users through respective client application programs executing on respective client devices capable of communicating with the server via a network; and providing a storage element accessible to the server and storing instructions executable by the server, that when executed by the server enable the server to: match, in the server, a user who offers to provide his time or services ("Provider") with a user who wishes to buy the Provider's time or services ("Consumer"); calculate, in the server, a market price for the time or services of the Provider, the market price being based in part on a metric of demand for the Provider's time or services; receive an indication, at the server, of the Consumer's request to purchase the Provider's time or services at the calculated market price; and arrange for payment from the Consumer to the Provider, via the server, for the Provider's time or services purchased by the Consumer at the calculated market price.

One aspect of the invention includes a computer program product comprising computer-executable program instructions stored in a non-transitory, tangible, computer-readable medium, the computer-readable medium being accessible by a server, the server comprising a computer processor and being accessible to a plurality of users through respective client application programs executing on respective client devices capable of communicating with the server via a network, the instructions being executable by the server, and which, when executed by the server, cause the server to: match, via the server, a user who offers to provide services or content ("Provider") with a user who wishes to buy the services or content ("Consumer"); calculate, via the server, a market price for the offered services or content of the Provider, the calculation via the server being based in part on a metric of demand for the Providers services or content; receive an indication, at the server, of the Consumer's request to purchase services or content of the Provider at the calculated market price; arrange for payment from the Consumer to the Provider, via the server, for the Provider's service or content purchased by the Consumer at the calculated market price; and deliver a communications session containing the service or content purchased by the Consumer, from the Provider to the Consumer, via the server.

Another aspect of the invention includes a computer program product comprising computer-executable program instructions stored in a non-transitory, tangible, computer-readable medium, the computer-readable medium being accessible by a server, the server comprising a computer processor and being accessible to a plurality of users through respective client application programs executing on respective client devices capable of communicating with the server via a network, the instructions being executable by the server, and which, when executed by the server, cause the server to: match, in the server, a user who offers to provide his time ("Provider") with a user who wishes to buy the Provider's time ("Consumer"); calculate, in the server, a market price for the time of the Provider, the market price being based in part on a metric of demand for the Provider's time; receive an indication, at the server, of the Consumers request to purchase the Provider's time at the calculated market price; arrange for payment from the Consumer to the Provider, via the server, for the Provider's time purchased by the Consumer at the calculated market price; and deliver a communications session having a duration corresponding to the amount of the Provider's time purchased by the Consumer, from the Provider to the Consumer, via the server.

Another aspect of the invention provides a computer program product comprising computer-executable program instructions stored in a non-transitory, tangible, computer-readable medium, the computer-readable medium being accessible by a server, the server comprising a computer processor and being accessible to a plurality of users through respective client application programs executing on respective client devices capable of communicating with the server via a network, the instructions being executable by the server, and which, when executed by the server, cause the server to: match, in the server, a user who offers to provide his time or services ("Provider") with a user who wishes to buy the Provider's time or services ("Consumer"); calculate, in the server, a market price for the time or services of the Provider, the market price being based in part on a metric of demand for the Provider's time or services; receive an indication, at the server, of the Consumer's request to purchase the Provider's time or services at the calculated market price; and arrange for payment from the Consumer to the Provider, via the server, for the Provider's time or services purchased by the Consumer at the calculated market price.

These and other aspects, examples, embodiments and practices of the invention, whether in the form of methods, devices, systems or computer software code products (software), will be discussed in greater detail below in the following Detailed Description of the Invention and in connection with the attached drawing figures.

BRIEF DESCRIPTION OF THE DRAWINGS

FIGS. 16-35 are a series of flowcharts illustrating exemplary techniques according to various aspects of the invention.

DETAILED DESCRIPTION OF THE INVENTION

Figure 1:
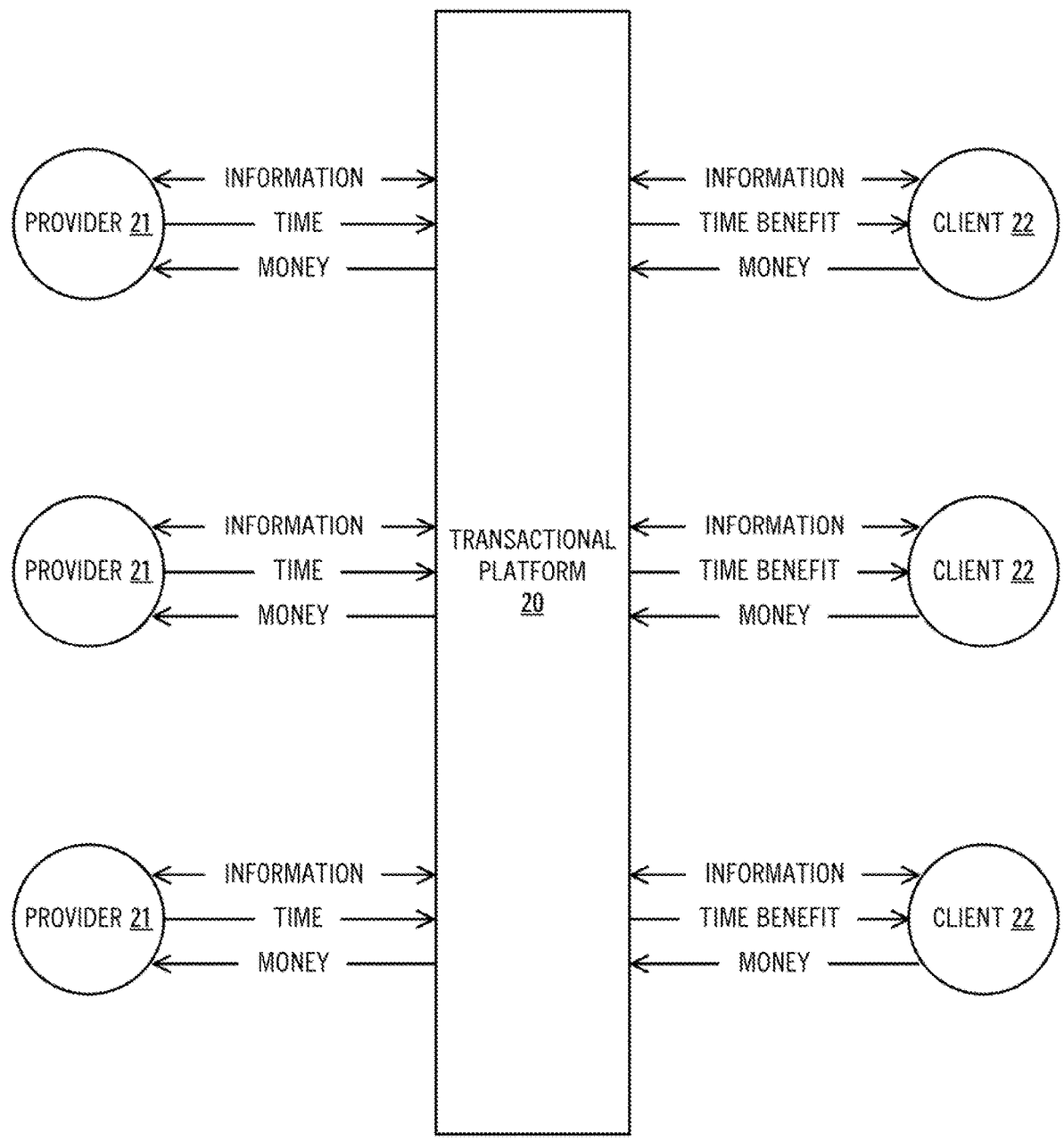
FIG. 1 shows a general diagram of a transactional platform according to a practice of the invention (referred to herein as the ZeitMarket ("ZM") platform).

The present description of the invention is divided into the following sections:
 1. Overview
 2. Technical Elements
 3. Derivative Products % Platforms
 4. Glossary
 5. Zeitprice—Additional Description
 6. Digital Processing Environment in Which Invention Can Be Implemented
 7. Flowcharts of Exemplary Techniques 1. Overview There is first provided an overview of a transactional platform according to the present invention, hereinafter referred to as the "Zeitmarket" or "ZM" platform.

The invention described herein provides a marketplace for real-time online services based on a fundamentally private and secure communications platform, which can be implemented as a secure social network or commercial network platform. In an exemplary practice of the invention, every communication, other than a communication among designated "Friend" entities, is treated as a business transaction, enabling users to realize (both intellectually and financially) the value of their time. In an exemplary practice of the invention, the fair market price of a provider's time is dynamically established, based on individual and system-wide commercial usage data, independent of the content of any given communication.

An exemplary embodiment of the invention described herein is a transactional platform ("ZM platform") that facilitates the exchange of time for money. (The word "Zeit"

is the German word for "time.") In the present description, the word "time" generally refers to time spent by a person or persons, referred to herein as "providers," for the benefit of another person or persons, referred to herein as "clients" or "consumers". Providers and clients who are employing the ZM platform are collectively referred to herein as "users."

It is noted that the words "user" and "member" herein may be used interchangeably when discussing the invention. But a person browsing public areas of the application may be a "visitor" and is not necessarily a "member," although they are both "users."

Exemplary embodiments and practices of the invention, described herein, have a number of features, and will:

(1) Enable persons connected to the Internet to effortlessly enter into time-based business transactions as the service provider or as the service consumer.

(2) Provide objective algorithmic determination of relevant parameters for conducting business; in particular, a rate referred to herein as the Zeitprice, the maximum rate for the provider's time, independent of the content of any communication.

(3) Provide a private and secure, mobile and stationary telecommunications infrastructure with security, privacy, reach, and ease of use second to none, for live and pre-recorded audio/video/graphic communication and online and offline text-based communication.

A system according to the invention can be owned and operated as a completely new business with enormous global revenue potential. Revenue generation occurs in the form of a percentage of the transaction volume generated by providers in numerous verticals. The system can receive revenue for the use of the platform, enabling the providers to conduct their respective businesses. It can also be used to define and establish a digital currency based on fundamental resource, i.e., time.

The invention can be used to facilitate virtually any type of relationship involving time and money in both for-profit and non-profit contexts. Providers of time can include professionals as well as casual users of the platform. Clients can include large business enterprises as well as individuals. A given ZM user may be a provider in some transactions and a client in others.

FIG. 1 shows a simplified diagram illustrating the overall ZM concept in accordance with the invention. As shown in FIG. 1, the platform 20 provides a structure for facilitating exchanges of information between providers 21 and clients 22. When a given provider 21 enters into an agreement with a suitable provider 22, the provider 21 provides "time" in the form of services rendered in exchange for money received from the client 22. The client 22 is depicted as receiving a "time benefit" in exchange for money paid.

As used herein, the term "time benefit" refers to any type of benefit accruing to a client 22 as a result of a provider's expenditure of time. The term "time benefit" includes, for example, a service provided by a provider directly to a client, as well as non-tangible benefits experienced by a client 22 when a provider 21 provides time to an individual or individuals other than the client, or to society as a whole.

With a cloud-based mobile or desktop app, users of a system according to the invention can conduct privacy-protected social and commercial, one-on-one and one-to-many, real-time and off-line conversations using speech, video, text, images and other media. In this way, the invention can improve existing client-provider relationships that require secure and private communications; and can facilitate new relationships by matching users who provide services with users who want to consume those services.

The invention can also provide an efficient way for people to generate income by sharing their knowledge, advice, expertise, experiences, creativity, performance, or empathy. As providers strive to increase the quality of their contributions, the "Zeitprice" algorithm described herein can be configured to raise such a provider's maximum price.

A system according to the invention can be implemented to generates revenues from the outset of operation, by charging a percentage on all service fees, in reasonable proportion to operating expenses and in a transparent manner. The system according to the invention, in turn, can provide a digital infrastructure for business transactions among its members and keeps their communications securely encrypted and protected from eavesdropping and data analysis.

The ZM platform according to the invention can include the following aspects:

Privacy: The system can be implemented with secure communication and transparent privacy policies.

Personas and Anonymity: In accordance with one practice of the invention, users have the option to use their real world identity or one of several anonymous, completely protected fictional identities, each called a persona, chosen by the user to be visible only to a specified set of other personas or to the general public. The consumers of services on a system in accord with the invention may remain anonymous to the providers. Providers may choose to remain anonymous to their clients. A system user database, in accordance with the invention, can serve as the link between the social platform's user identity and the billing facility.

Communication Charges: In accordance with one practice of the invention, any communication other than a conversation with designated friends can be treated as a business transaction on the system between a provider and a client, and monetarily charged for, including text messages and email sent by one persona to another, subject to the detection of certain patterns of behavior as verifiable signs of interest displayed by the recipient.

"Zeitprice": One embodiment of the invention provides a performance-based automated mechanism for price-finding, in which the server publishes each provider's "Zeitprice", a market price that the server, configured in accordance with a practice of the invention, determines algorithmically based on the provider's "Success", a function measuring how well a provider fills more time slots with higher-paying customers. Each seller may choose either to charge the Zeitprice to all buyers or to negotiate with each buyer within the price range below and up to the Zeitprice. The Zeitprice of each provider is determined by a server-based module, which can be implemented using known computer software and hardware techniques and products, referred to herein as the Universal Zeitmachine (UZM). In one practice of the invention, the UZM implements the Zeitprice determination based on data provided by each member's individual Zeitmachine.

Revenue Sources: In one practice of the invention, the transactional platform of the invention, or the platform or system provider, can earn revenue by taking a percentage of the fees that individual service or content providers charge consumers for time spent, and by taking a percentage of fees consumers charge advertisers for time spent engaging with ads. In addition, the system or platform provider can charge some or all users a one-time, monthly or annual subscription fee, including in the form of an up-front payment for services or impose time limitations on the use of some of the free platform services such as video communication among friends to reduce the cost of operation if needed. However, such charges and limitations would potentially add friction to the decision to register as a user and to the day-to-day use of the platform.

Enterprise-Directed Embodiment: One embodiment of the invention can be adapted for secure internal and external communication and the establishment of a company-internal market for time, an important and limited resource in most enterprises; and the system-provider's revenues can include per-seat enterprise license and maintenance fees.

Motivations

Approximately two billion people communicate on social networks today. These networks encourage users to share their time, experience and knowledge, and in return, the networks mine personal and sometimes sensitive information about their users' lives, for free. Social networks offer a platform for people to communicate, initiate and maintain social relations and interactions free of charge; but their benefits come at the price of giving away personal information for free; and many users increasingly feel uncomfortable doing so. An expanding base of users would prefer to pay for verifiable security and guaranteed privacy.

Additionally, most users are also providers or potential providers. They have the knowledge and creativity to provide valuable services and content, or could provide such services and content if they were compensated for it. Unfortunately, they currently lack a way to establish relationships with the potential consumers of their services that allows them to be adequately compensated.

In contrast, the invention, in one aspect, provides a platform for measured sharing of valuable services and content in a private, secure manner, and being compensated for their value. Also in accord with the invention, shared services or content become part of a global marketplace in which demand for services and content drives the price of a provider's time higher. It can be implemented in a manner that is secure, private and non-exploitable, and as its perceived value goes up, so does provider compensation.

Platform Enables Monetizing Time: People today conduct business and share information privately through interactions with networked devices. While traditional communication channels like telephone, television and print have well-established means of exchanging rendered services for money (e.g., pay-per-view or subscription models), the Internet has seen only partial attempts at creating a means for everyone to monetize their time online.

In contrast, exemplary embodiments of the invention establish a platform for buying and selling time online by deploying an online marketplace with the following central elements:

(1) Users can participate in privacy-protected social and commercial conversations through a cloud-based mobile or desktop app.

(2) The invention can enable secure text messaging for initial contacts and secure video/voice calls for real-time communication.

(3) In one practice of the invention, users can conceal their identities from other users behind admittedly pseudonymous "persona" names.

(4) In one embodiment of the invention, if advertisers want users of the platform to spend time engaging with their ads, they must pay those users the value of their time for what are essentially ad-hoc focus group studies.

(5) In one embodiment, the buyers of time pay service fees charged by the sellers of time. Service fees are capped using a price-limiting method described herein, which determines the value of the communication in an objective manner.

(6) In one embodiment, the transactional platform (or its administrator) charges the providers of time a percentage of their revenues.

Foster Provider/Client Relationships: A transactional platform in accordance with the invention can improve existing client-provider relationships that require secure and private communications. For example, a lawyer could invite clients to engage in privileged online audio/video conversations with confidence that the content of such conversations could not be intercepted as a phone call could, nor that it is stored and analyzed by an intermediary. The invention can also facilitate new client-provider relationships by matching those who provide services with those who want to consume such services online.

Protection of Privacy: The methods, systems and computer program products of the invention can be implemented with strong end-to-end encryption.

Benefits

As described herein, exemplary embodiment of the invention provide a commercial and/or social transactional platform where users can turn their time into money while protecting consumer privacy. In exemplary embodiments, a platform according to the invention can enable the following:

1. Secure Internet Transmission of Audio, Video, Messages, Screens and Documents.

2. Membership, Identity and Relationship Management that Protects Consumer Privacy.

In one embodiment, the invention enables comprehensive and strong end-to-end encryption to protect the privacy of its users and the security of their communications. In addition, in one embodiment, a platform or system member or user may define one or more real or fictional identities called personas.

In one embodiment of the invention, individuals who see the persona online within the system of the invention will not see the persona owner's true identity unless that owner chooses to reveal it.

3. Offering Services/Collecting Revenue for Service.

The ZM platform enables the provision and consumption of any and all imaginable services and content that can be provided online using many supported media formats, either for free or for a fee. Any ZM platform member can convert time to money by:

a. providing their professional time online (and offline, utilizing the ZM platform time measurement features) to current and newfound clients in exchange for fair market fees, either 1-to-1 or 1-to-many, including broadcasts (teaching courses, giving lectures, performing concerts or any other activity of interest to an audience of one or more clients;

b. donating their personal time online to admirers and fans in exchange for fair market fees that go to the member and/or their chosen charity;

C. participating in low-to-medium-skilled activities such as academic or corporate research studies for which they are paid fair market fees;

d. accepting text, banner and/or video ads from advertisers willing to pay them fair market fees for exposures, clicks or other proxies for time;

e. engaging in conversations (called adversation sessions herein) with market researchers willing to pay them for their time reacting to and opining about pitches, product ideas, announcements, etc.

A fee based on the Zeitprice of each user's current persona is levied on each communication with the user by another user's persona and earned by the initial recipient of the communication if there is a verifiable sign of the sender's interest in the reply of the initial recipient such as a reply to the reply, an agreement to engage in a paid conversation, or the designation of the sender as a friend on the ZM platform. As noted in 3(b) above, a celebrity may specify a charity approved by the entity that is operating or administrating the ZM platform or system, to which initial contact and/or conversation fees will go.

4. Tiered Pricing System.

The ZM platform enforces an upper limit on the hourly rate that a persona may charge for his or her time. This limit is called the Zeitprice. The Zeitprice scale is chunked into thirteen tiers of exponentially increasing Zeitprices, called Levels. Every persona at a given Level has the same Zeitprice.

Any provider can either charge an initial fee that is the standard base level within the ZM platform for users or tentatively charge a higher fee during a period of probation. A certified professional provider can either charge an initial fee that is the standard base level within the ZM platform for certified professional providers or present, digitally, electronically, or in manual form, to the ZM server or platform or its administrator, their credentials and evidence that a higher fee that they already charge meets fair market standards. The initial fee determines the initial Level.

The sum of the time all personas of a particular user can charge for is capped at a maximum of less than or equal to 24 hours/day.

Once a provider of time has worked a sufficient, selected length of time in connection with ZM platform, an algorithm that runs periodically adjusts their Level up or down based on their Success, a function measuring how well and how fast a provider fills more time slots with higher-paying customers.

The so-called Price Range of a given Level is bounded by the Zeitprice of that Level and the Zeitprice of the Level below ($0 below Level 0). Any new provider can choose his or her initial Level and an initial published price within the corresponding Price Range, provided, however, that such Level, the associated Zeitprice and the initial published price will all be clearly marked as tentative. After one or more rounds of observation and adjustment by the Universal Zeitmachine, the provider's Zeitprice will be declared established at a Level where his or her observed Success is not below a required floor. Such Level may turn out to be the lowest possible Level. The established Zeitprice will be published and can only be changed subsequently by the Universal Zeitmachine.

The population of personas at each Level is expected to fit a pyramidal distribution. The higher the Level: the smaller the population at that Level; the more plentiful the privileges; and the higher the Zeitprice.

5. A Provider Finder that is Quick for Buyer and Fair to Sellers.

To make category browsing less intimidating to consumers, algorithms continuously optimize both the category tree and the order of search results that each searcher sees.

6. A Conversation Scheduler that Works with the Calendar of Choice.

One embodiment of the invention indicates conversation conflicts it finds in the user's preferred calendar and enters conversation appointments and reminders in that calendar for the user (API-permitting).

Personas and Privacy: A system according to the invention can be implemented with secure communication; and so that a consumer's privacy is protected unless he or she has waived it. Thus, in a practice of the invention, the ZM platform has been configured to include the following aspects:

A real or fictional identity is represented by a persona that the member has created.

No persona is listed in any directory unless its owner chooses to make it visible either to everyone or to specifically designated members, including members qualified due to the non-refundable pre-payment of an amount matching the Zeitprice of the persona at issue.

Each member has the option in each invitation or conversation to choose any persona they own to represent them.

A member who can see another member's pseudonymous identity in a conversation, contact list, invitation, etc., will see that it is fictional but will not see the owner's true identity. Only the owner can enable another member's ability to see their true identity.

Certified professional providers selling services may not do so anonymously. Uncertified providers and normal members providing services may do so anonymously.

Normally, when a provider uses multiple personas, their purpose is to provide multiple services. Consequently, each provider's persona (not each member) is considered a unique provider.

Zeitprice: The upper limit price that each provider can charge consumers is called their Zeitprice. The provider may choose to charge the full Zeitprice to every consumer, to charge a discounted price to every consumer, or to negotiate a discount with each consumer individually.

The ZM platform publishes each provider's current Zeitprice and clearly indicates whether it is tentative or established. A provider who provides more than one service should use a different persona, a different Zeitprice, and a different discounted price for each service.

The Zeitprice algorithm uses a performance-based formula based on measured Success, not on biased and possibly manipulated public feedback. It does not use privacy-violating analysis of the content of communications and of the services provided.

Applications: Examples of ZM platform-based services include the following:

1. Real-Time Private Conversation Between Members Individually and in Groups

Any group of members who have specified each other as friends can communicate securely and (optionally) anonymously via text, images, documents, voice and live video, the ZM platform permits a large but possibly limited number of hours per month of free video communication among friends. All other communication services for communicating among friends are offered without restrictions limiting their use.

2. Fee-Based Services Rendered by Members to Members

Any member can provide fee-based services to one or more simultaneous clients via Real-Time Private Conversation.

The ZM platform helps potential clients find service providers, providing the ability to read their blogs and view other communications media before buying their services using actual currency in exchange for their time, knowledge, or services.

The ZM platform algorithmically establishes the Zeitprice of each provider, which is the maximum price per time unit that he or she can charge for real-time communication with clients, and for services performed offline with the consent of the consumer if the provider is utilizing the ZM platform time measurement features. Written communication is assumed to consume a fraction of that time unit and hence will cost only a prorated fraction of the Zeitprice. If the receiver is on the same Level as the sender, their expenses for exchanging messages balance, and both effectively pay only the applicable commission to the ZM platform.

The ZM platform collects fees from clients and pays the provider his or her fees, reduced by the applicable commission rates.

Examples of such commerce in time include:

(a) Professional service providers such as accountants, consultants, lawyers, physicians, tutors and investment advisors communicate with existing and potential clients. Clients can remain anonymous if they so choose but qualified professional providers will typically and may legally have to choose to be public and authenticated.

(b) Musicians, artists and other content creators can provide live performances in a one-to-one or one-to-many fashion for a fee which is collectively paid up-front by the students/listeners (participants). The fee paid by an individual participant is at the discretion of the provider. The minimum fee which must be paid by an individual participant amounts to the provider's Zeitprice divided by the total number of subscribed participants. The maximum permissible fee to be paid by each individual participant amounts to the Zeitprice of the provider.

(c) University professors and lecturers, scholars, and other professionals provide live lectures and online courses in a one-to-many fashion for a fee which is collectively paid up-front by the students/listeners (participants). The fee paid by an individual participant is at the discretion of the provider. The minimum fee which must be paid by an individual participant amounts to the provider's Zeitprice divided by the total number of subscribed participants. The maximum permissible fee to be paid by each individual participant amounts to the Zeitprice of the provider.

(d) Market research and online focus-groups. Consumers sell their attention to advertisers willing to pay to win prospective customers. Consumers can remain anonymous if they so choose but qualified advertisers may not.

(e) Communication between members who arm not (yet) friends such as headhunters contacting candidates for recruitment or members initiating a conversation with other members of interest to them.

(f) Providers such as software developers, chauffeurs, baby-sitters, utilizing the ZM platform time measurement features, either offline or online, work for time-based compensation.

(g) GlassWalking (wear Google Glasses or other Head Mounted Displays (HMDs) that transmit secure video to the customer)

(h) Secure publication of blogs and videos

Commercial Advertising

Message-Based Advertising: In one practice of the invention, a transactional platform according to the invention does not directly sell or display third party advertisements, and instead all visible participants who have opted in to this unique program can be targeted by message-based advertising (text, audio or video), provided the advertiser is willing to pay the fees associated with the communication, the price of which is determined by the Zeitprice of each individual receiver. In addition, verified participants may appear—at their sole discretion—using their true respective identities.

The receiver of an advertising message earns the fee that the advertiser pays the ZM platform, reduced by the commission charged by the ZM platform, but only if the receiver clicks on a link in the message in a verifiable way, or sends the advertiser a reply to which the advertiser replies. If the receiver is in the same Level as the advertiser, their expenses for exchanging messages balance and both effectively pay only the applicable commission to the ZM platform. If the receiver is in a higher Level than the sender, there is a net gain for the receiver. Companies advertising on the ZM platform will typically waive the cost of text-message-based communications to them in response to their advertising messages.

"Adversation" Sessions: One practice of the invention provides an alternative to text-message-based advertising, via a communications session referred to herein as an "adversation" session. An adversation session can be a video conversation between an advertiser and a consumer in which the advertiser pays the consumer to offer and discuss her reactions to a campaign, a product, a TV ad, a search results ad, etc. Adversations provide a new modality for advertisers to conduct market research on the Internet.

The Social Aspect

Social Platform: The ZM platform provides a platform and mechanisms for creating and maintaining private and public, personal and professional social networks. ZM platform members establish and maintain personal contacts with other participating members in either a personal function or to provide or obtain professional services, depending on mutual interests and/or corresponding service offerings, particularly with members outside of the user's personal circles.

Charitable Donations: Providers and other sellers of time may donate their proceeds to an approved and registered charitable institution. The ZM platform will donate its share of the proceeds, i.e., the commission to the same institution. In addition, the ZM platform can be configured to identify international charities that have been initiated by a VIP (Entertainment, Fashion, Business, Politics, Science, etc. of national as well international recognition) or which have a strong involvement by a VIP. It will engage in an educational campaign educating those non-profits on how to register with us and involve their community and donors in the game, as well as how to activate their VIP patrons and the admirers of those VIPs, how to create awareness for their ZM platform event on- and offline, and how to get the message out to the people who are potentially willing to spend the required sum on a conversation, lecture, or concert. The ZM platform will also track scheduled charitable VIP communications with PR and will provide a community billboard to help promoting these. The VIPs donate one or several conversations, lectures, or concerts in the ZM platform benefiting their preferred charity.

Other organizations can apply for registration to also be a recipient for donations. To benefit most, they should engage in the training to become an active "VIP conversation and event organizer".

It is key to educate charitable organizations about the process and empower them to promote their ZM platform event through social and general media on their own.

2. Technical Elements

Figure 2:
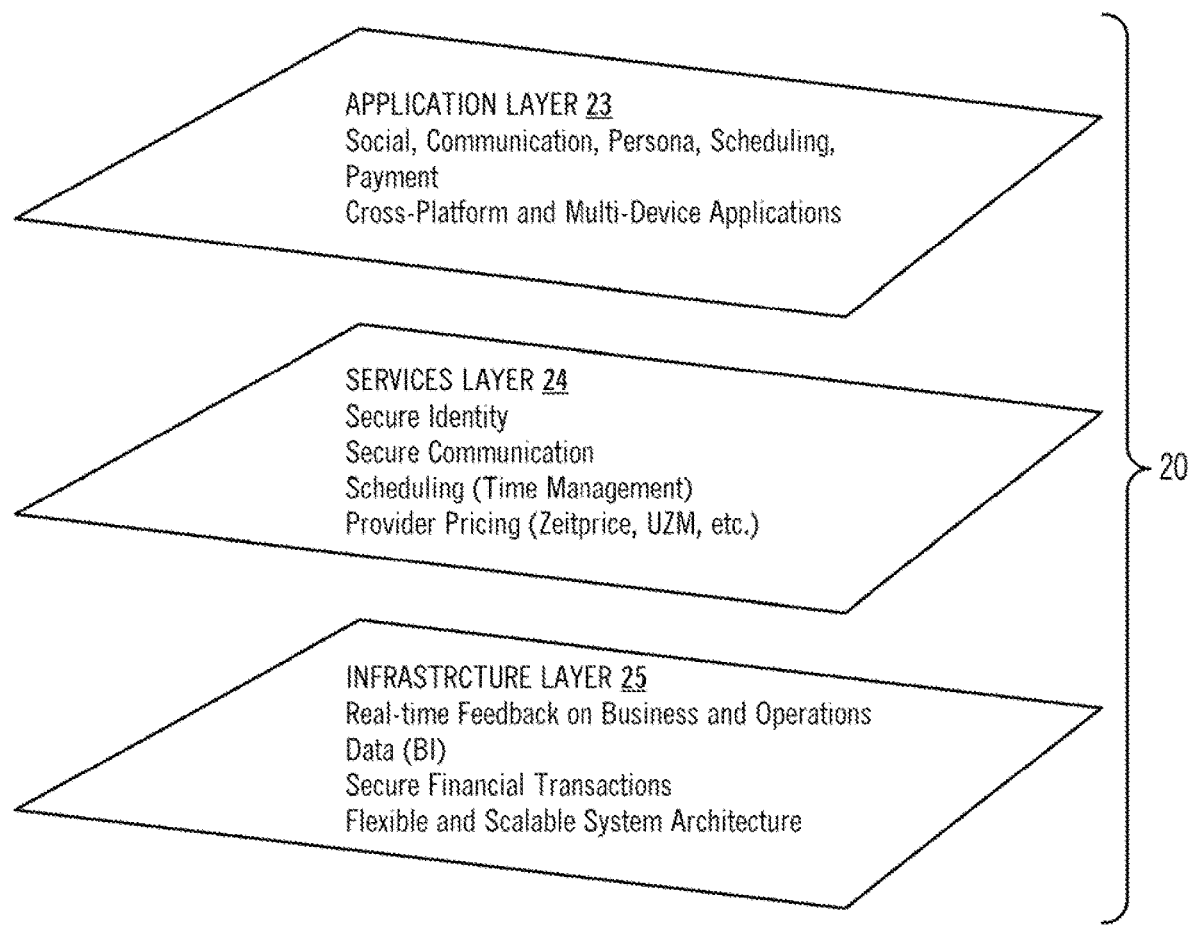
FIG. 2 shows a diagram of a three-layer architecture 20 for implementing the ZM platform shown in FIG. 1.
Figure 3:
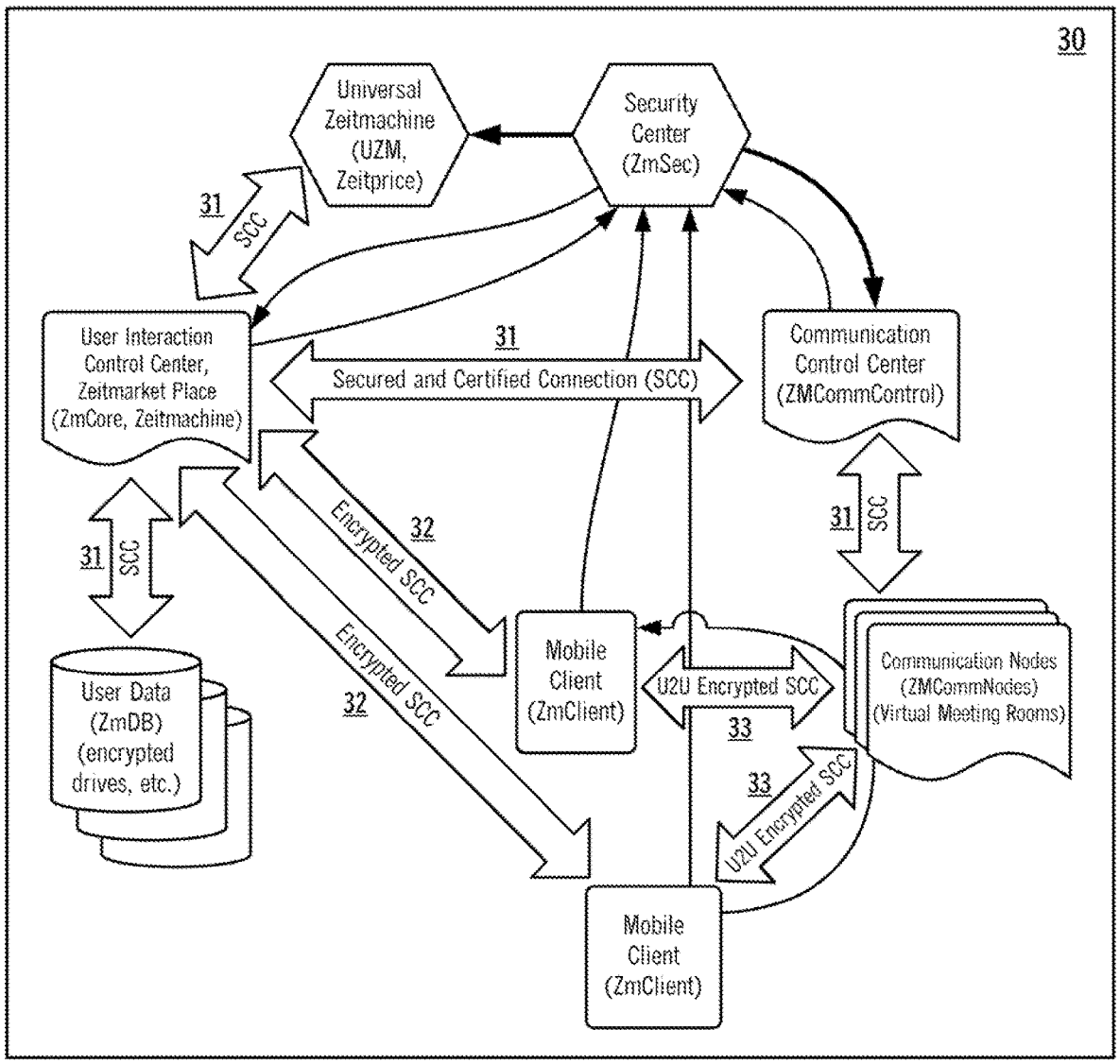
FIG. 3 shows a diagram of individual components of the ZM platform 30, including communications pathways 31, 32 and 33, Mobile Client modules 41, User Interaction Control Center 51, Universal Zeitmachine (UZM) 61, Security Center 71, Communications Control Center 81 and Communications Nodes 82.

The following elements will next be discussed:
Secure user database and directory;
Communication apps with strong end-to-end encryption (platform dependent) for text messaging and high-quality video (later to be augmented by a premium mode for virtual 3D telepresence);

Encryption/privacy infrastructure (best-in-class, utilizing public/private key scheme, key vaults, and the like);

Server (cloud) infrastructure for establishing and optimizing connections;

Social platform interfaces (depending on the platform: Facebook-plugin, iPhone/Android-App, Twitter-API); and Billing interfaces Platform Architecture FIG. 2 shows a diagram of an implementation of the ZM platform 20 according to an exemplary practice of the invention. ZM platform 20 comprises three functional layers: an Application layer 23, a Services layer 24, and an Infrastructure layer 25. FIG. 3 provides a more detailed, structural view, illustrating exemplary components of an embodiment of the ZM platform. In particular, FIG. 3 shows a diagram of individual components of an embodiment of the ZM platform 30 (see also FIGS. 4-9), including communications pathways 31, 32 and 33, Mobile Client modules 41, User Interaction Control Center 51, Universal Zeitmachine (UZM) 61, Security Center 71, Communications Control Center 81 and Communications Nodes 82. The communications pathways can include Secured and Certified Communications 31, encrypted SCC 32, and U2U encrypted SCC 33. As described herein, in various embodiments of the invention, these elements are functionally provided, in accordance with the invention, by computer software and/or digital processing hardware elements, operating in accordance with the invention. The digital processing hardware elements can be of conventional design and construction, including those found in commercially available enterprise-class servers, smartphones, tablet computers and the like.

In the illustrated practice of the invention, the same components are expressed at each layer. The platform components communicate with each other, using suitably secure protocols, including Secured and Certified Connection (SCC) 31, Encrypted SCC 32, and User-to-User (U2U) Encrypted SCC.

The Application layer 23 provides the following functionalities:

Social, Communication, Persona, Scheduling, Payment. Cross Platform and Multi-Device Application.

The Services layer 24 provides the following functionalities:

Software services for secure identity.
Software services for secure communication.
Software services for scheduling (time management).
Software services for provider pricing (Zeitprice, UZM, etc.).

The Infrastructure layer 25 provides the following functionalities:

Real-time feedback on business and operations data, i.e., business intelligence ("BI").
Secure financial transactions.
Flexible and scalable system architecture.

Platform Components

ZM platform Product Applications/User Experience

Figure 4:
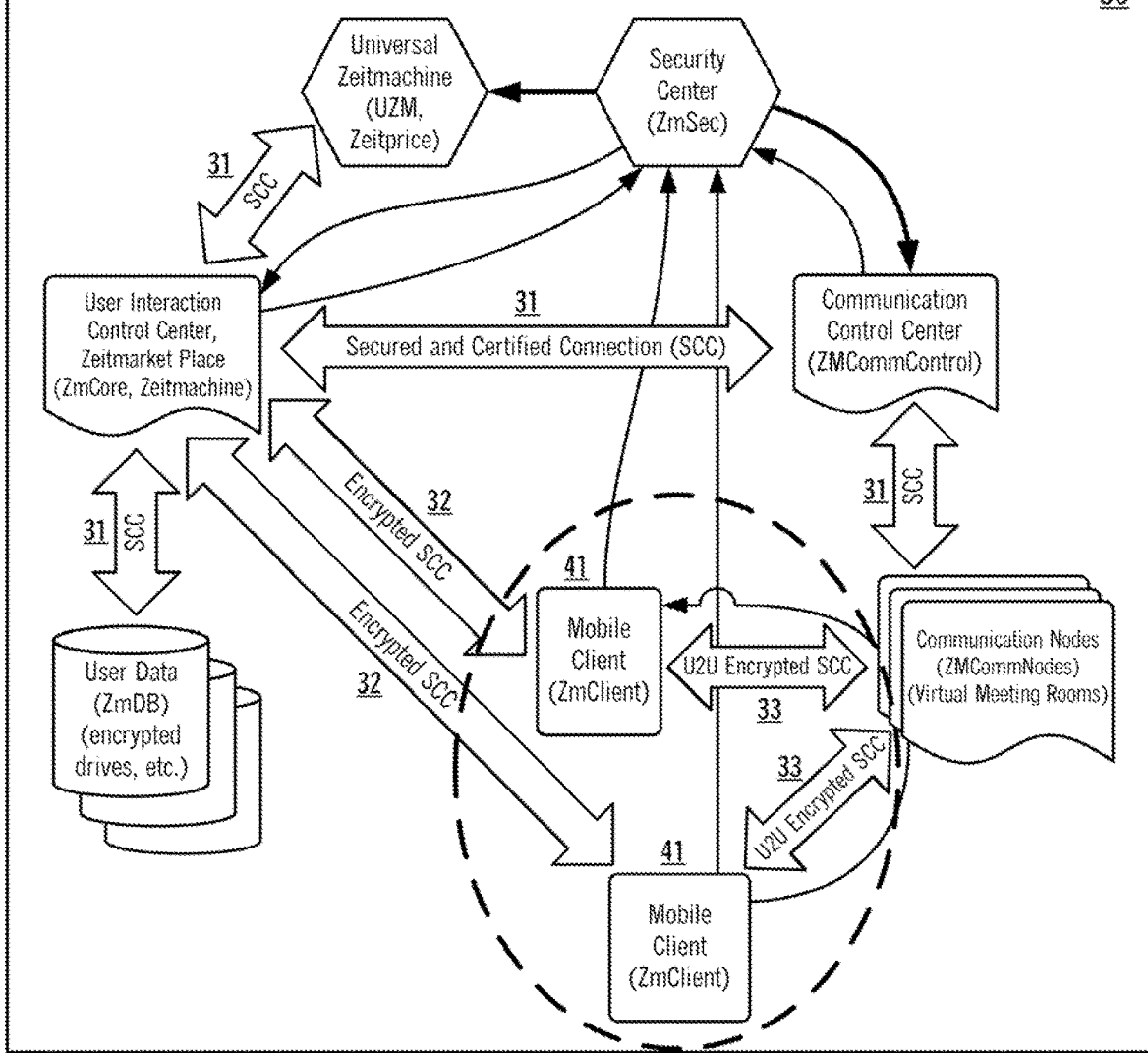
FIGS. 4-9 are a series of diagrams, in which the FIG. 3 diagram has been reproduced and marked to indicate individual ZM platform components and groups of components, including those relating to: User Experience (FIG. 4): the User Interaction Control Center (FIG. 5); the Universal Zeitmachine (FIG. 6); the ZM Security Center (FIG. 7); the ZM Communication Control Center (FIG. 8); and the Zeitmachine infrastructure (FIG. 9).

FIG. 4 illustrates those ZM platform components relating to product applications and user experience. As indicated therein, users can access ZM platform services on a mobile client device 41 through apps that run ZM platform client software. A typical mobile client device 41 will be a conventional smartphone or tablet computer. ZM platform client software, constructed using known software techniques to provide the functions described herein, can be implemented in accordance with known software techniques to run on Phones (OS, Android, Windows); Tablets (iOS, Android, Windows); and PCs (Mac OS, Windows, Chrome, Linux).

In an exemplary embodiment, the ZM platform utilizes "native" smartphone or other computing applications to ensure high performance and best possible utilization of specific device features. A balance can be struck, using known software and programming techniques for mobile devices, so that the user experience is consistent with other applications on that platform as well as that of the ZM platform app itself on other platforms.

Support is provided for emerging platforms and peripherals, such as wearable computing, an emerging area with significant relevance to the ZM platform. Google Glass and similar wearable video recording devices are a natural fit for video conferencing and potentially other services that would benefit from telepresence.

Users can access ZM platform services through apps that run ZM platform client software. ZM platform client software will run on: Phones (iOS, Android, Windows); Tablets (iOS, Android, Windows); and PCs (Mac OS, Windows, Chrome, Linux).

In an exemplary embodiment, the ZM platform utilizes "native" smartphone or other computing applications to ensure high performance and best possible utilization of specific device features. A balance can be struck, using known software and programming techniques for mobile devices, so that the user experience is consistent with other applications on that platform as well as that of the ZM platform app itself on other platforms.

Support is provided for emerging platforms and peripherals, such as wearable computing, an emerging area with significant relevance to the ZM platform. Google Glass and similar wearable video recording devices are a natural fit for video conferencing and potentially other services that would benefit from telepresence.

User Experience Goals: The contents and layouts of most screens in a ZM platform app depend on the host OS, the means of pointing and the size of the device's display. Devices with smaller displays show fewer simultaneous UI elements.

Home Screen: The Home Screen can be implemented to be sparse, except for frequently-used graphical user interface elements that a user has chosen to appear upon login. There are never more U elements visible on the screen than absolutely needed at any time. The home screen components of a desktop ZM platform client may include the following (mobile clients often display less):

Links to access Account Settings and Help and Support;
Search bar with links to advanced search options and the persona directory browser,
Timeline calendar/Communication log;
Text message view;
Identity bar indicating the persona the user has selected to represent him or her;
The collection of personas belonging to other users that this user has contacted while assuming the current persona identity (displayed in the identity bar)—i.e., the context container;
The collection of personas owned by the user—A visual indicator appears when a message or call is being received by a particular persona and gives the user the option to answer the call; and
A "marketing strip or banner" that displays featured personas to aid the user in discovering services offered by other users, promote ZM platform events and disseminate ZM platform related news. The user has the option to hide this.

Accounts

Users, Members and Subscribers

A person who wants to use any feature of the ZM platform other than read-only searches of the persona/provider directory must create an account and specify at least one payment method (credit card. Apple Pay. PayPal, etc.) for identity verification purposes.

In this document, a user without an account is called a visitor. A user who has registered an account is called a member. A member who pays a recurring subscription fee (which may be zero) is called a subscriber. Subject to the introduction of subscription fees, a member who is not a subscriber is either a "trier" (if participating in a full-function time-bounded free trial) or a visitor.

What the ZM platform knows about each member's true identity is (a) the real name on the payment account that the member used most recently to transact financially with the ZM platform and (b) other identifying information that the member has voluntarily provided to the ZM platform. The "other identifying information" in a user's identity may include such attributes as gender, age, relationship status, geographic location, occupation, hobbies, professional licenses, education, work history, social network handles, etc. With such optionally provided information, the ZM platform can do a better job of matching providers and consumers, certifying the initial Zeitprice, recognizing friends eligible for free videoconferences, etc.

Privacy Assurances

Each item of identifying information in the member database is marked by the ZM platform as either verified or unverified.

Subject to exceptions required by law or explicit and active consent by the member, the ZM platform never discloses member information (verified or not) to advertisers or other entities inside or outside the ZM platform. The ZM platform collects such information to enable users to log in, pay, be paid, receive reminders, see relevant search results, display bona fide credentials to clients, and other actions that members joined the ZM platform to perform.

Account Creation: In one embodiment, to register as a member, a visitor must provide:
- A unique user name for use by the member and the ZM platform use as account identification.
- A user-chosen password of sufficient strength.
- One or more pieces of contact info, e.g., email address, text-capable phone number, social network ID, Skype handle, etc.
- One or more financial account ID's (PayPal, bank account, debit card, credit card, Apple Pay, etc.) and the accountholder name on each.
- The company will debit a designated account when the member owes the ZM platform money and will credit a designated capable account when the ZM platform owes the member money.
- Details such as which credits/debits are made on a monthly or daily schedule and which are made at the moment that fees are incurred will be decided at a later time.

Terms of Use: In a typical setting, the ZM Terms of Use (TOU) would be displayed to the user during registration. The user can access the latest version any time through the help and support links. The contents of this document include, but are not limited to, the following:
Statement regarding prohibition of criminal activity.
Individuals are limited to a single ZM platform account.
Business entities are considered separate from individuals so that a person can have a separate account for a business, provided the account is in the name of the business, not the individual. A business account is a meta-account, bundling the services of staff members in the form of their staff member business persona accounts, each under the umbrella of the employing business.

Fee schedule.

Account Settings: The ZM platform client provides a means for users to specify preferences related to their account, including the following:
Credit card billing info:
Email address and other contact info;
Password changes/account recovery settings/multi-factor authentication preferences; and
Time zone—with an option to update automatically based on information from the device running the client. The ZM platform uses UTC internally, but displays local time dynamically in the client user interface.

Users also have access to usage information related to their account, including:
Account monetary balance, measured in the user's local currency
Account communication balance, measured in hours and minutes
Earnings report and accounting for proceeds received from other users
Overview of all personas owned by the user, their current Zeitprice and their current asking price (usually the same or lower)

Users must not create multiple user accounts (a violation of the ZM TOU).

Users are not required to provide a credit card or other form of payment to open an account, but their activity as a visitor will be limited to browsing the persona directory.

The ZM app can be localized, but user-generated content such as messages, comments, and blog posts will appear in the language of the user that created them.

ZM Platform Services

User Interaction Control Center (ZmCore, Zeitmachine, ZmDB)

Figure 5:
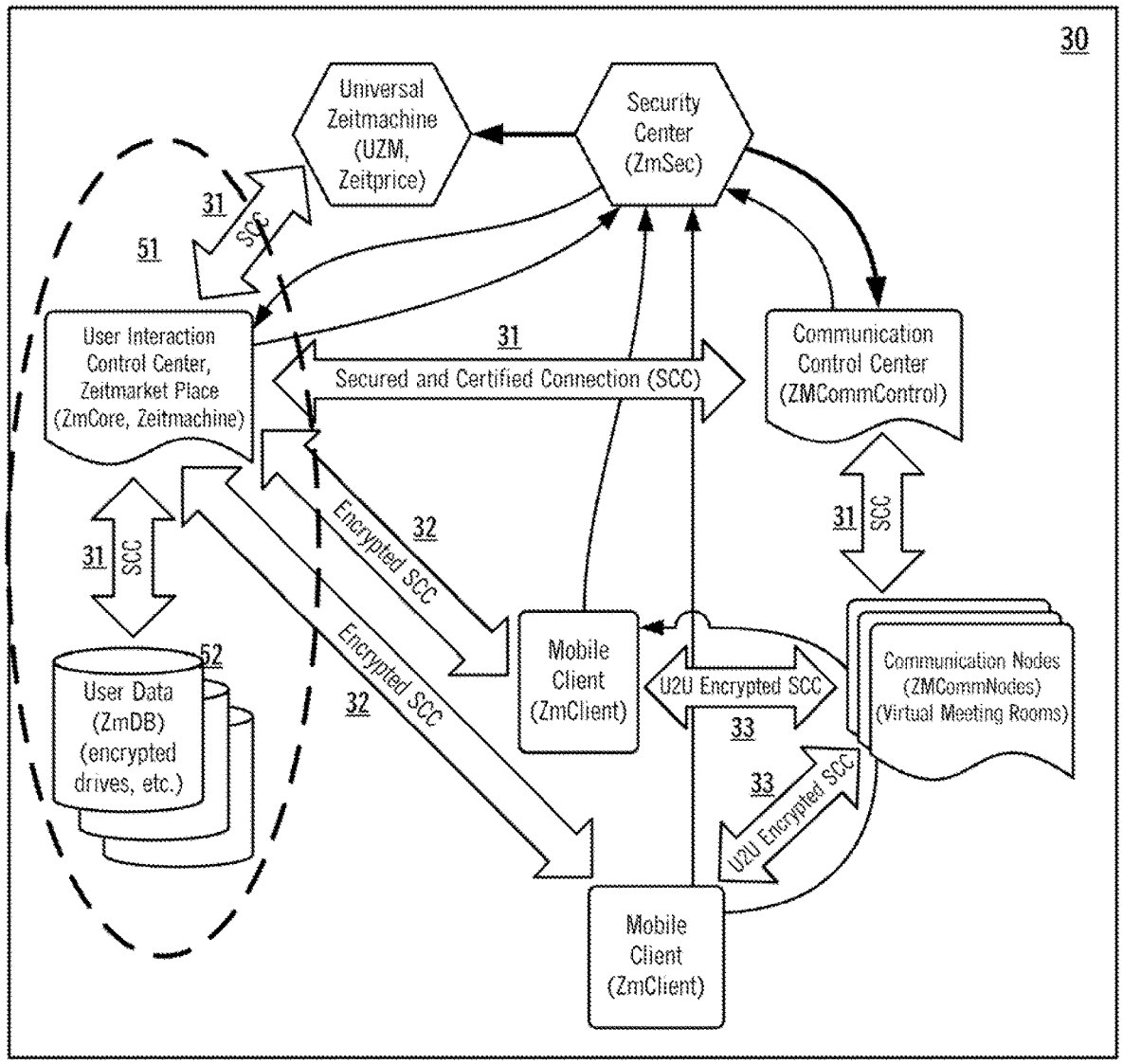

FIG. 5 illustrates those ZM platform components relating to a User Interaction Control Center (ZmCore, Zeitmachine) module 51 and a User Database (ZmDB) module 52.

The ZM platform comprises a suite of cloud-based services. The services support the creation and management of secure identity, communication, scheduling and pricing.

Personas and Providers

Personas: Users of ZM platform interact with each other exclusively via personas. A persona represents a real user or a fictitious character. The ZM platform strives to conceal the relationship of fictitious personas to members. Each member can choose to expose their true identity through a persona or remain anonymous. At least one persona is required to represent a ZM platform user, although they have the option to create any number of additional personas.

A persona name has two parts:
<short name> <disambiguating characters>

The full name of a persona P1 must be unique across the service.

The short name alone need not be unique across the service or among the member's personas. But for esthetic reasons, the short name can be displayed alone to another persona P2 whenever there is no other persona with that short name connected to P2 (and thus no ambiguity). Disambiguating characters can be suggested by the ZM platform. The short name can be the persona owner's real legal name (the name on a verified financial account or government-issued ID) or a pseudonym of their choosing. In important contexts such as search results and invitations, every persona name is badged as:
"Real Name" if verified as such or
"Fictitious Name" if so desired (no verification required) or
"Possibly Real Name" if in process of verification or
"Likely Fictitious Name" if unverifiable.

Providers: A provider is a persona that offers a service to other personas. A provider can both sell their own time and buy other people's time in private conversations. Any user can be a provider with any of their personas.

Like any persona, a provider can choose to remain anonymous. We encourage and expect the vast majority of professional providers to identify themselves in a verifiable way to potential customers.

A certified professional provider is a persona that offers a service to other personas under his or her real name and the professional qualification of such provider has been certified by the ZM platform.

Profiles: Each persona has a profile with standard fields and optional elements, such as a description, a picture and a blog. The blog allows the persona's owner to discuss topics of interest as well as describe any services that the persona offers as a provider.

Identity Disclosure: A persona may reveal a user's true identity or provide the user with anonymity. The choice is up to the user and is revealed to viewers of the persona. A persona representing a real user will be labeled as such when viewing the persona's profile. A graphical "badge" identifies verified properties of a persona.

The verification process can produce different levels of verification—i.e., verification "strength". One item of verification, such as a credit card, produces one verification "bar". Two items produce two bars, and so on.

Possible verification points include:
Credit Card
Facebook
LinkedIn
Other social networks or services approved by the ZM platform
Referral by other trusted and identified members of the ZM platform Additionally, the ZM platform will provide a higher level of certification for celebrities and VIPs, which may involve ZM platform staff performing actual research. This level of certification can occur at the sole discretion of the administrators of the ZM platform.

Service Categories: A user can create personas to provide services in different categories (e.g., music instruction and automotive repair).

A user cannot seek clients for a provider they own until that provider's persona has been tied to a specific profession by the selection of professional category keywords (e.g., "Legal, Health, Education, Entertainment"). A small number of category keywords (limited to around 20 for each persona) can be chosen from a much larger set of suggested choices and/or categories that the user invents.

A user who wants to deliver content in multiple related categories can construct a constellation of personas linked through blog comments. This allows content to be separated by topic (and individually ranked), but still linked for cross-marketing purposes.

Provider Verification: In addition to the usual identifying information, a provider can present to the ZM platform administrators, his or her professional licenses and other credentials. Providers who provide services that do not require credentials can attest to their experience and provide the ZM platform with supporting evidence. If satisfied, the ZM platform will place an unforgeable badge in the provider's profile with an appropriate label like "Credentials Verified" or "Experience Verified" in distinctive type. The ZM platform can revoke the badge if the supplied information expires or is deemed to be fraudulent.

When the ZM platform has verified the provider's qualifications, it agrees to set the provider's initial Zeitprice to their standard off-line hourly fee, or to the Zeitprice of the third Level if these fees are not known or lower than the Zeitprice on the third Level.

Condition-Based Availability: A subscriber can adjust a setting to indicate whether an owned persona is willing to enter into a conversation when that subscriber is not already scheduled on the ZM platform and other conditions are met.

Availability conditions in the settings of a subscriber's persona:
available anytime
available if using this device
available now
unavailable Availability conditions in a future time slot of the subscriber's calendar:
available
available if using <device name> device
unavailable ZM Platform Directory The ZM platform Directory is a user view of the persona database. A search function allows users to search for user-owned personas and providers based on search term(s) that they specify. Advanced options allow users to further refine their search; for example, a search option allows users to filter results to display only personas with an "available now" call status.

Server-based data analysis: in addition to searching, users (represented by one of their particular personas) can browse a centralized directory of public personas organized by category. When privacy settings allow it, real-time information about each persona is displayed to indicate their call status (e.g., online and accepting calls). The communication cost for the persona is also displayed.

Options to browse the ZM platform persona directory with sorting and filtering (by topic, Level, etc.) help the user to discover other users and their services within the ZM platform network. Additionally, users are able to access existing contact/friend lists from email and other social networks and invite those friends to join the ZM platform.

For part-time service providers (and/or those with irregular schedules), the persona directory browser can match them with consumers looking for their service. The search function of the persona browser can be used to search for particular categories of service at particular times. For example, students in need of help can be instantly connected with a tutor on demand. This allows qualified individuals with some free time (but possibly irregular schedules) to become tutors by connecting with in-need students in real-time.

Entries in the database ensure that a persona is only visible to certain specified personas when searching or browsing the ZM platform directory. The persona can specify visibility to the general public, all friends, every persona whose Level is the same or higher than theirs, an explicit list of personas or even a single anonymous persona.

Saved Contacts List: Through directory searching, directory browsing, a ZM platform invitation, or a received communication using social media or email, a member may discover a persona of interest. The member may add such a persona to a list of saved contacts. There is a separate such list for each of the member's personas.

Recent Contacts List

Whenever a member communicates with a persona, that persona is automatically added to a visible list of recently contacted personas. There is a separate such list for each of the member's personas.

Scheduling

Calendar. The primary activity of a ZM platform user is to initiate, schedule and engage in audio/video communications between one of his or her personas and personas of one or more other users. In many cases, this requires arranging a meeting time in advance. The ZM platform app facilitates this by providing its own secure calendar, stored on the server. The calendar system provides tools to ensure that personas aren't double-booked, reconciling all the various appointments within all of a user's personas The calendar provides a place for users to designate time within their schedule that is available for the ZM platform. For some providers, a public reservation system (like those often used by hotel websites) may be appropriate, where blocks of available time are publicly visible to users. Other providers may wish for their schedule to remain private and do not want to publish it, in which case prospective clients will request an appointment time. Publicizing available time allows potential customers to search for providers available at a particular time slot.

Calendar Settings: When persona owners block out available time, they are also able to specify a priority for the time slots to indicate which times they would prefer to be booked first. This priority is expressed by three options:

Best—The persona would prefer that these slots are booked first.

Good—The persona is basically neutral with respect to these slots.

Acceptable—The persona is available for these slots, but would prefer other slots to be chosen first.

Unavailable—Used to explicitly exclude time blocks from the ZM platform

Timeline: The calendar also functions as a timeline in the sense that it provides methods exclusively and privately to a persona's owner to access that persona's activities in the ZM platform, including text messages and video/audio conversations, (but not any access to text/video/audio content—exclusively metadata), providing a unified log of communication within the ZM platform network. The timeline can be traversed both in the future and the past to enable review of everything the user has done per persona and has scheduled to do in the future.

Figure 6:
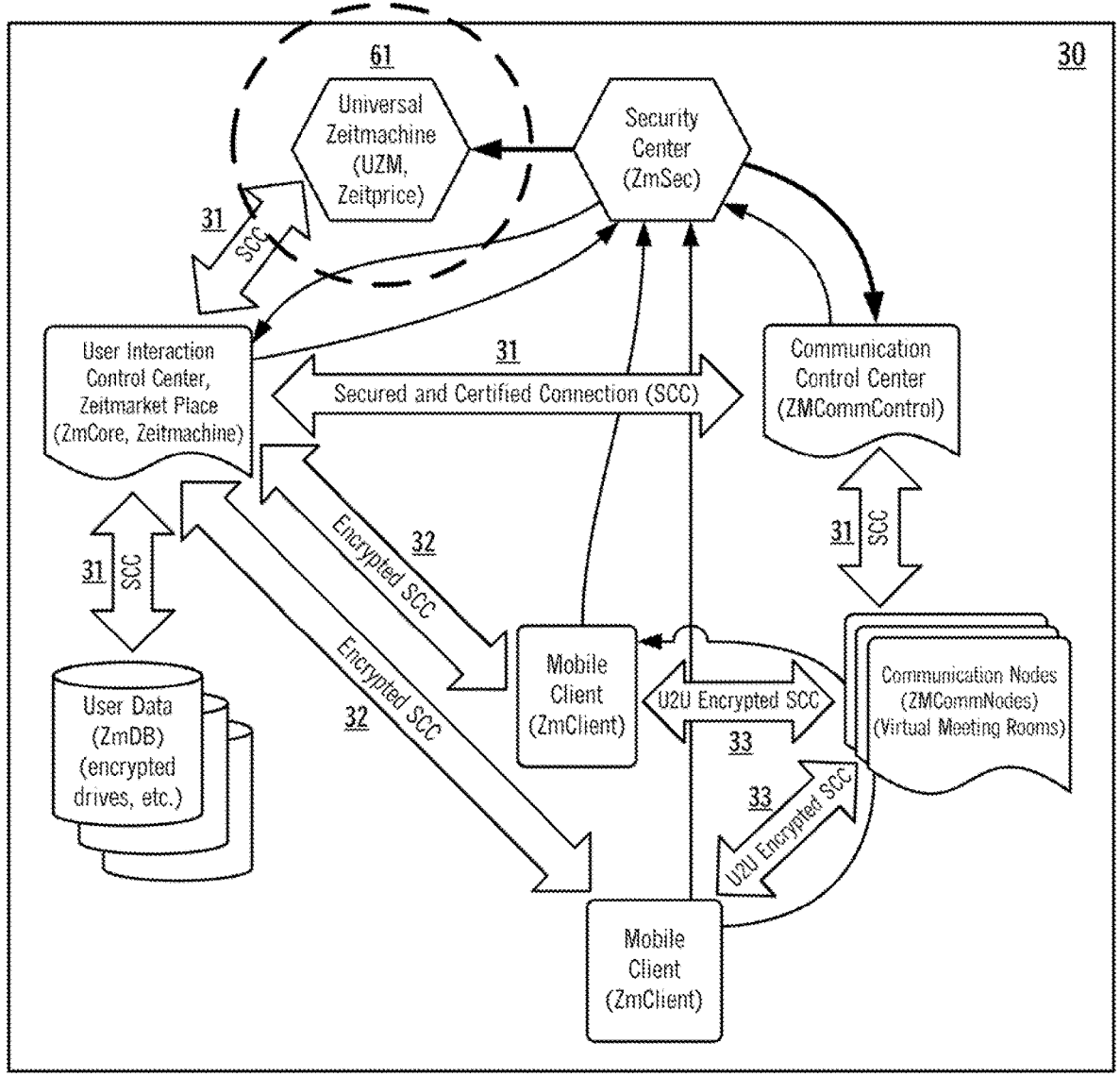

Universal Zeitmachine (UZM) and Zeitprice: FIG. 6 illustrates those ZM platform components relating to the Universal Zeitmachine (UZM) and Zeitprice modules.

The Zeitprice is determined by a server based module called the Universal Zeitmachine. It implements the Zeitprice determination based on data provided by each member's individual Zeitmachine, as described in greater detail elsewhere herein.

Figure 7:
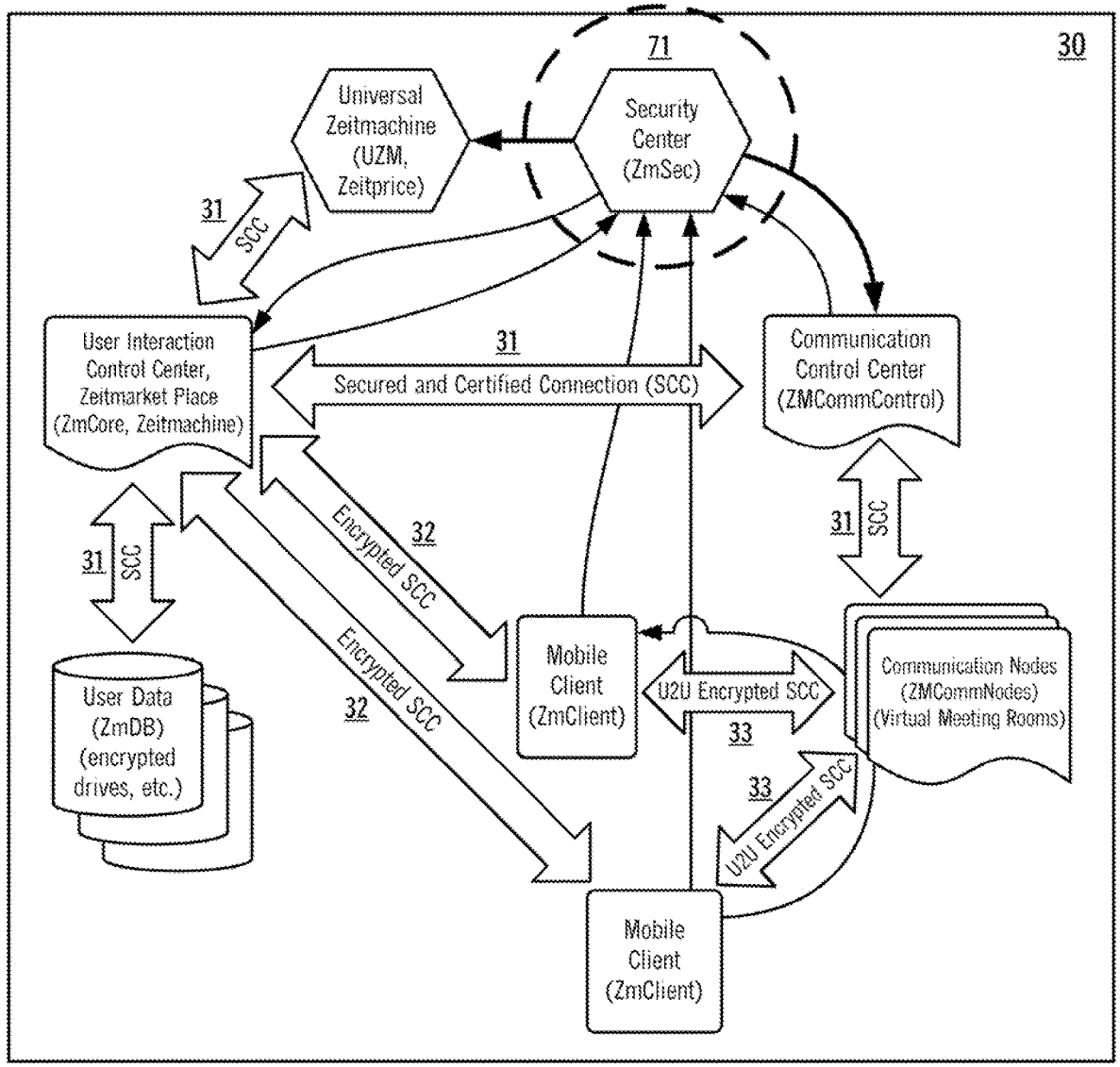

Security (ZMSec): FIG. 7 illustrates the Security Center (ZmSec) module 71 and its relationship to the other ZM platform components.

Encryption and Privacy Features

In an exemplary embodiment, the ZM platform is configured to provide high security for the transmission of personal data, including protection from digital eavesdropping and data analysis. In particular, in such an embodiment, all network communication is encrypted. Communication with the ZM platform infrastructure is implemented through SSL/TLS with a certificate hierarchy in place (not necessarily rooted at a public certificate provider).

Communication with other users is implemented with a public/private key scheme, where the keying-material never leaves the user's device. A key vault for recovering key material is provided.

The user has complete control over the personal information displayed by their persona(s). The user can choose a fictional name for each persona or choose to use their real name. No information will be taken from the user's account settings and exposed by the persona without the user's explicit consent.

In general, the ZM platform treats all of a user's information as private by default.

There are different aspects of persona privacy, as follows:

1. Listed, visible and accessible in the ZM platform directory—The owner of a persona can instruct the ZM platform to include it in the directory ("Listed persona") or not ("Unlisted persona"). An unlisted persona cannot be viewed or interacted with (e.g., send a message or request a meeting) unless the persona owner grants specific permission. An unlisted persona is effectively cloaked and is not visible or accessible to a non-approved persona by any means. New personas are unlisted by default.

2. Anonymity—an anonymous persona does not reveal the actual user. Anonymity is independent of visibility and accessibility. A cloaked persona may reveal the user (perhaps the reason it is cloaked) or not (anonymous users discussing private topics). New personas are anonymous by default, but a verified persona cannot be anonymous.

An unlisted persona is only visible to other personas that have been specifically designated by the unlisted persona owner. It is never possible for a third party to expose an unlisted persona to another user in the ZM platform without the owner's consent.

The owner of a persona (listed or unlisted) can choose to permit or block visibility to other personas who they specifically designate or to all personas in a specified range of Zeitprice Levels below and up to the Zeitprice Level of his or her respective persona. A blocking persona appears to be both unlisted and cloaked to the blocked persona.

Visibility of a persona in a higher Level can be enabled for a lower rank persona wishing to see the higher-Level persona by obtaining enough non-refundable credit in advance to purchase at least one hour of services or video communication with the higher-Level persona.

The ZM platform UI facilitates references to personas by providing a UI widget, such as a capsule, that displays the persona name and links to the persona profile. These references can be embedded in messages, persona blogs, etc., but references to unlisted personas are only visible to those personas designated by the unlisted persona owner. To a non-privileged persona, the capsule of an unlisted persona is blank (or labeled "unlisted" or equivalent).

Communication Services (ZmComm, ZmCommControl, ZmCommNodes)

Figure 8:
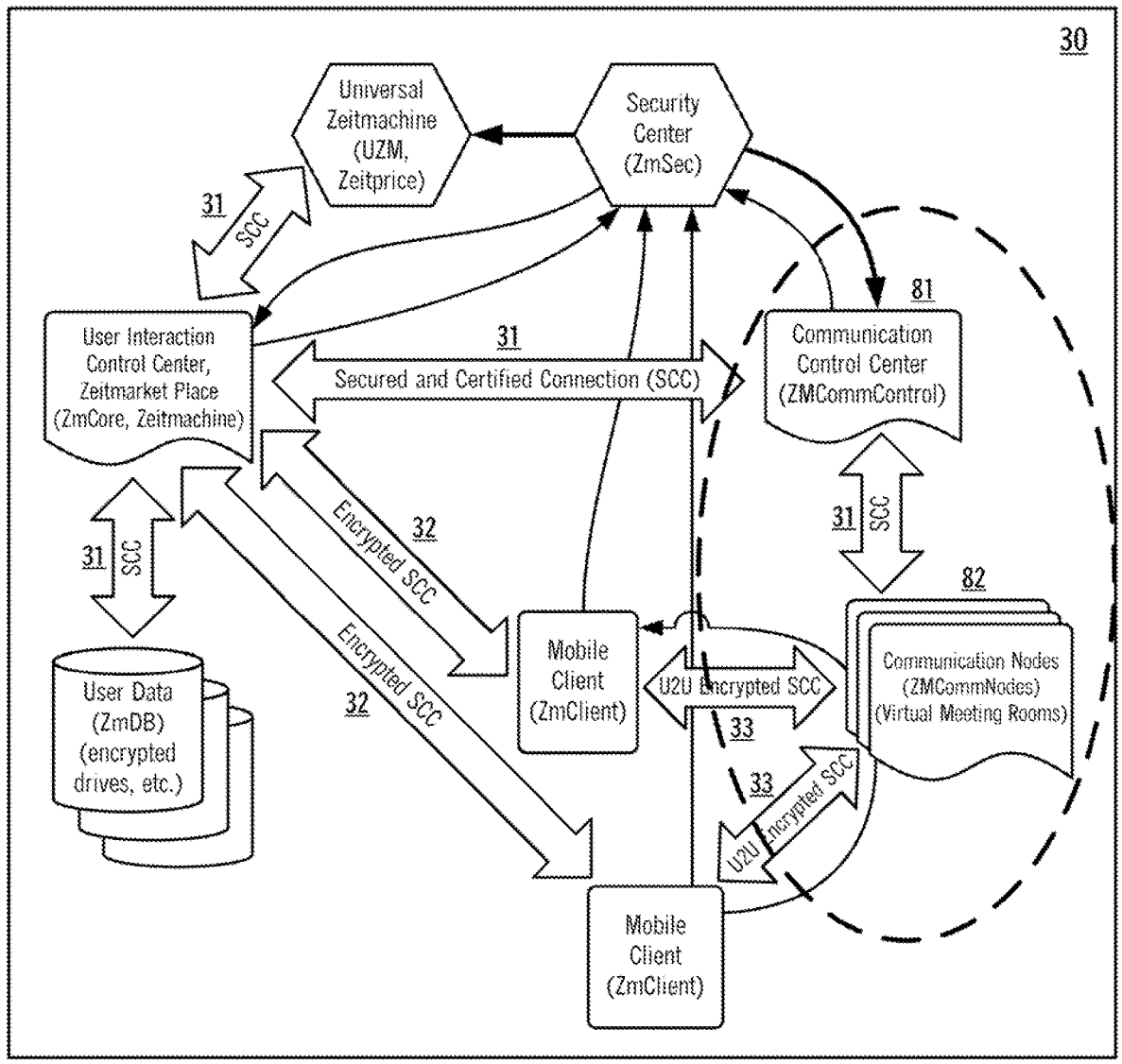

FIG. 8 illustrates the Communication Control Center (ZMCommControl) module 81 and the Communication Nodes (ZMCommNodes) module 82 and their relationship to the other ZM platform components.

The ZM platform communications infrastructure integrates the following features in the best possible manner for each hardware platform:

Communication encryption/privacy settings

Billing details

Personal contact list

Text-based conversation and its history
High-quality audio and video chat and broadcast
Document sharing While the primary focus of the ZM platform is interactive video chat, there are additional tools and communication media that complement it:

Shared white board
Auxiliary interactive graphics such as charts, graphs, including interactive 3D graphics.
The ability to share the user's screen, or window of another application.
Real-time text-based chat
Check-in and check-out time-stamp mechanisms to measure and quantify off-line activities performed as a service by a provider.

For example, a user who has created a persona who offers a consulting service might conduct a video training session in which they utilize a white board to illustrate their points and an interactive/animated 3D model to display complex spatial relationships.

Communication Quality: The ZM platform of the invention described herein requires that the user has access to a network connection of suitable quality to support ZM platform services, although this is not always under the control of the user. In some cases, the quality of a connection may change over time (e.g., a temporary degradation due to high network traffic). A connection that appears to be working may at some point during the conversation degrade to the point where it can no longer support audio or video for a period of time.

The ZM platform client informs the user of the status of the network when relevant. For example, if it is unable to maintain the current services it is providing to the user.

The ZM platform client will endeavor never to drop a connection. The ZM platform can be configured to default to a condition in which, unless a communication partner explicitly ends a call, the call should remain logically connected. If the network connection is lost, the ZM platform will attempt to reconnect the user or restart the call when the network connection is restored. If the network connection is lost for a certain period of time, the user will be prompted before an active audio/video stream is reopened.

When a network connection is lost, the ZM platform client that was dropped will inform the user (via audio in the case of a voice-only call). Other participants on the call will also be informed that a member was lost. In the case of a voice-only call this is critical because there is no other way for the user to know they were dropped and may continue speaking as if they are still addressing other members in the call.

During a Video Conversation:

Best video/sound quality is achieved with respect to the available network infrastructure. Quality feedback is used to optimize the data rate. Images of participants who are currently speaking are updated at higher frame rates than images of listeners.

Video/sound is provided in any imaginable networking infrastructure (NAT, proxy, 3G/4G, WiFi).

The actual video/sound transmission is to be hidden as well as possible from network providers to allow for communication in restricted environments (VPN).

Network communication inside the VPN follows well-proven industry standards (e.g., SIP).

Privacy Aspects: In an exemplary practice of the invention, all network traffic is strongly point-to-point encrypted. Care is taken that no private information (i.e. call logs or similar) is stored for longer than absolutely necessary to provide an adequate amount of time for customers to review their invoices, for the company to comply with applicable law, and for other unavoidable reasons that may arise.

In an exemplary embodiment, the content of a real-time communication between users stored in not stored by the ZM platform.

Text messages are stored in a format encrypted with keys held only by the sender and recipient. Text messages are stored for the minimum amount of time possible, until retrieved or deleted by the client.

Communications

Video Conference: At least one view displays incoming video, and an optional smaller view shows the outgoing video. In the case of multi-user (>2 users) conferences, lectures, or performances such as concerts, additional views are provided for each of the participants. The user has the ability to customize the video view layout to suit their needs/preferences, dependent on the capabilities and form factor of the device. Automatic face-tracking and attendee cropping maximizes the number of tiled user windows for the scale of the device used.

Text Message: The user is able to read and compose text-based messages. Views and controls are available to: browse incoming messages, compose responses as well as new messages, delete messages, attach an image or PDF file to a text message, and search through messages.

Standard messaging commands (Read, Reply, Forward, Delete, Compose, Edit, Attach, Send, and the like, although not necessarily with those names) can be provided to allow users to manage their text messages. The text message view displays messages sent to or from the user's currently-selected persona, and the label for that persona is displayed in the identity bar. The user can browse a list of message threads and expand each one to reveal the message thread contents in chronological order. The Calendar/Event timeline provides a global view of all messages in chronological order.

ZM Platform Infrastructure

Figure 9:
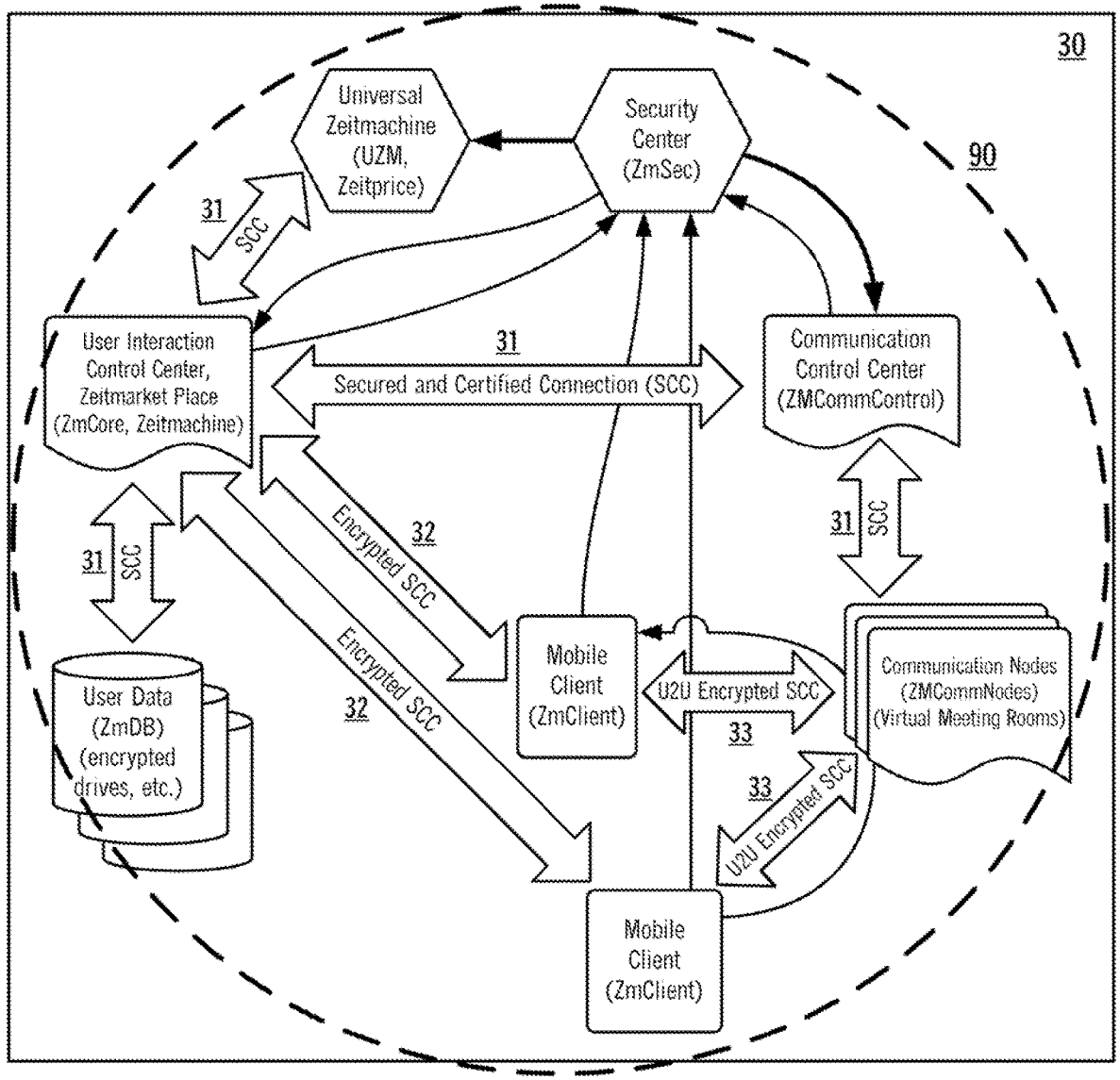

FIG. 9 illustrates the ZM infrastructure 90, which relates to all of the ZM platform components.

Server/Cloud Infrastructure for Telecommunication: Video chat communications are often implemented on the Internet as peer-to-peer communication, but this introduces some disadvantages:

Privacy is reduced as the communication partner can be derived on network-provider level by evaluating IP traffic.

NAT and proxy transversal is a complex real-world problem.

Latency can be better optimized between local infrastructure nodes than between any two end users.

Thus, the ZM platform is based on a cloud-based network of infrastructure nodes that serve as a local point of connection and bundle all traffic to the corresponding node local to the communication partner, where "local" means as local as the nearest cloud infrastructure is to the respective user.

Figure 10:
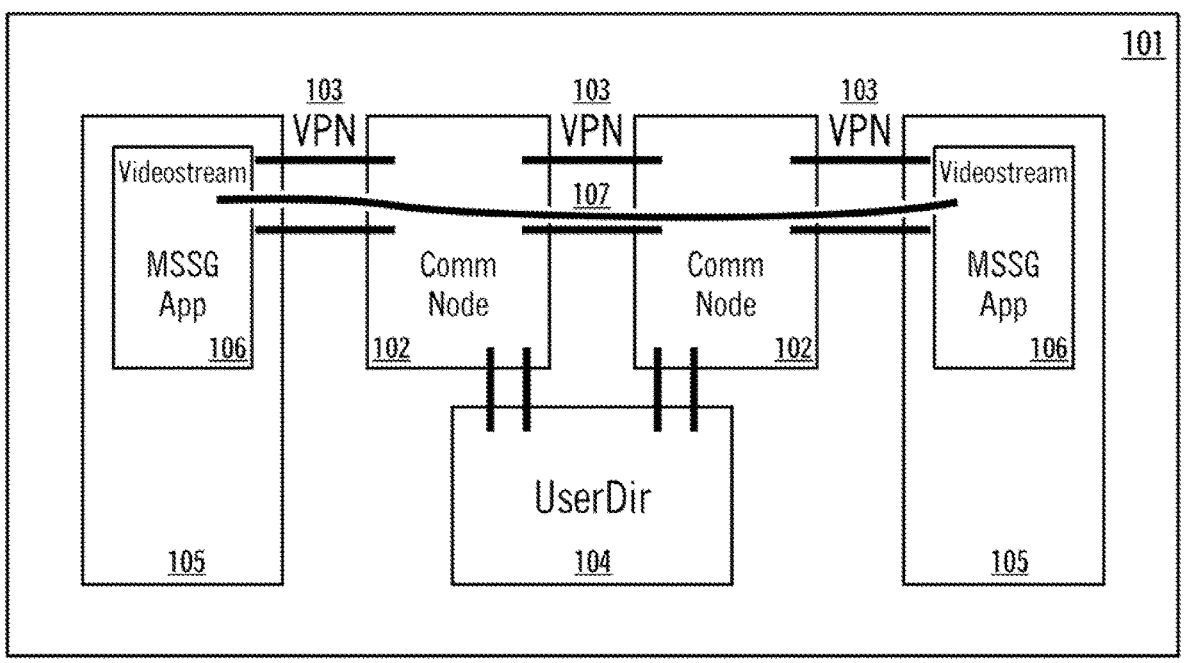
FIG. 10 is a diagram providing a schematic illustration of a practice of a server/cloud infrastructure according to an aspect of the invention.

FIG. 10 is a diagram providing a schematic illustration of the server/cloud infrastructure 101. Infrastructure 101 comprises a plurality of communication nodes 102 that provide respective connections into a virtual private network (VPN) 103. VPN 103 includes a local provider directory "UserDir" 104 and a plurality of remote mobile clients 105, running a suitable messaging app 106 that include videostream capability 107. The depicted infrastructure supports "virtual meeting rooms" and like functionalities.

Zeitprice

Purpose: A principle of the ZM platform is that people's time has value for which they should be compensated when spent on someone else's behalf. To accomplish this, the ZM platform provides a marketplace where an individual's time can be bought and sold. The ZM platform continuously or periodically calculates the market price for the time of each persona called the Zeitprice. The Zeitprice is the maximum chargeable price per time unit for a particular persona.

One of the goals of the Zeitprice is to solve the trust issue of "How do consumers trust providers?" Specifically, the goal is to reduce the risk people perceive in making a purchasing decision.

As any change of the Zeitprice is based on the behavior of the users of the ZM platform, the way it changes should be extensible and simple.

The Universal Zeitmachine algorithm collects sales data (time slots offered, time slots purchased, prices paid) from the individual Zeitmachines and uses them and other factors (e.g., vacations) to calculate Success, a metric value that rises when a provider fills more time slots with higher-paying customers. Given the provider's current Level and their recent Success, the algorithm decides whether to raise or lower the provider's Level or leave it alone. On each Level, there is a Zeitprice.

A new underpaid provider may ascend a Level every week and then settle into a Level for many weeks, months or years before rising further or slipping down the scale. The difficulty of earning a higher Level may be dialed up or down by management to maintain a target percentage distribution that works best for consumers, providers and the ZM platform.

Zeitprice Impacts: The ZM platform, in an exemplary embodiment, treats the time of its users as valuable and potentially entitled to compensation, regardless of whether the user intends to offer a specific service on the ZM platform. All types of communication within the ZM platform, whether real-time audio/video/text communication or offline messaging, or offline work utilizing the ZM platform's time-stamp mechanisms, incur a communication fee based on the target persona's Zeitprice. The recipient of the communication usually receives this fee (minus the applicable commission retained by the ZM platform) to compensate him or her for his or her time.

The Zeitprice of the provider(s) in a real-time communication session defines the maximum price of an hour-long session. The price to send a text message compensates the persona for the typical time it takes for someone to read and respond to a message. That price is tied to a persona's Level and may be weighted based on the size of the message. While composing a message, the ZM platform client app displays real-time feedback to the user indicating the communication cost.

For example, a service-providing persona can send a message to a listed persona promoting their services, but must pay the associated communication fee. At the same time, the ZM platform encourages meaningful responses to messages. The receiver of a message only receives revenue for reading and responding to a message if the original sender eventually replies to the receiver's first response.

The instigator of communication (e.g., the sender of a text message) usually pays the fee and the targeted receiver of the communication has the opportunity to earn revenue. A persona can start a real-time communication immediately (based on availability) or schedule an appointment. The ZM platform client application provides a process to schedule an appointment, which includes the ability to specify which participants are service providers (and potentially earn revenue) and which are consumers (and share the fee). The appointment negotiation process also allows the amount of the fee to be negotiated (if allowed by providers).

The Zeitprice defines the maximum fee per time unit paid by an individual consumer of services or content, but personas can offer a lower communication or content delivery rate if so desired. As noted above and if allowed by a provider, the appointment request form provides a means to request an appointment at a rate lower than the Zeitprice. The appointment is only confirmed if the provider and all participants agree to the terms. Additionally, the persona's owner can decide in advance to offer rates lower than her Zeitprice to all or a subset of ZM platform users, for example to an audience of viewers of a lecture, performance, or concert.

When it differs from the Zeitprice and is offered to all users equally, the price set by the persona owner is displayed as part of the persona's profile.

There exists a 100% discount list that is a non-public list of personas that are allowed to communicate without additional charge (beyond the payment of a possible ZM platform base membership fee). Friends are automatically added to the list.

Initial Level and Zeitprice: A certified professional provider may set her initial Level after presenting the ZM platform with convincing evidence of her standard professional fee or may accept a default entry Level that is standard for ZM platform providers. Certification is provided by the ZM platform for a fee payable in its entirety to the ZM platform which is set by the ZM platform for providers and professional providers separately. The fee is commensurate with the fee intended to be charged by the respective provider. A provider may also initially charge a temporarily higher tentative price which is visibly marked as such. A tentative price will be overridden by the Universal Zeitmachine after an initial period of evaluation. A thereby-determined Zeitprice is called established. In either case, her Level and Zeitprice will increase if her Success rises. There is a natural equilibrium in what the market will pay for each provider's service, and the Zeitprice will automatically adjust to reach that equilibrium.

Setting the Fee for a Transaction: The ZM platform can enable a provider to offer discounts to specific customers through the use of discount lists. Customers who are not on the provider's discount list may negotiate a one-time discount with the provider.

Setting the Commission for a Transaction: The ZM platform can, for example, charge a commission for each transaction except those that solely benefit an approved charity. Commissions may vary based on the Level of the provider, the certification of the professional status of the provider, and possibly other factors.

Pricing lower than Zeitprice: The persona owner can set the actual price charged lower than the Zeitprice of the following communication modes independently:

Real-time communication
Reading and replying to a text message
Reading and replying to an appointment request
Consuming live or recorded broadcast content However, the persona owner is not required to explicitly set these prices as they are based on the Zeitprice by default.

Discount Lists: A persona owner can offer lower rates to select sets of personas by adding them to a non-public discount list. The discount list is a list of personas and corresponding communication rates that specify a discounted rate to interact with the persona that owns the list.

Some entries in the discount list can be set to 100% to allow friends to communicate without additional charge (with the possible exception of a ZM platform base membership fee). Friends are automatically added to the list at a 100% discount. Another use of the discount list is to provide loyal customers a reduced rate. For each entry the discount list can specify a fixed alternative price or a reduction from the varying Zeitprice (expressed as a percentage of the Zeitprice or a fixed discount).

Offline Work: Sometimes an expert advisor can and should do document research or preparation or development work without the client present. Sometimes the client is present but the communication is limited to establishing the beginning and the end of a service provided offline. If there is no preexisting billing relationship between advisor and client, or if the client is interacting anonymously, they may want the ZM platform to bill the client for the advisor's offline time. Offline work can be charged just like online work per unit of time.

Offline work hours are not required to be entered into the calendar with their exact date and time, but they will reduce the overall available time that the service provider has available. The time spent and charged for will be deducted from the provider's total available billable time per workweek, providing an additional input to the Zeitprice algorithm.

Maximum Time Budget: In one embodiment, the sum of the time all personas of a particular user can charge for is capped at a maximum of less than or equal to 24 hours/day.

3. Other Embodiments: Products/Platforms

The ZM platform can be operated as a private communication and digital transaction platform for selling and consuming time on the web. There are also other aspects of the invention. One such aspect is referred to as the ZM Platform Corporate Edition (ZM CE).

ZM Platform Corporate Edition: Company employees and contractors frequently need other people's time. They often need to ask experts inside and outside the company for information, advice and assistance. Experts who have scarce knowledge are flooded with more requests than they can handle. The ZM platform CE allows a company to set up an internal marketplace for time using ZM platform technology and customized business rules. Management can put their Zeitmoney (real or virtual) where their top priorities are without choking off all access to experts by medium priority project teams. A team with less Zeitmoney to spend in the marketplace would budget more carefully and weigh both a provider's Zeitprice and the relevance of their expertise as detailed in an online profile. And staff and business partners outside the company's firewall/VPN could use the ZM platform's secure communications to participate in the marketplace as provider or as client.

Enterprise licenses could be sold for fees that are based on the number of users and/or the amount of time they buy and sell and/or the value of all transactions. The underlying ZM platform service could be hosted and operated on behalf of the customer by the entity operating the ZM platform, or internally by the customer's IT department.

In addition to highly secure internal communication, the service provides Zeitmachine-based time management and automated cost determination and allocation among its staff members within the entire virtual corporate network including remote access and mobile communication devices. It provides a new social engineering and corporate management paradigm. The effects in a corporation of Zeitmachine-aided cost and reward allocation are impossible to predict at this time, but the potential benefits certainly warrant large scale experimentation.

VERTICAL MARKETS: The ZM platform can be implemented to host specific vertical segments. One such vertical segment could be software and content development. By way of example, stock photo sites license existing content to businesses and pay royalties to rights holders. Packaged software companies license ready-to-use code. Where can a company go to obtain customized content and code? Today, businesses frequently in-source development to other divisions of their own company and/or outsource it domestically or internationally. However, creative content and content providers are not necessarily interchangeable in terms of skill sets and work product quality; the business insurance status of outside providers may not meet the company's requirements; before and after contracts are signed, the parties may use insecure connections to communicate with the provider; and for smaller projects, the time it takes to find developers, negotiate financial and legal terms and track the work can be as much or more than the time that engineering will take.

The ZM platform can be implemented to make software and content development more manageable, including by helping to find qualified engineers using profile search, determining what price they command in the market and facilitating negotiations over scope and price. One can meet with developers remotely using the ZM platform's secure communications and schedule those meetings using the ZM platform's time-tracking calendar. The ZM platform can include functions to simplify billing and payment, whether interdepartmental or international.

To facilitate outsourced projects, the ZM platform can be implemented to include standard legal agreements that cover a majority of situations. These agreements can be customized by choosing options on easy-to-understand forms or by enlisting legal service providers through the ZM platform. The platform can also be implemented offer developers and their customers escrow services to reduce the incidence of fraud and procrastination.

Through link-ups with leading insurers worldwide, the ZM platform can help developers to find and purchase required policies. It can deduct premium payments from developer accounts to prevent most lapses and can ensure that customers are informed when lapses occur.

The entity that is operating the ZM platform could charge a commission on software and content development service fees, of fees for legal advice and of insurance policy premiums. It could also charge escrow fees for software and content.

THE PRIVATE INTERNET: The ZM platform can be implemented with privacy features that could be configured to support a legally compliant Private Internet that hosts services such as Private Web, Private Email, Private Text Messaging, Private File Storage, Private Search, and the like.

The ZM platform can enable websites to integrate with its secure/private services.

To use a private website, file store, chat room or any other addressed location a ZM platform member simply logs in using the identity of any persona they own. A location may be either secret (address discoverable only by communication with its owner) or published (address discoverable via search). Each user of the location may be given a different and unique address and password for that location. Any such discovered location may be visited using the unique address of that location. The owner may require a visitor to use their unique (persona) password to access the content.

A location owner may charge a fee to a persona who wishes to discover the location's address and/or enter the location. The fee is subject to commission payable to the company. The owner may set the amount of the fee but there may be an option to base the fee on the difference between the Levels of the owner's and user's personas.

In one exemplary practice of the invention, the ZM provider an know the following:
- will know that a particular persona was using the Private Internet at a particular time for a particular length of time (metadata);
- will know which members owned the personas involved (metadata)
- will store metadata for the legally required time period;
- will keep metadata secret unless forced by warrant to disclose;
- will neither store addresses nor possess address decryption keys;
- will neither store content nor possess content decryption keys.

At present, some social media platforms and other parties trace a user's Internet activity when the user visits their website or uses an app that they've instrumented. To enhance anonymity, the ZM platform could allow any user of its Private Internet to visit any website of the public Internet and access its content without being traced by the public website's operator or any third party.

The ZM platform-based Private Internet compares with similar-sounding technologies in at least the following ways:

VPN: Like a Private Internet, a virtual private network is isolated from the public Internet, its addresses are invisible by default and metadata like connection time may be stored. But VPNs are known to be wide open for sophisticated continuous eavesdropping in real time.

Deep Web: Like a Private Internet, the Deep Web hides its sites and content from the general public. It is not designed to be legally compliant while providing privacy.

Tor: Like a Private Internet, Tor enables a user to transmit data anonymously over the Internet to and from Tor-enabled sites. It has failed to provide privacy as claimed and it is designed to be legally incompliant.

DIGITAL CURRENCY: The ZM platform can be implemented as a digital adjunct to the worldwide service economy. Buyers will buy the time of sellers at rationally determined and economically justified rates that are consistent with traditional prices for similar time-based services. They have the option to pay and be paid in the ZM platform's internal digital currency based on the value of time which is universally established by the users qua their activities on the ZM platform.

A digital currency, referred to herein as Zeitmark, or Z-mark, can be implemented in accordance with a practice of the invention, and can be stable and convertible to various traditional and digital currencies, and stable. The Zeitmark can be grounded in the value of the available time of system users and providers. The value of the Zeitmark can be algorithmically determined on the ZM platform as a selected fraction of the total available time in a defined calendar-time interval of a "standard" user.

4. Glossary

Adversation A conversation involving a commercial message or other market research question that an advertiser initiates with a willing consumer. The advertiser pays the consumer for their attention.

Client Depending on context, either a customer of a provider or a ZM platform app that runs on a user's networked device.

Conversation A private communication session among ZM platform personas. It could include live audio/video in one or both directions, live chat and/or text message threads.

Level A fundamental persona attribute that is similar in concept to a frequent flyer program level or tier. The higher the Level, the smaller the population at that Level (elite status); the more plentiful the privileges (elite benefits); the higher the Zeitprice (elite income)

Persona An identity that a user assumes when transacting on the ZM platform. It is similar in function to an AOL screen name or a Twitter handle. A user can have more than one persona, each displaying either their real name or a pseudonym.

Provider A persona able to provide a service through the ZM platform to client personas. A verified provider is a non-anonymous provider whose identity and credentials the ZM platform has accepted. A certified provider is a non-anonymous professional provider whose identity and professional credentials the ZM platform has accepted.

Service Fee A fee that a client pays a provider to engage in a conversation. The ZM platform collects the fee and keeps a percentage.

Subscriber A user who pays a recurring fee to the ZM platform[if such a fee is applicable].

Success A metric value that rises when a provider fills more time slots with higher-paying customers.

Zeitprice The upper limit price that each provider can charge consumers. The Zeitprice scale is not continuous; it has thirteen discrete Levels. A new provider's Zeitprice is tentative if the provider has selected it. A tentative Zeitprice is subject to subsequent establishment by the Universal Zeitmachine following an initial period of evaluation and probation. A provider's established Zeitprice is the Zeitprice of a provider which has been established by the Universal Zeitmachine following an initial period of evaluation and probation or been established at regular, for example weekly, intervals on a rolling time window basis.

Zeitprice A performance-based automated mechanism that calculates a fair Zeitprice for each Algorithm provider based on their recent Success.

ZM An abbreviation for "Zeitmarket".

5. Pricing ("Zeitprice")

A description of pricing ("Zeitprice") aspects of the invention will next be provided.

ZEITPRICE OVERVIEW: The fundamental underlying principle of ZM is that people's time has value for which they should be compensated when spent on someone else's behalf. To accomplish this, ZM provides a marketplace where an individual's time can be bought and sold. ZM continuously calculates the market price for the time of each provider. This market price is called the Zeitprice. The Zeitprice is the maximum chargeable price per time unit for a particular provider's persona.

The Zeitprice is determined by a server-based module called the Universal Zeitmachine (UZM) (element 61 in FIGS. 3-9). In an exemplary embodiment of the invention, the UZM comprises a computer software and/or digital processing hardware module, executing in a digital processing element or elements in the server (including modules 61 and 71 in FIGS. 3-9), that determines each provider's Zeitprice based on data provided by each provider's individual Zeitmachine. In an exemplary embodiment of the invention, each provider's individual Zeitmachine (including module SI in FIGS. 3-9), in turn, is a computer software and/or digital processing hardware module, executing in a digital processing element or elements, that obtains data about an individual provider's activity in relation to the ZM platform, and provides such data to the UZM. In various embodiments of the invention, the individual Zeitmachine, may reside and operate in the server, in an individual user's client device (such as a smartphone) (including, or comprising part of, module 41 in FIGS. 3-9), or may be functionally provided by software and/or digital processing hardware elements that reside and inter-operate in both the client device and the server.

Criteria: The Zeitprice calculation comes from a provided service and is based on algorithms involving success factors. The service relies on data provided by ZmCore/Zeitmachine.

The Universal Zeitmachine software collects sales data (time slots offered, time slots purchased, prices paid) from the individual Zeitmachines and these data and other factors to calculate "Success," a metric that rises when a provider fills more time slots with higher-paying customers. Given the provider's current Level and their recent Success, the UZM algorithm decides whether to raise or lower the provider's Level or leave it alone. At each Level, there is a Zeitprice, which is the maximum amount the provider may charge for an hour of service to a consumer.

A new underpaid provider may ascend a Level every week and then settle into a Level for many weeks, months or years before rising further or slipping down the scale. The difficulty of earning a higher Level may be dialed up or down by management to maintain a target percentage distribution that works best for consumers, providers, and ZM.

Policies: In one embodiment, policies governing Zeitprice can include the following:

Define "laws" for performance-based mechanism for price finding.

There is a weekly determination of Zeitprice (provider's level).

There are Professionals and non-Professionals pyramids that set the Zeitprice for a selected number of levels, respectively.

There is a target distribution of providers across each pyramid.

Success productivity×workload.

Productivity=actual price/Zeitprice.

Workload:=number paid sessions/number offered sessions.

If Success>SUCCESS_THRESHOLD for at least OBSERVATION_PERIOD weeks, provider moves up a level.

If Success<(SUCCESS_THRESHOLD×LevelMinPrice/Zeitprice) for at least OBSERVATION_PERIOD weeks, provider goes down a level.

Providers can start at a level of their choosing. After OBSERVATION_PERIOD weeks, their Success values will determine if they move up, go down, or stay at their chosen level according to the Zeitprice rules above.

The UZM will provide to the Zeitmachine guidance on how the provider may increase her Zeitprice.

Uniqueness/Innovation

Zeitprice itself is unique in that having a system determine the maximum pricing for services a provider rendered for his/her time is unique.

UZM allows global changes to occur across the entire ZM. For example, UZM will allow management to adjust the level of providers based on market conditions, seasonality, sponsorships, human behavior patterns, or other criteria based on simulations.

Design Approach/Implementation

UZM

The UZM is designed to meet the following needs:

Scalability to millions of users by using event-based architecture;

High performance (target response times in tens of milliseconds) by using C language:

Extensible and modular by having well-defined APIs.

The Zeitprice algorithm is currently well understood. Allowances are made for changes in the future, as much as reasonably possible. It is anticipated that good API-design will assist with this form of extensibility.

Dependencies

JSON requests can be made into ZMCore endpoints. UZM will collect various data from ZMCore in this manner.

UZM can also be implemented so as to interact with other subsystems in a similar manner (for example, by making JSON requests into the other subsystems in order to retrieve necessary data).

Exception Handling (Exceptions to how the UZM Works)

Level: It is anticipated that there will be a need to allow specific providers to stay at a certain level regardless of their performance.

Use Cases

Initial Level Setting

A provider will want to be able to set an initial Zeitprice so that the provider doesn't have to slog through lower levels to get to where the provider thinks it should be.

Help on Moving up the Level

A provider will want some feedback from ZM on how to move up to a higher level so it can have its Zeitprice maximum raised.

6. Digital Processing Environment in which Invention can be Implemented

The following is a discussion, to be read in connection with FIGS. 11-15, of underlying digital processing structures and environments in which the invention may be implemented and practiced.

Figure 11:
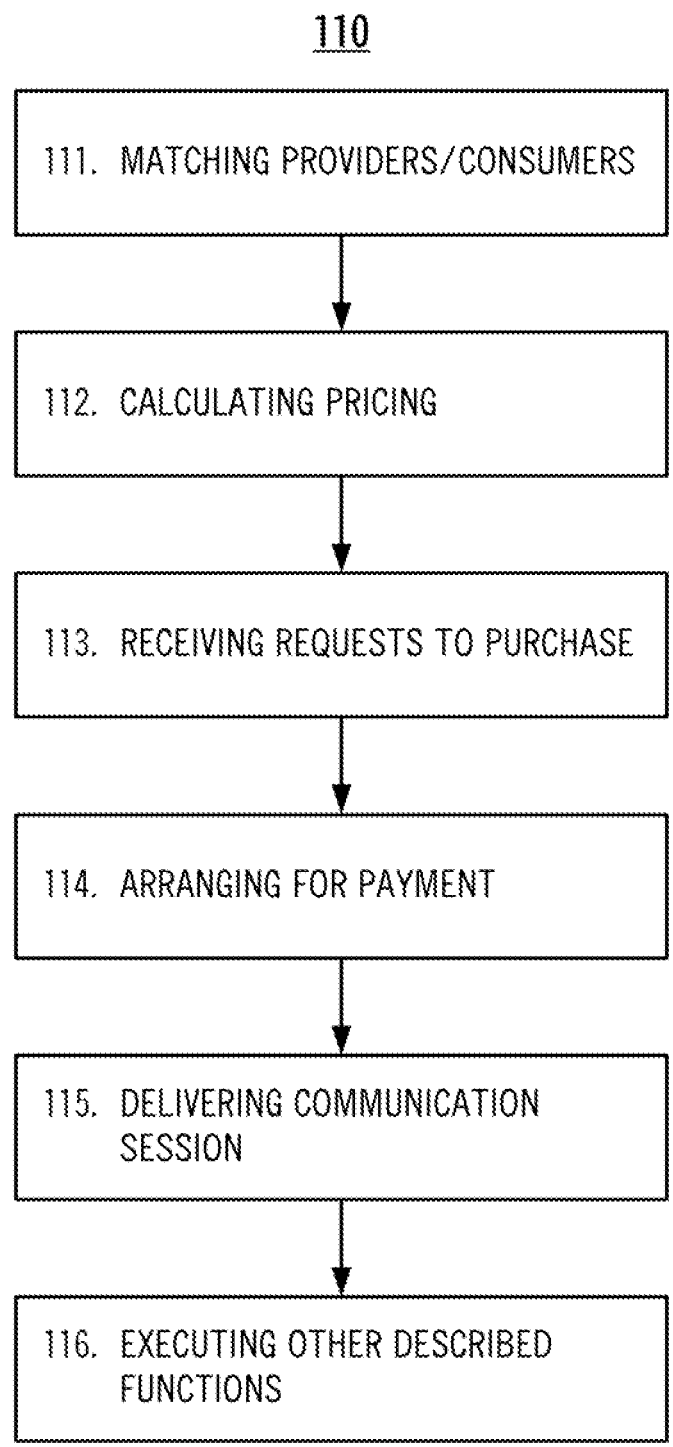
FIG. 11 is a diagram of an overall technique incorporating various aspects of a transactional platform according to the present invention.

FIG. 11 is a diagram of an overall technique 110 incorporating various aspects of a transactional platform according to the present invention.

Technique 110 includes the following components:

111: Matching providers/consumers.
112: Calculating pricing.
113: Receiving requests to purchase.
114: Arranging for payment.
115: Delivering communication session.
116: Executing other functions described herein.

It will be understood by those skilled in the art that the present invention provides methods, systems, devices and computer program products that can be implemented as part of the computer software or computer hardware of a computer, "smartphone", tablet computer, or other computing device that forms pan of a computer network or telecommunications network, along with a display, user interface elements such as a keyboard, tablet and/or mouse, memory, storage, and other conventional computer system or telecommunications system components. While conventional components of such kinds are well known to those skilled in the art, and thus need not be described in great detail herein, the following overview indicates how the present invention can be implemented in conjunction with such components.

The following detailed description illustrates examples of methods, structures, systems, and computer software products in accordance with these techniques. It will be understood by those skilled in the art that the described methods and systems can be implemented in software, hardware, or a combination of software and hardware, using conventional computer apparatus such as a personal computer (PC), smartphone, tablet computer, or equivalent device operating in accordance with (or emulating) a conventional operating system such as iOS, Microsoft Windows, Linux, Android, or other, either in a standalone configuration or across a network. The various processing aspects and means described herein may therefore be implemented in the software and/or hardware elements of a properly configured digital processing device or network of devices. Processing may be performed sequentially or in parallel, and may be implemented using special purpose or re-configurable hardware.

Figure 12:
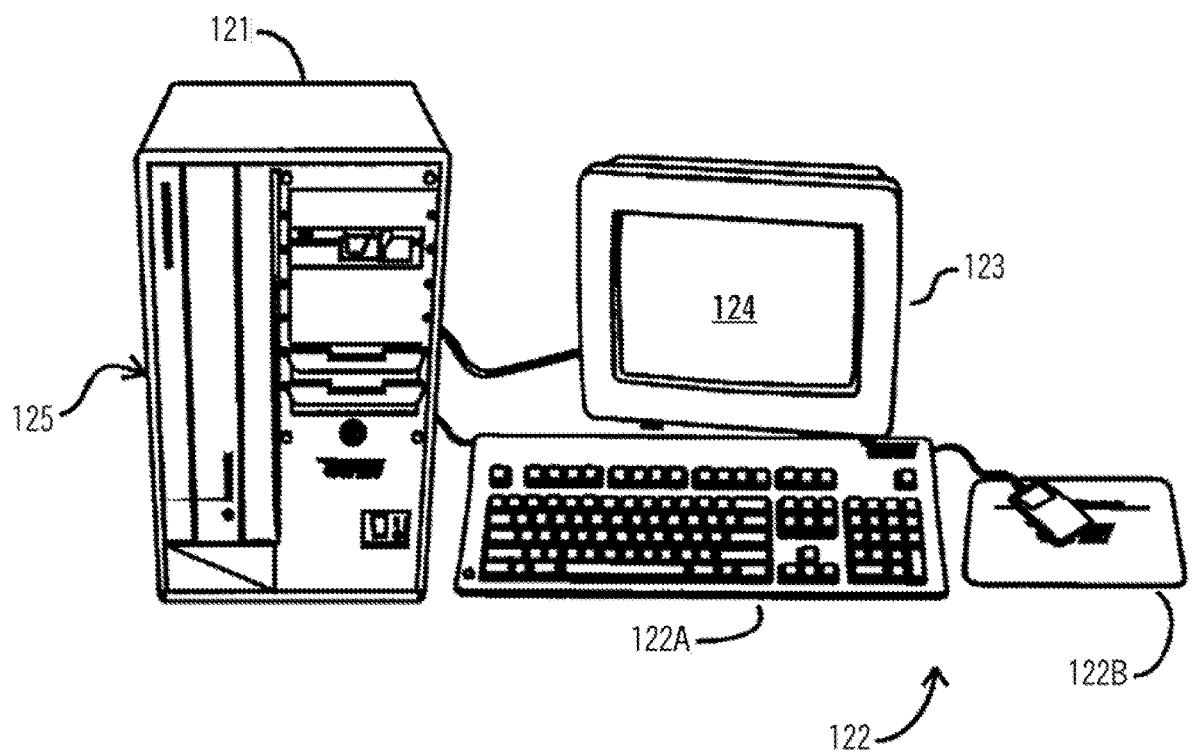
FIG. 12 is a diagram of an illustrative computer system that is suitable for use in conjunction with various aspects of the invention.

As an example, FIG. 12 attached hereto depicts an illustrative computer system 120 that can carry out such computer processes. With reference to FIG. 12, the computer system 120 in one embodiment includes a processor module 121 and operator interface elements comprising operator input components such as a keyboard 122A and/or a mouse 122B (or other analogous element(s), generally identified as operator input element(s) 122) and an operator output element such as a video display device 123. The illustrative computer system 120 can be of a conventional stored-program computer architecture. The processor module 121 can include, for example, one or more processor, memory and mass storage devices, such as disk and/or tape storage elements (not separately shown), which perform processing and storage operations in connection with digital data provided thereto. The operator input element(s) 122 can be provided to permit an operator to input information for processing. The video display device 123 can be provided to display output information generated by the processor module 121 on a screen 124 to the operator, including data that the operator may input for processing, information that the operator may input to control processing, as well as information generated during processing. The processor module 121 can generate information for display by the video display device 123 using a so-called "graphical user interface" ("GUI"), in which information for various applications programs is displayed using various "windows." Alternatively, the invention can be embodied in a commercially available smartphone or tablet computer that contains functional elements equivalent to those noted above.

The terms "memory", "storage" and "disk storage devices" can encompass any computer readable medium, such as a computer hard disk, computer floppy disk, computer-readable flash drive, computer-readable RAM or ROM element or any other known means of encoding digital information. The term "applications programs", "applications", "apps", "programs", "computer program product" or "computer software product" can encompass any computer program product consisting of computer-readable programs instructions encoded and/or stored on a computer readable medium, whether that medium is fixed or removable, permanent or erasable, or otherwise As noted, for example, in block 1318 of the schematic block diagram of FIG. 14, applications and data can be stored on a disk, in RAM, ROM, on other removable or fixed storage, whether internal or external, and can be downloaded or uploaded, in accordance with practices and techniques well known in the art. As will also be noted in this document, the present invention can take the form of software or a computer program product stored on a computer-readable medium, or it can be in the form of computer program code that can be uploaded or downloaded, or fixed in a ROM or other electronic structure, or it can take the form of a method or a system for carrying out such a method.

Although the computer system 120 is shown as comprising particular components, such as the keyboard 122A and mouse 122B for receiving input information from an operator, and a video display device 123 for displaying output information to the operator, it will be appreciated that the computer system 120 may include a variety of components in addition to or instead of those depicted in FIG. 12. Alternatively, the invention can be embodied in a commercially available smartphone or tablet computer that contains functional elements equivalent to those noted above.

In addition, the processor module 121 can include one or more network ports, generally identified by reference numeral 125, which are connected to communication links which connect the computer system 120 in a computer network. The network ports enable the computer system 120 to transmit information to, and receive information from, other computer systems and other devices in the network. In a typical network organized according to, for example, the client-server paradigm, certain computer systems in the network are designated as servers, which store data and programs (generally, "information") for processing by the other, client computer systems, thereby to enable the client computer systems to conveniently share the information. A client computer system that needs access to information maintained by a particular server will enable or cause the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

Figure 13:
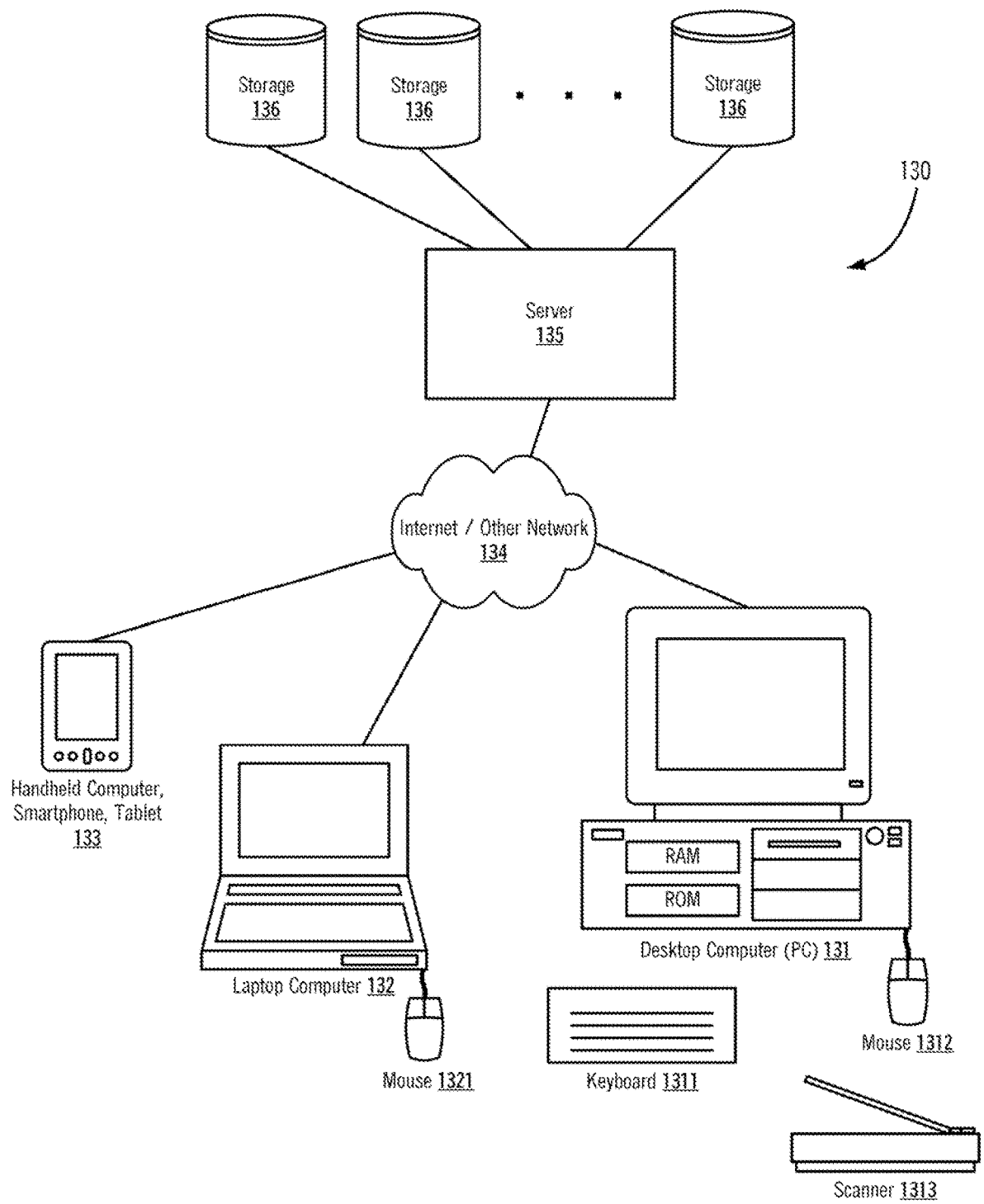
FIG. 13 is a diagram of an illustrative network system that is suitable for use in conjunction with various aspects of the invention.
Figure 14:
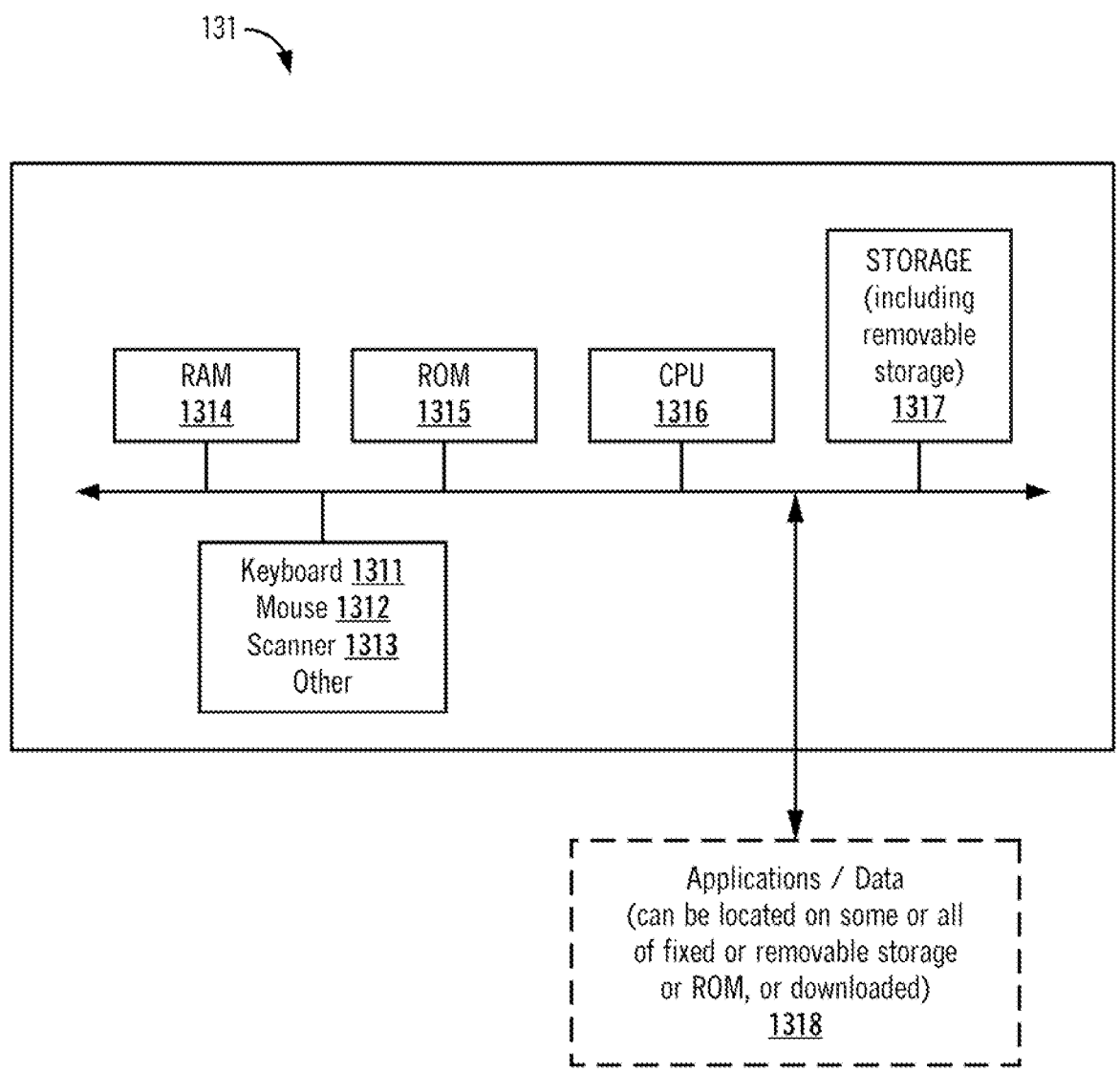
FIG. 14 is a diagram of various components of a PC suitable for use in the network system shown in FIG. 13.

In addition to the computer system 120 shown in the drawings, methods, devices or software products in accordance with the present invention can operate on any of a wide range of conventional computing devices and systems, such as those depicted by way of example in FIGS. 13 and 14 (e.g., network system 130), whether standalone, networked, portable or fixed, including conventional PCs 131 (which may include, for example, a keyboard 1311, mouse 1312, and scanner 1313), laptops 132 (which may include, for example, a mouse 1321), handheld or mobile computers 133, or across the Internet or other networks 134, which may in turn include servers 135 and storage 136. Alternatively, the invention can be embodied in a commercially available smartphone or tablet computer that contains functional elements equivalent to those noted above.

In accord with conventional computer software and hardware practice, a software application configured in accordance with the invention can operate within, e.g., a PC, such as PC 131 shown in FIGS. 13 and 14, or known forms of handheld computer, smartphone or tablet computer 133, in which program instructions can be read from ROM or CD ROM 1315 (FIG. 14), magnetic disk or other storage 1317 and loaded into RAM 1314 for execution by CPU 1316. Data can be input into the system via any known device or means, including a conventional keyboard 1311, scanner 1312, mouse 1313, digitizing tablet, or other elements 103. As shown in FIG. 14, the depicted storage 1317 includes removable storage. As further shown in FIG. 14, applications and data 1318 can be located on some or all of fixed or removable storage or ROM, or downloaded.

Figure 15:
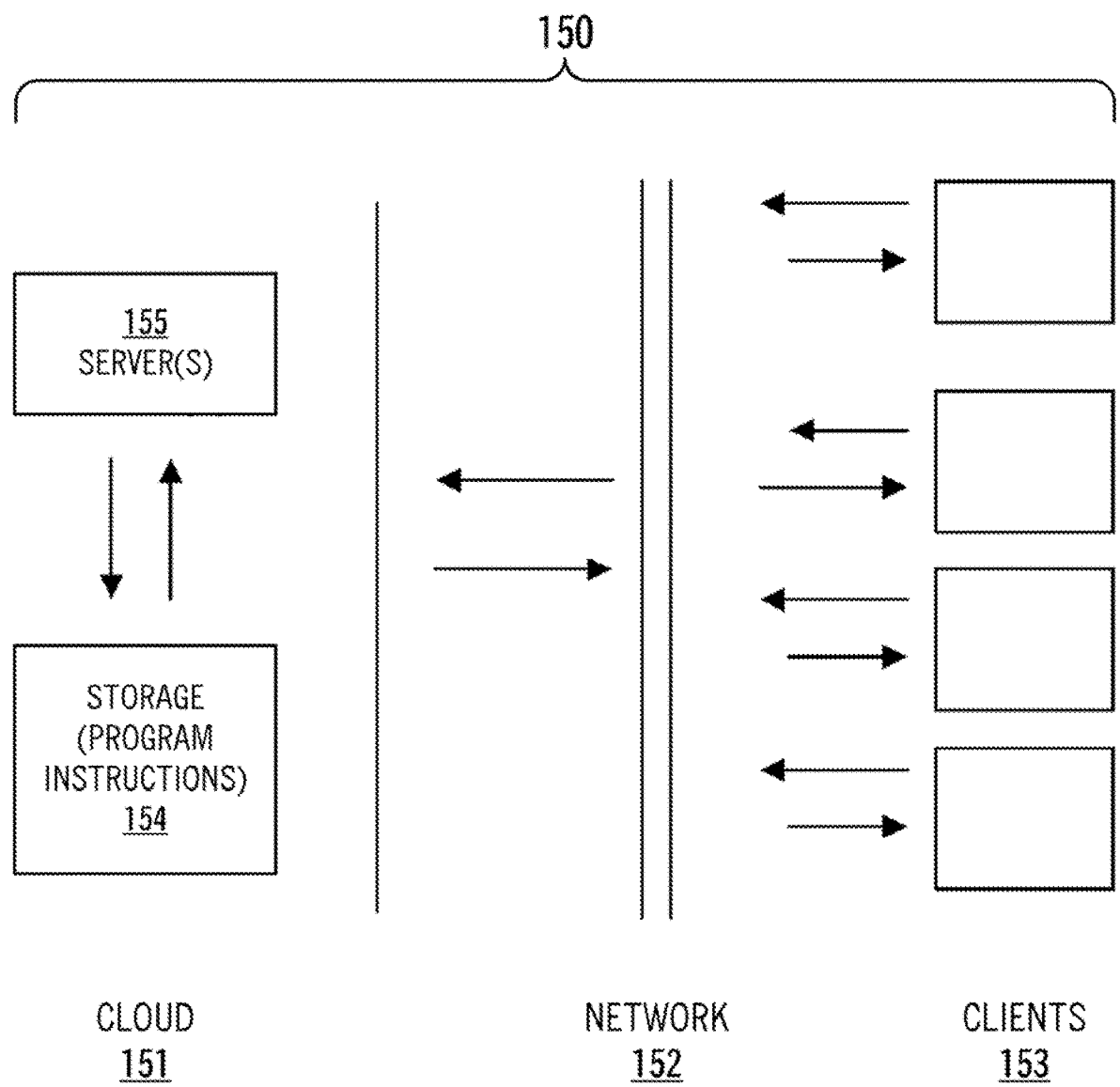
FIG. 15 is a diagram of an exemplary cloud configuration suitable for use in conjunction with various aspects of the invention.

FIG. 15 is a diagram of an exemplary cloud configuration 150, comprising a cloud layer 151, a network layer 152, and a client layer 153. Program instructions contained in storage within the cloud layer 151 is accessible by servers 155 that communicate via network 152 with individual clients in the client layer 153.

The invention described herein has been implemented by the Applicant, using commercially available server and client hardware elements, and using commercially available software tools and libraries, including those listed below. An exemplary implementation of the invention as implemented by the Applicant is operational as of the filing of this PCT application. Commercially available (or freeware or shareware) software tools and libraries used by the Applicant to implement an exemplary practice of the invention described herein include the following:

VMWARE for server virtualization;
CFENGINE (with CRON, BASH, SYSTEMD) for configuration management;
SUBVERSION for source control and GO for build and deploy automation;
GANGLIA and NAGIOS for system monitoring;
ACTIVEADMIN to interact with RUBY ON RAILS;
ELASTICSEARCH for real-time search and analytics;
KIBANA for analytics and visualization.
RUBY GEMS: PUMA, BYEBUG, BIGDECIMAL (1.2.0) 10-CONSOLE (0.4.2) JSON (1.7.7) PSYCH (2.0.0) RDOC (4.0.0)
Database is MYSQL and POSTGRESQL.
The UZM uses LIBEVENT (async) and JUDY (like REDIS):
 see: http://libevent.org/, http://judy.sourceforge.net/index.html;
COMMCONTROL and COMMNODE uses ZEROMQ;
Current COMMNODE uses PUGI (DOM-based xml parser) and CIVIT (small webserver);
OPENSSL/LIBRESSL is used for security primitives; and
Testing are unit-tests, GO tests, CUCUMBER based test scripts and RSPEC.
(RACK, NGINX, RAILS, REDIS and GO are understood to be trademarks of their respective owners. Other terms used herein may be trademarks of their respective owners.)

Target client platforms for the invention described herein include iOS, Android and Windows operating systems. Exemplary practices of the invention will support centralized data access codes with priority queues; and integrated and customized security codes, utilizing platform-provided security primitives and access methods. These may include any of NSURLSession and NSURLConnection on iOS; LibreSLL and secure local storage on iOS, and Xcode based developments. In a current exemplary implementation of the invention, the server platform utilizes a CentOS7 backend structure, nginx webservice and reverse-proxy structures, Rack, and Ruby on Rails with mySQL/Redis as the backend framework and access cache. A mySQL database structure is also utilized. In a current implementation of the invention, server-client communications are based on a standard https transactional model utilizing protocol buffers as content description.

Those skilled in the art will understand that the method aspects of the invention described herein can be executed in hardware elements, such as at the server level, or at a microprocessor level, such as within a Field-Programmable Gate Array (FPGA) or an Application-Specific Integrated Circuit (ASIC) constructed specifically to carry out the processes described herein, using ASIC construction techniques known to ASIC manufacturers. Such manufacturers include Intel Corporation of Santa Clara, Calif. The actual semiconductor elements of a conventional ASIC or equivalent integrated circuit are not part of the present invention, and will not be discussed in detail herein.

Those skilled in the art will also understand that method aspects of the present invention can be carried out within commercially available digital processing systems, such as smartphones, tablet computers and personal computers (PCs), operating under the collective command of the smartphone's or computer's operating system, such as iOS, Android or Windows, and a computer program product configured in accordance with the present invention. The term "computer program product" can encompass any set of computer-readable programs instructions encoded on a computer readable medium. A computer readable medium can encompass any form of computer readable element, including, but not limited to, a computer hard disk, computer floppy disk, computer-readable flash drive, computer readable RAM or ROM element, or any other known means of encoding, storing or providing digital information, whether local to or remote from the workstation, PC or other digital processing device or system. Various forms of computer readable elements and media are well known in the computing arts, and their selection is left to the implementer.

In addition, those skilled in the art will understand that the invention can be implemented using computer program modules and digital processing hardware elements, including memory units and other data storage units, including commercially available processing units, memory units, computers, servers, smartphones and other computing and telecommunications devices. The term "modules", "program modules", "components", and the like include computer program instructions, objects, components, data structures, and the like that can be executed to perform selected tasks or achieve selected outcomes. The various modules shown in the drawings and discussed in the description herein refer to computer-based or digital processor-based elements that can be implemented as software, hardware, firmware and/or other suitable components, taken separately or in combination, that provide the functions described herein, and which may be read from computer storage or memory, loaded into the memory of a digital processor or set of digital processors, connected via a bus, a communications network, or other communications pathways, which, taken together, constitute an embodiment of the present invention.

The terms "data storage module", "data storage element", "memory element" and the like, as used herein, can refer to any appropriate memory element usable for storing program instructions, machine readable files, databases, and other data structures. The various digital processing, memory and storage elements described herein can be implemented to operate on a single computing device or system, such as a server or collection of servers, or they can be implemented and inter-operated on various devices across a network, whether in a server-client arrangement, server-cloud-client arrangement, or other configuration in which client devices can communicate with allocated resources, functions or applications programs, or with a server, via a communications network.

It will also be understood that computer program instructions suitable for a practice of the present invention can be written in any of a wide range of computer programming languages, including Java, C++, and the like. It will also be understood that method operations shown in the flowcharts can be executed in different orders, and that not all operations shown need be executed, and that many other combinations of method operations are within the scope of the invention as defined by the attached claims. Moreover, the functions provided by the modules and elements shown in the drawings and described in the foregoing description can be combined or sub-divided in various ways, and still be within the scope of the invention as defined by the attached claims.

7. Flowcharts of Exemplary Techniques

FIGS. 16-35 are a series of flowcharts illustrating exemplary techniques according to various aspects of the invention. It is noted that the techniques depicted in FIGS. 16-35 are examples of process aspects in accordance with the invention, and it should be noted that the organization, order and number of process aspects can be varied; and that the process aspects can be arranged or ordered differently, and include different functions, whether singly or in combination, while still being within the spirit and scope of the present invention.

Figure 16:
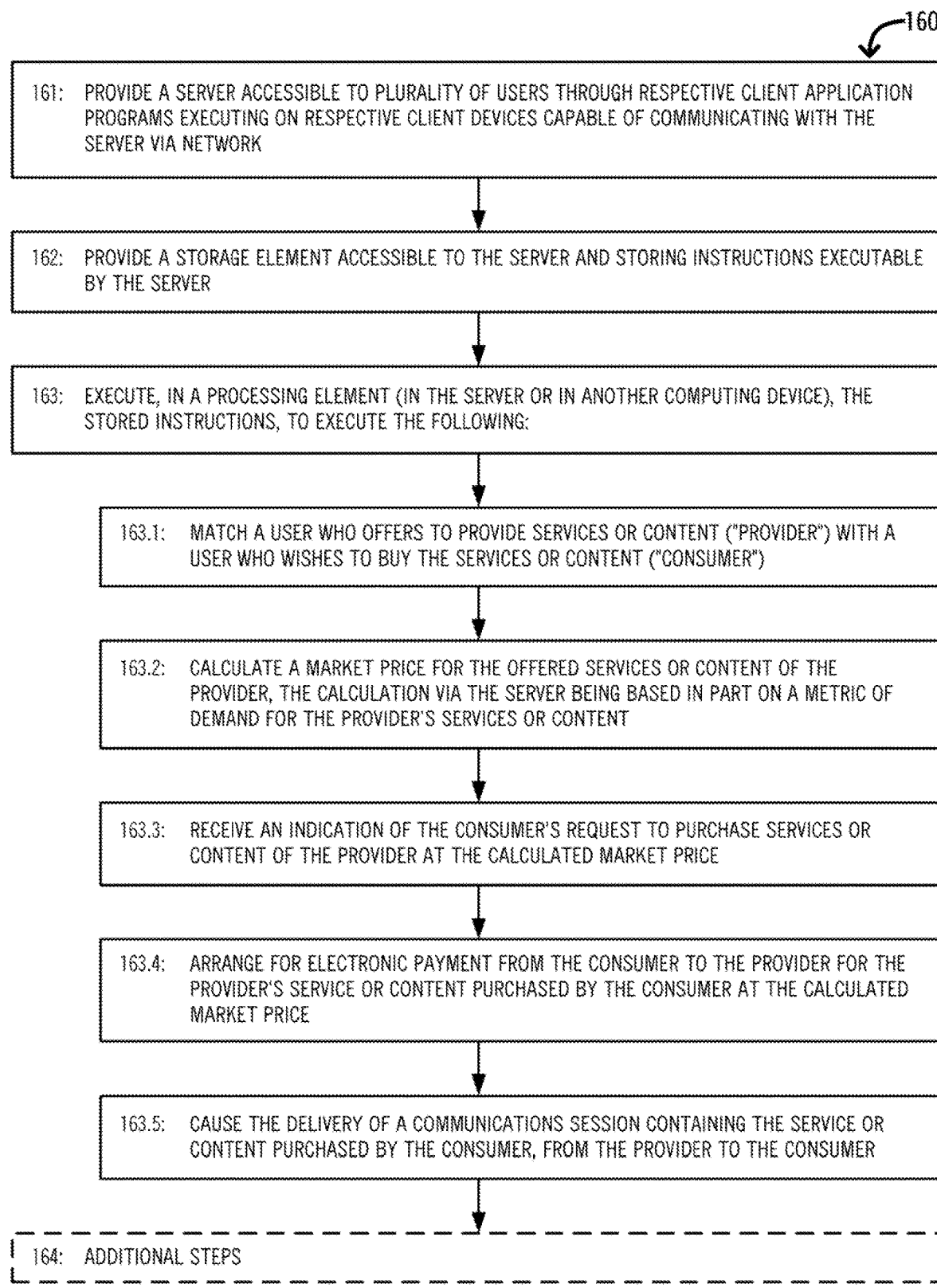

FIG. 16 is a flowchart of a technique 160 comprising the following operations:

161: Provide a server accessible to plurality of users through respective client application programs ("apps") executing on respective client devices capable of communicating with the server via network.

162: Provide a storage element accessible to the server and storing instructions executable by the server.

163: Execute, in a processing element (in the server or in another computing device), the stored instructions, to execute the following

163.1: Match a user who offers to provide services or content ("provider") with a user who wishes to buy the services or content ("consumer");

163.2: Calculate a market price for the offered services or content of the provider, the calculation via the server being based in part on a metric of demand for the provider's services or content;

163.3: Receive an indication of the consumer's request to purchase services or content of the provider at the calculated market price;

163.4: Arrange for electronic payment from the consumer to the provider for the provider's service or content purchased by the consumer at the calculated market price; and

163.5: Cause the delivery of a communications session containing the service or content purchased by the consumer, from the provider to the consumer.

164: Execute additional operations, if desired, which may include any or all of the techniques shown on FIGS. 17-35.

Figure 17:
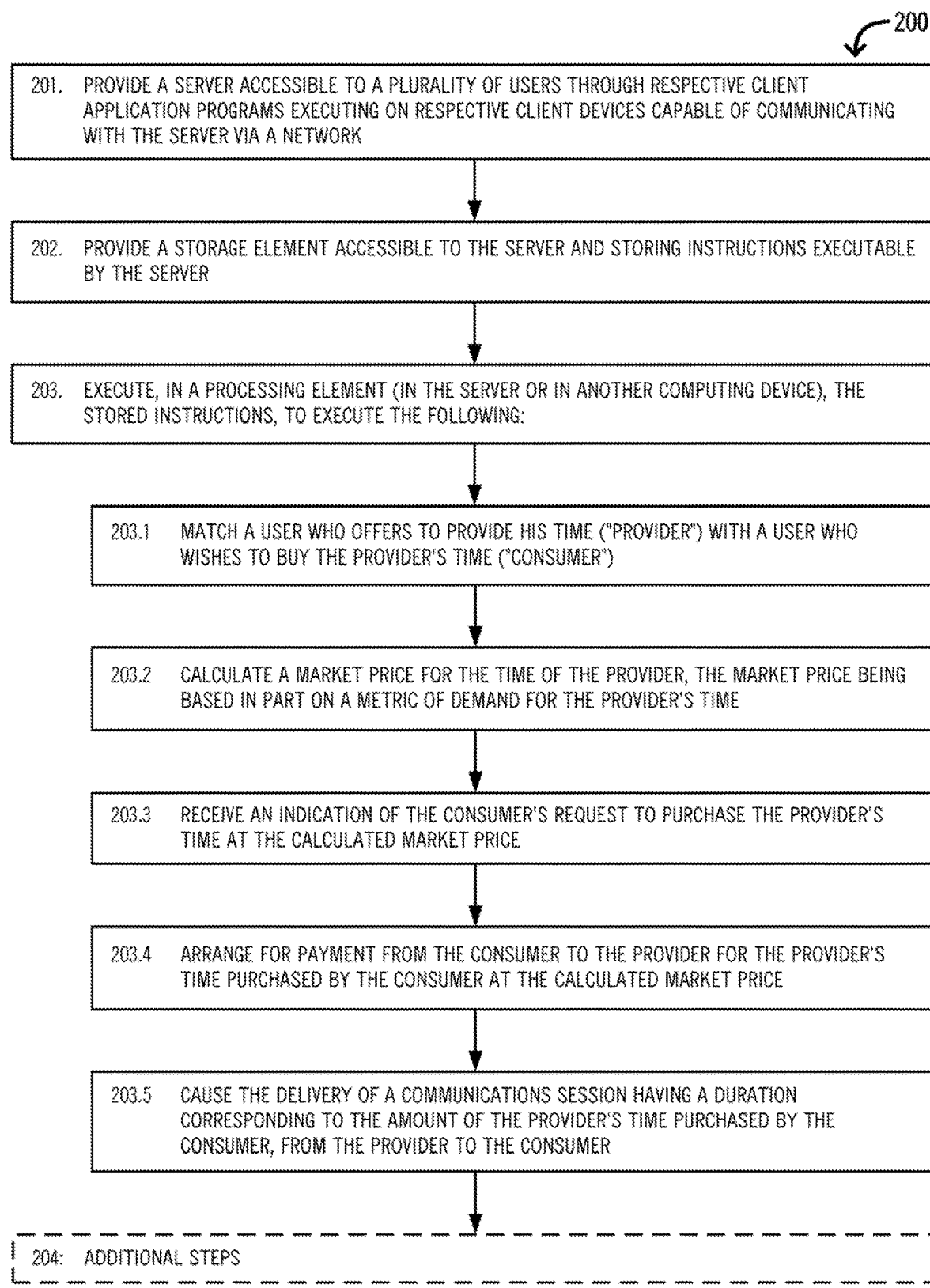

FIG. 17 is a flowchart of a technique 200, comprising the following operations:

201: Provide a server accessible to a plurality of users through respective client application programs executing on respective client devices capable of communicating with the server via a network.

202: Provide a storage element accessible to the server and storing instructions executable by the server.

203: Execute, in a processing element (i.e., in the server or in another computing device), the stored instructions, to execute the following:

203.1: Match a user who offers to provide his time ("provider") with a user who wishes to buy the provider's time ("consumer");

203.2: Calculate a market price for the time of the provider, the market price being based in part on a metric of demand for the provider's time;

203.3: Receive an indication of the consumer's request to purchase the provider's time at the calculated market price;

203.4: Arrange for payment from the consumer to the provider for the provider's time purchased by the consumer at the calculated market price; and

203.5: Cause the delivery of a communications session having a duration corresponding to the amount of the provider's time purchased by the consumer, from the provider to the consumer.

204: Execute additional operations, if desired, which may include any or all of the techniques shown on FIGS. 18-35.

Figure 18:
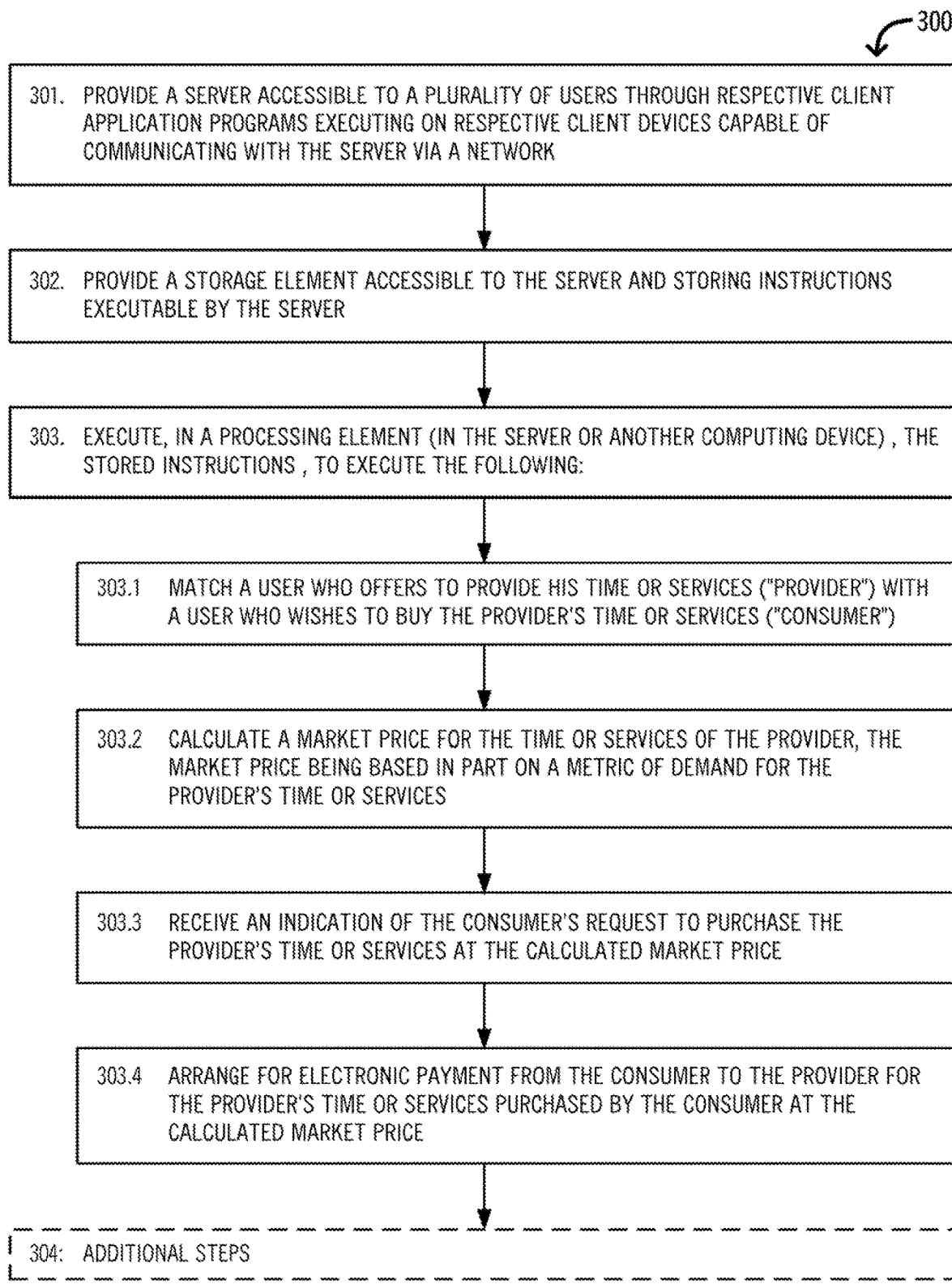

FIG. 18 is a flowchart of a technique 300, comprising the following:

301: Provide a server accessible to a plurality of users through respective client application programs executing on respective client devices capable of communicating with the server via a network.

302: Provide a storage element accessible to the server and storing instructions executable by the server.

303: Execute, in a processing element (in the server or another computing device), the stored instructions, to execute the following:

303.1 Match a user who offers to provide his time or services ("provider") with a user who wishes to buy the provider's time or services ("consumer");

303.2 Calculate a market price for the time or services of the provider, the market price being based in part on a metric of demand for the provider's time or services;

303.3 Receive an indication of the consumer's request to purchase the provider's time or services at the calculated market price; and

303.4 Arrange for electronic payment from the consumer to the provider for the provider's time or services purchased by the consumer at the calculated market price.

304: Execute additional operations, if desired, which may include any or all of the techniques shown on FIGS. 19-35.

FIG. 19 is a flowchart of a technique 400 that may be used in conjunction with other methods described herein, comprising the following:

401: Enable supervision of the provider's providing of time or services to the consumer, by any one or more of the following:

causing the providing of a display, on a display screen, of a representation of services or time being provided by the provider to the consumer;

providing a video camera element and enable video monitoring of the provider in providing services or time to the consumer, or recording and verifying on-line/off-line or start/stop times of the provider in providing services or time in an offline manner to the consumer.

FIG. 20 is a flowchart of a technique 500 that may be used in conjunction with other methods described herein, comprising the following:

501: Execute stored instructions to cause a processing element (in the server or in another computing device) to utilize a metric of demand for a given provider's time, services or content to modify a specified maximum price of the provider's time, services or content, by any one or more of the following:

- use a selected metric of demand for the provider's time, services or content ("success") to modify a specified maximum price of the provider's time, services or content, wherein "success" is a metric comprising the product of productivity multiplied by workload, wherein productivity is a ratio of actual price to maximum price, multiplied by a ratio of quantity sold to quantity offered, wherein quantity is a quantity of time;
- use a specified success threshold; positive modification of the specified maximum price occurs after measured success exceeds the success threshold for a time period of at least a specified observation period;
- use a specified success threshold; negative modification of the specified maximum price occurs after measured success is less than a specified negative triggering threshold for a time period of at least a specified observation period, wherein the negative triggering threshold is a function of the success threshold and the specified maximum price; or
- as "success" increases, increase the calculated maximum price.

FIG. 21 is a flowchart of a technique 600 that may be used in conjunction with other methods described herein, comprising the following:

601: Execute, in a processing element (in the server or another computing device), stored program instructions, to execute the following:

Enable a user to create and maintain a fictional identity (persona) for use on the system (e.g., a server and computing devices in communication with the server via a communications network to execute a method according to the invention),
- wherein user-to-user and provider/consumer interaction on the system is implemented through personas, and wherein the personas comprise provider personas and consumer personas;
- enable a user to elect to have the persona be anonymous, in that the persona does not reveal or indicate the user's real-world identity;
- enable a user to elect to have the persona be visible to (i) no other users of the system, (ii) a selected set of other users of the system, or (iii) all other users of the system;
- enable a user to create and maintain multiple personas for use on the system;
- enable multiple personas to have selectable levels of anonymity and visibility to other users, and be associated with providing or purchasing of different services or content; and
- enable consumers of services, content or time via the system to remain anonymous to providers in the system; and wherein providers in the system may opt to be anonymous to consumers of their services, content or time via the system.

Figure 22A:
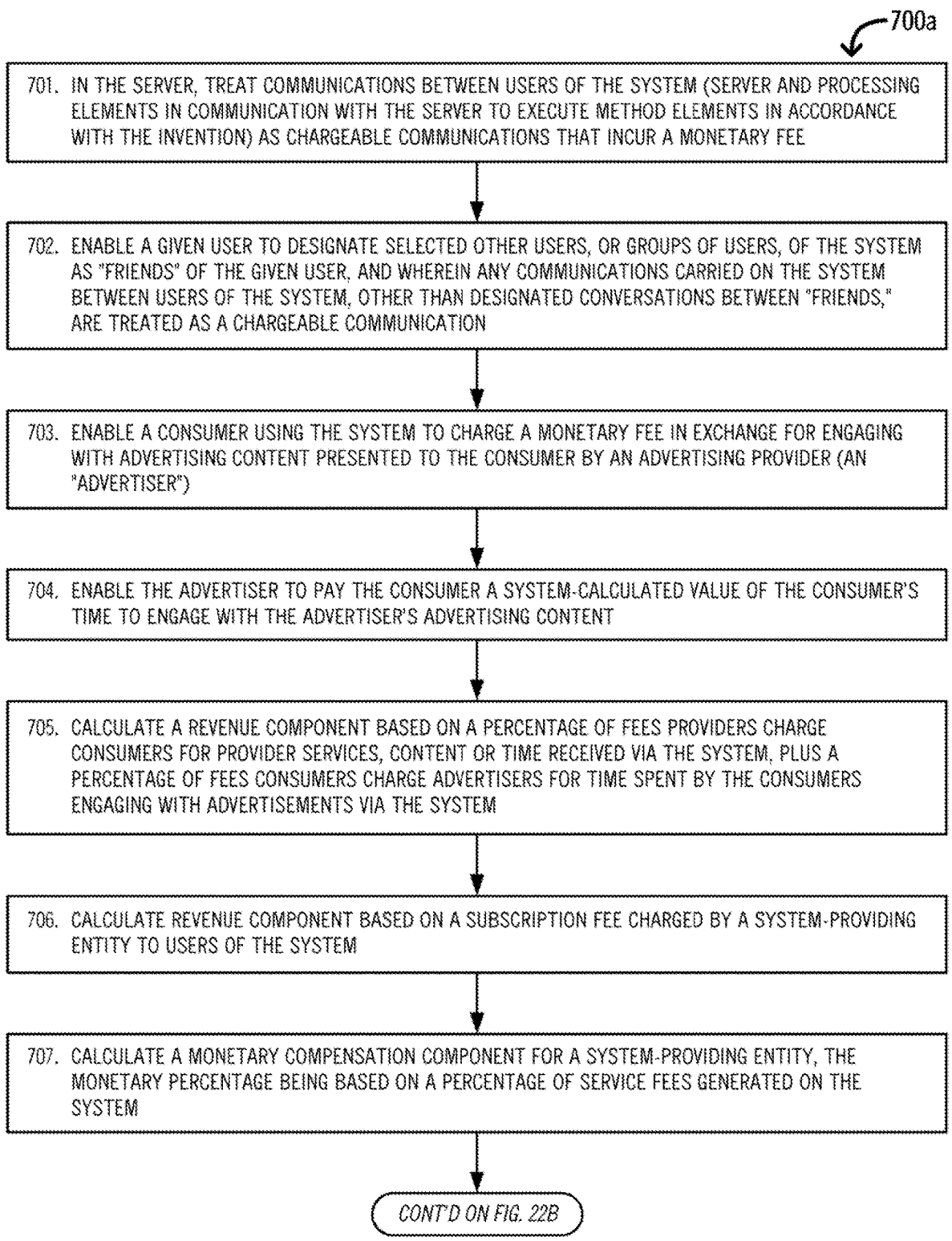
Figure 22B:
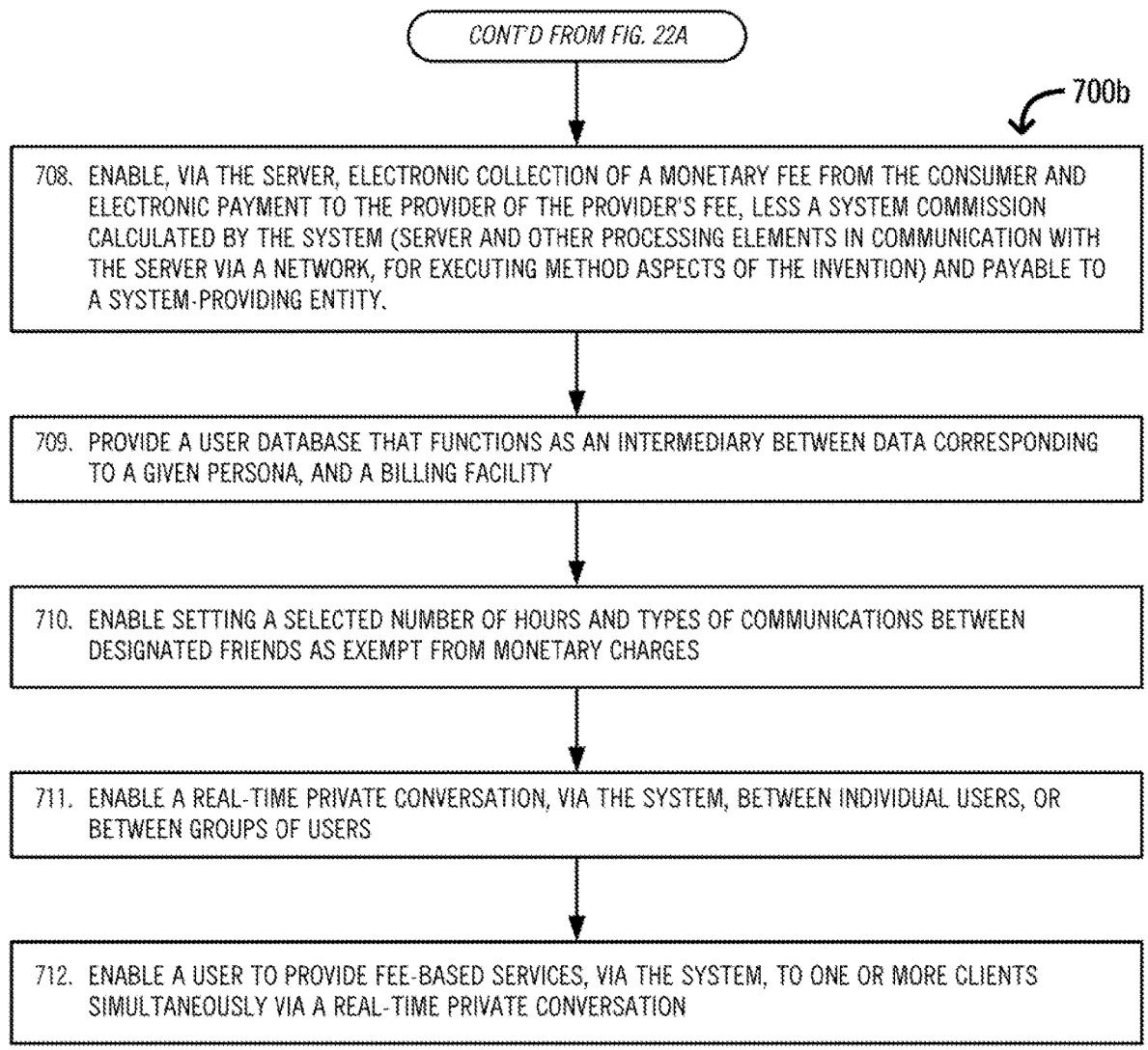

FIGS. 22A-B show a flowchart of a technique 700*a-b*, comprising the following:

701: In the server, treat communications between users of the system (server and processing elements in communication with the server to execute method elements in accordance with the invention) as chargeable communications that incur a monetary fee.

702: Enable a given user to designate selected other users, or groups of users, of the system as "friends" of the given user, and wherein any communications carried on the system between users of the system, other than designated conversations between "friends," are treated as a chargeable communication.

703: Enable a consumer using the system to charge a monetary fee in exchange for engaging with advertising content presented to the consumer by an advertising provider (an "advertiser").

704: Enable the advertiser to pay the consumer a system-calculated value of the consumer's time to engage with the advertiser's advertising content.

705: Calculate a revenue component based on a percentage of fees providers charge consumers for provider services, content or time received via the system, plus a percentage of fees consumers charge advertisers for time spent by the consumers engaging with advertisements via the system.

706: Calculate revenue component based on a subscription fee charged by a system-providing entity to users of the system.

707: Calculate a monetary compensation component for a system-providing entity, the monetary percentage being based on a percentage of service fees generated on the system.

708: Enable, via the server, electronic collection of a monetary fee from the consumer and electronic payment to the provider of the provider's fee, less a system commission calculated by the system (e.g., a server and other processing elements in communication with the server via a network, for executing method aspects of the invention) and payable to a system-providing entity.

709: Provide a user database that functions as an intermediary between data corresponding to a given persona, and a billing facility.

710: Enable setting a selected number of hours and types of communications between designated friends as exempt from monetary charges.

711: Enable a real-time private conversation, via the system, between individual users, or between groups of users.

712: Enable a user to provide fee-based services, via the system, to one or more clients simultaneously via a real-time private conversation.

Figure 23:
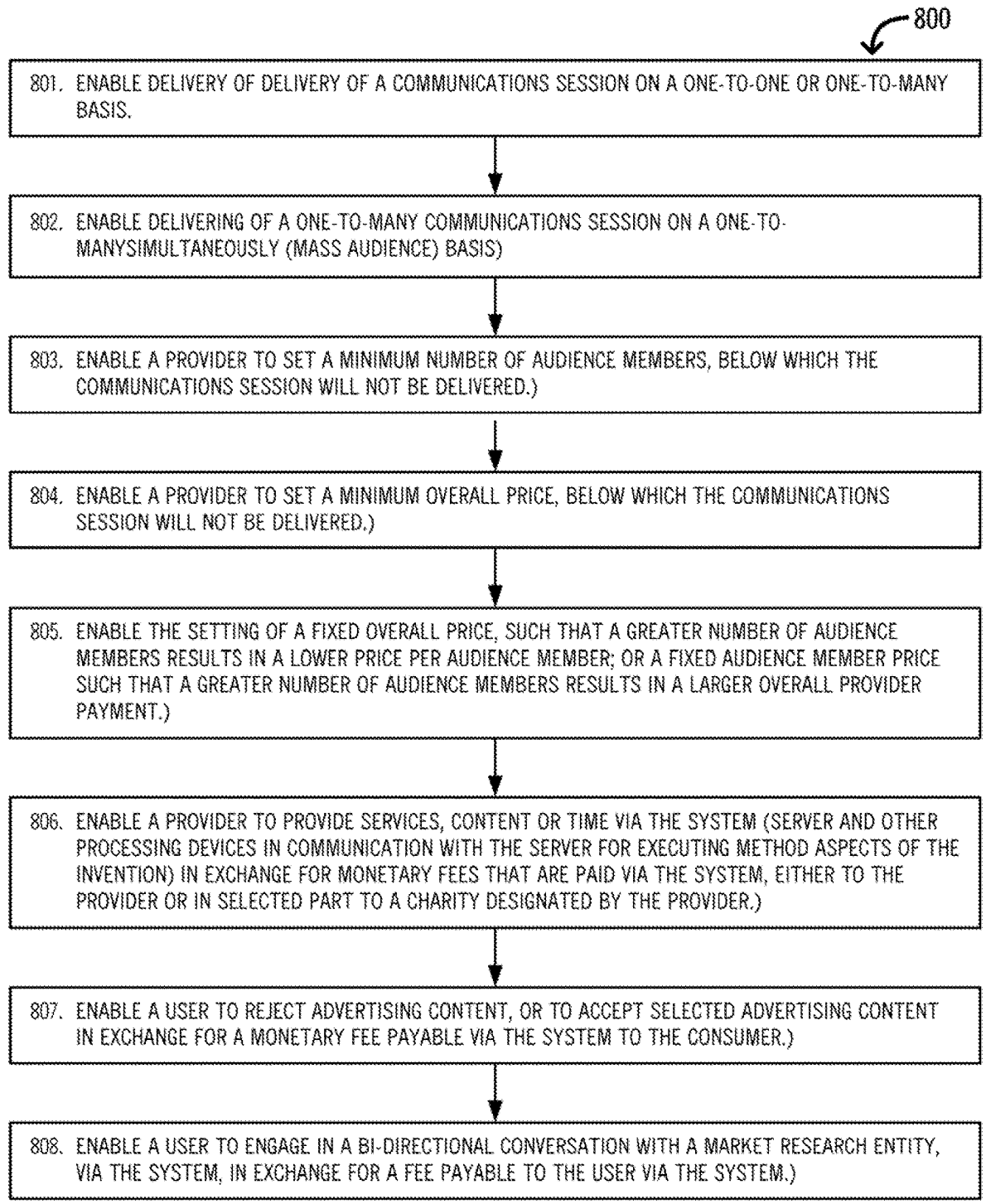

FIG. 23 is a flowchart of a technique 800, comprising the following:

801: Enable delivery of delivery of a communications session on a one-to-one or one-to-many basis.

802: Enable delivering of a one-to-many communications session on a one-to-many simultaneously (mass audience) basis.

803: Enable a provider to set a minimum number of audience members, below which the communications session will not be delivered.

804: Enable a provider to set a minimum overall price, below which the communications session will not be delivered.

805: Enable the setting of a fixed overall price, such that a greater number of audience members results in a lower price per audience member; or a fixed audience member price such that a greater number of audience members results in a larger overall provider payment.

806: Enable a provider to provide services, content or time via the system (server and other processing devices in communication with the server for executing method aspects of the invention) in exchange for monetary fees that are paid via the system, either to the provider or in selected part to a charity designated by the provider.

807: Enable a user to reject advertising content, or to accept selected advertising content in exchange for a monetary fee payable via the system to the consumer.

808: Enable a user to engage in a bi-directional conversation with a market research entity, via the system, in exchange for a fee payable to the user via the system.

Figure 24A:
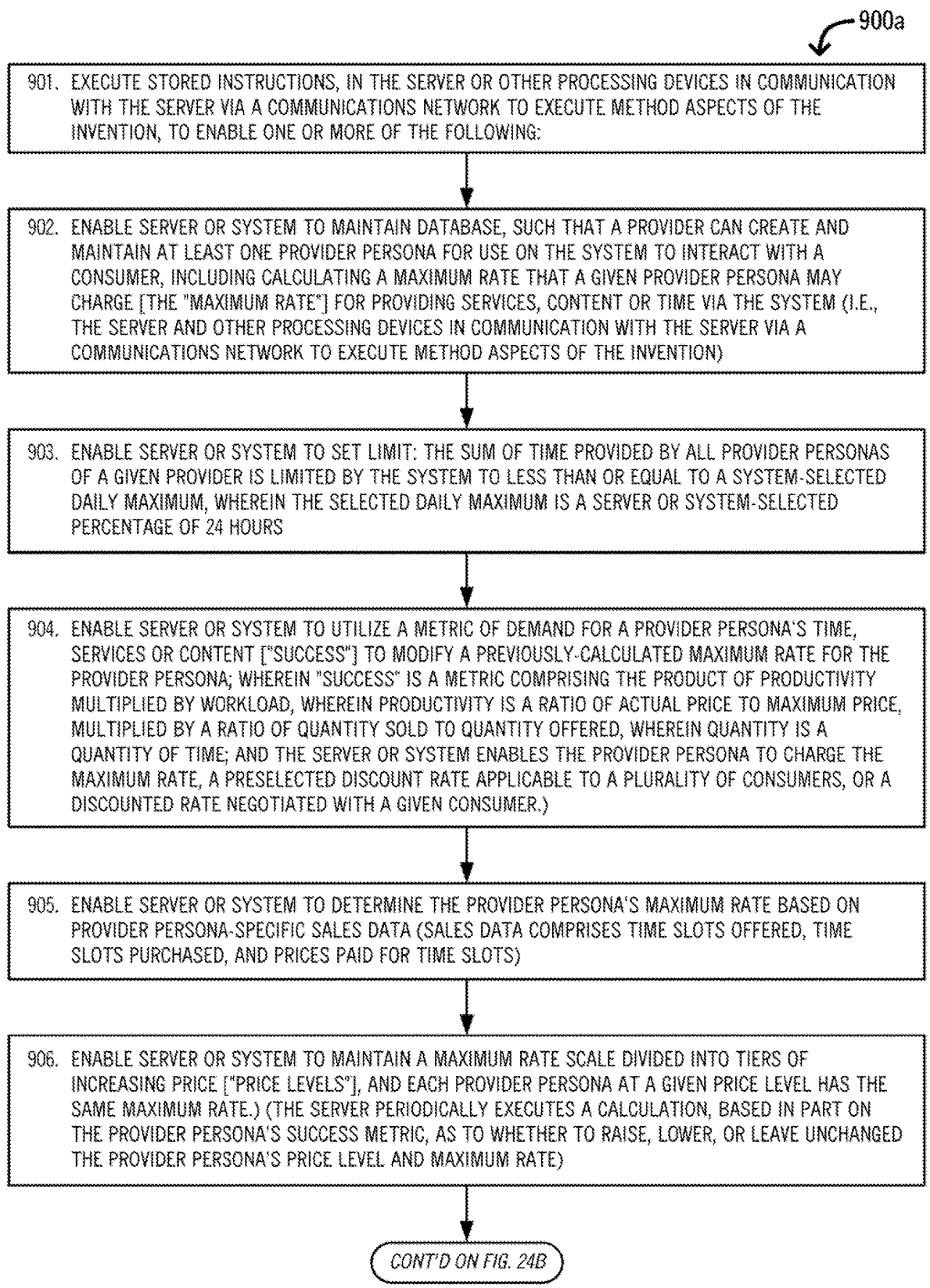
Figure 24C:
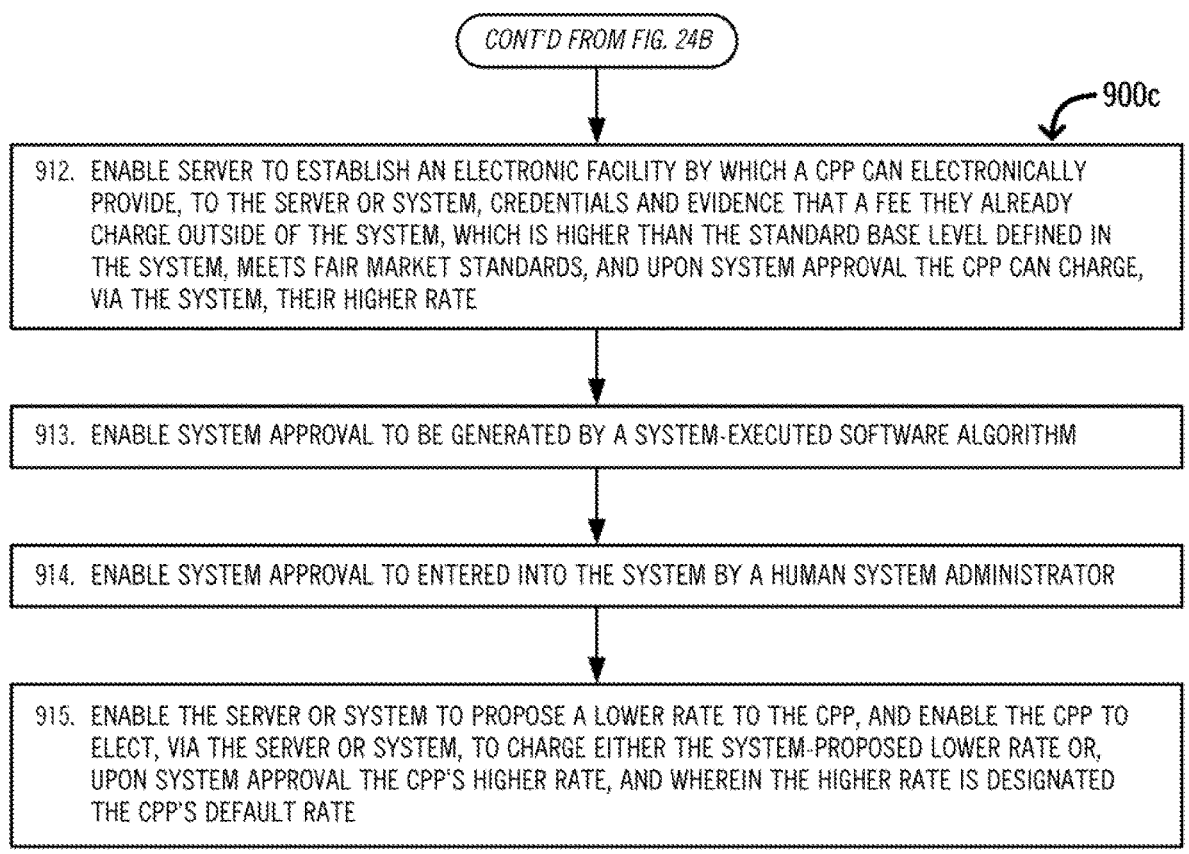

FIGS. 24A-C show a flowchart of a technique 900a-c, comprising the following:

901: Execute stored instructions, in the server or other processing devices in communication with the server via a communications network to execute method aspects of the invention, to enable one or more of the following:

902: Enable server or system to maintain database, such that a provider can create and maintain at least one provider persona for use on the system to interact with a consumer, including calculating a maximum rate that a given provider persona may charge (the "maximum rate") for providing services, content or time via the system (i.e., the server and other processing devices in communication with the server via a communications network to execute method aspects of the invention).

903: Enable server or system to set limit: the sum of time provided by all provider personas of a given provider is limited by the system to less than or equal to a system-selected daily maximum, wherein the selected daily maximum is a server or system-selected percentage of 24 hours.

904: Enable server or system to utilize a metric of demand for a provider persona's time, services or content ("success") to modify a previously-calculated maximum rate for the provider persona; wherein "success" is a metric comprising the product of productivity multiplied by workload, wherein productivity is a ratio of actual price to maximum price, multiplied by a ratio of quantity sold to quantity offered, wherein quantity is a quantity of time; and the server or system enables the provider persona to charge the maximum rate, a pre-selected discount rate applicable to a plurality of consumers, or a discounted rate negotiated with a given consumer.

905: Enable server or system to determine the provider persona's maximum rate based on provider persona-specific sales data (sales data comprises time slots offered, time slots purchased, and prices paid for time slots).

906: Enable server or system to maintain a maximum rate scale divided into tiers of increasing price ("price levels"), and each provider persona at a given price level has the same maximum rate. (The server periodically executes a calculation, based in part on the provider persona's success metric, as to whether to raise, lower, or leave unchanged the provider persona's price level and maximum rate.)

907: Enable server or system to increase or decrease the case or difficulty of earning a higher price level, to maintain a selected target distribution of price levels of provider personas within the system.

908: Enable server or system to establish an initial fee announced to be charged by a provider persona, via the system, and publish that provider persona's initial price level within the system. (Adjacent price levels define a price range of a given price level, which is bounded by the maximum rate of the given price level and the maximum rate of the price level below the given price level.)

909: Enable server or system to execute the following:
(A) the server or system publishes price information for provider personas;
(B) server enables new provider persona to select, via the system, his initial price level and an initial published price within the price range corresponding to the selected initial price level;
(C) the server designates the new provider persona's selected initial price level, associated maximum rate and initial published price as "tentative";
(D) the server, after selected observation and adjustment, designates the provider persona's maximum rate as "established" at a price level where the provider persona's observed success is at or above a system-selected minimum value; and
(E) thereafter, the server publishes the established maximum rate for the provider persona, and subsequently that rate can only be changed by the server or system.

910: Enable server or system to define categories of provider personas, and wherein a provider persona can charge, via the system, an initial fee that corresponds to a defined base level defined by the system for providers of that category, or a higher, tentative fee during an initial probation period.

911: Enable server or system to establish categories of certified professional providers (CPPs), and a CPP of a given category can charge, via the system, an initial fee that is the standard base level defined in the system for CPPs of that category.

912: Enable server to establish an electronic facility by which a CPP can electronically provide, to the server or system, credentials and evidence that a fee they already charge outside of the system, which is higher than the standard base level defined in the system, meets fair market standards, and upon system approval the CPP can charge, via the system, their higher rate.

913: Enable system approval to be generated by a system-executed software algorithm.

914: Enable system approval to entered into the system by a human system administrator.

915: Enable the server or system to propose a lower rate to the CPP, and enable the CPP to elect, via the server or system, to charge either the system-proposed lower rate or, upon system approval the CPP's higher rate, and wherein the higher rate is designated the CPP's default rate.

Figure 25:
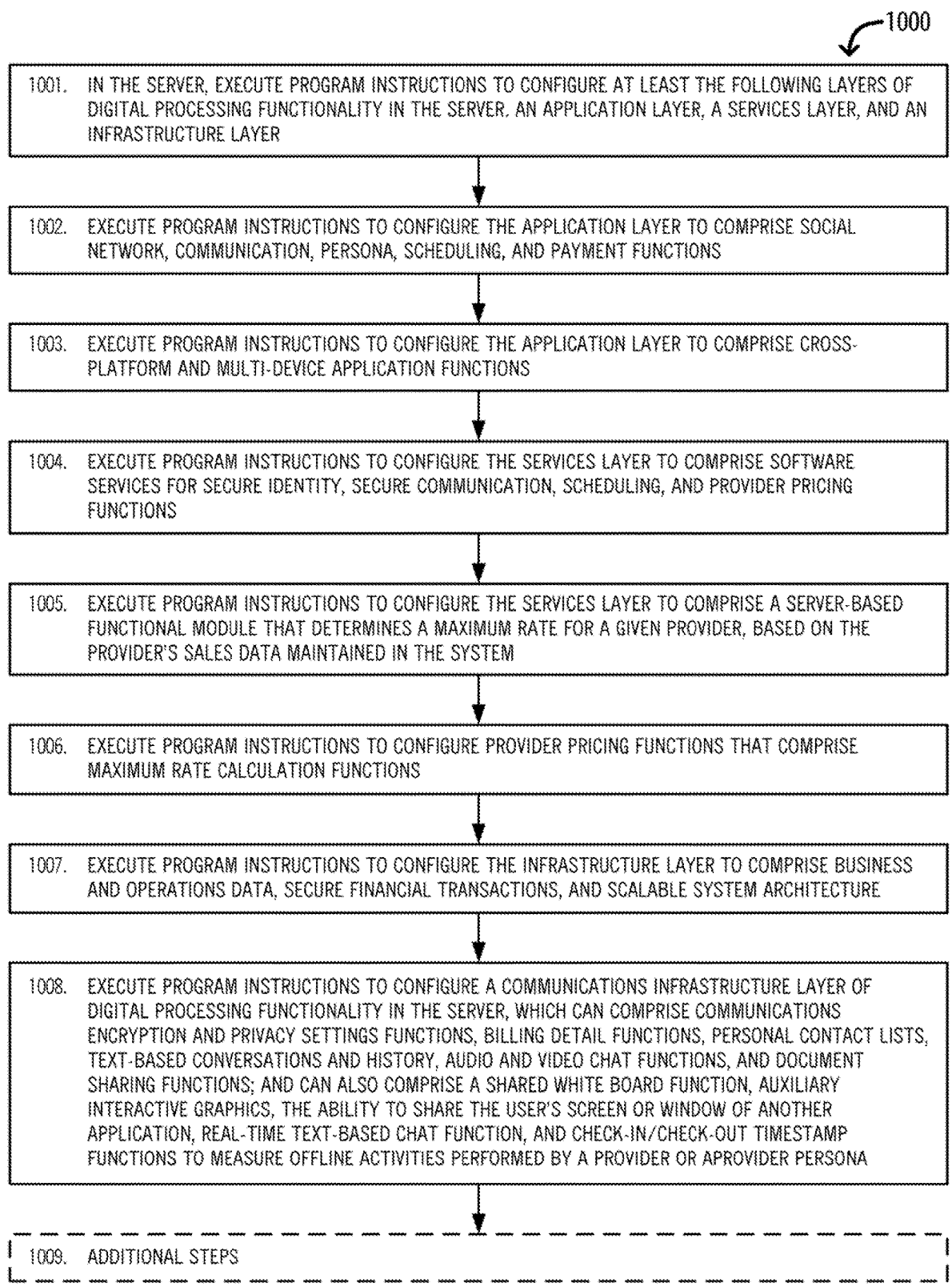

FIG. 25 is a flowchart of a technique 100, comprising the following:

1001: In the server, execute program instructions to configure at least the following layers of digital processing functionality in the server: an application layer, a services layer, and an infrastructure layer.

1002: Execute program instructions to configure the application layer to comprise social network, communication, persona, scheduling, and payment functions.

1003: Execute program instructions to configure the application layer to comprise cross-platform and multi-device application functions.

1004: Execute program instructions to configure the services layer to comprise software services for secure identity, secure communication, scheduling, and provider pricing functions.

1005: Execute program instructions to configure the services layer to comprise a server-based functional module that determines a maximum rate for a given provider, based on the provider's sales data maintained in the system.

1006: Execute program instructions to configure provider pricing functions that comprise maximum rate calculation functions.

1007: Execute program instructions to configure the infrastructure layer to comprise business and operations data, secure financial transactions, and scalable system architecture.

1008: Execute program instructions to configure a communications infrastructure layer of digital processing functionality in the server, which can comprise communications encryption and privacy settings functions, billing detail functions, personal contact lists, text-based conversations and history, audio and video chat functions, and document sharing functions; and can also comprise a shared white board function, auxiliary interactive graphics, the ability to share the user's screen or window of another application, real-time text-based chat function, and check-in/check-out timestamp functions to measure offline activities performed by a provider or a provider persona.

Figure 26:
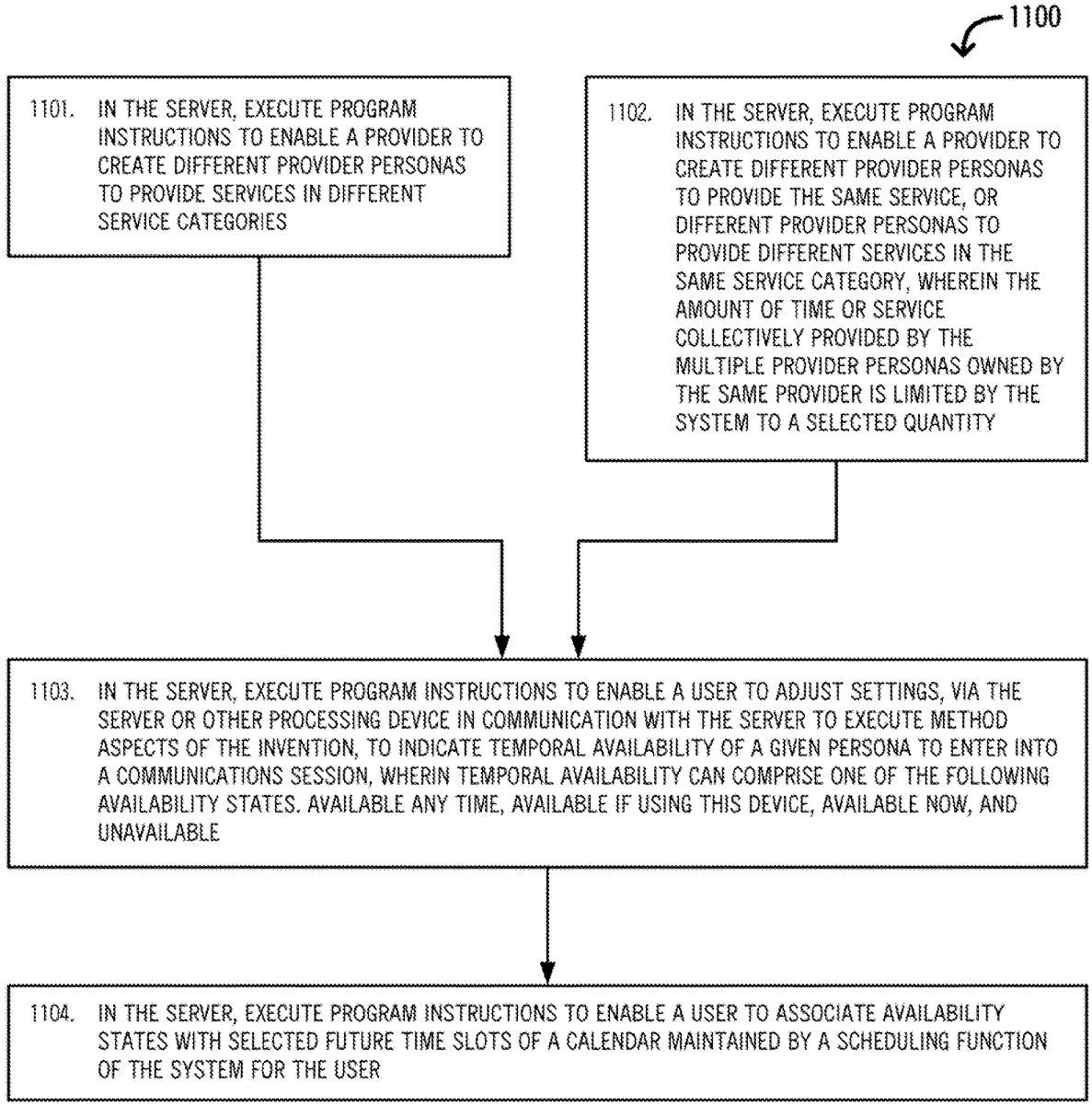

FIG. 26 is a diagram of a technique 1100, comprising:

1101: In the server, execute program instructions to enable a provider to create different provider personas to provide services in different service categories.

1102: In the server, execute program instructions to enable a provider to create different provider personas to provide the same service, or different provider personas to provide different services in the same service category, wherein the amount of time or service collectively provided by the multiple provider personas owned by the same provider is limited by the system to a selected quantity.

1103: In the server, execute program instructions to enable a user to adjust settings, via the server or other processing device in communication with the server to execute method aspects of the invention, to indicate temporal availability of a given persona to enter into a communications session, wherein temporal availability can comprise one of the following availability states: available any time, available if using this device, available now, and unavailable.

1104: In the server, execute program instructions to enable a user to associate availability states with selected future time slots of a calendar maintained by a scheduling function of the system for the user.

Figure 27:
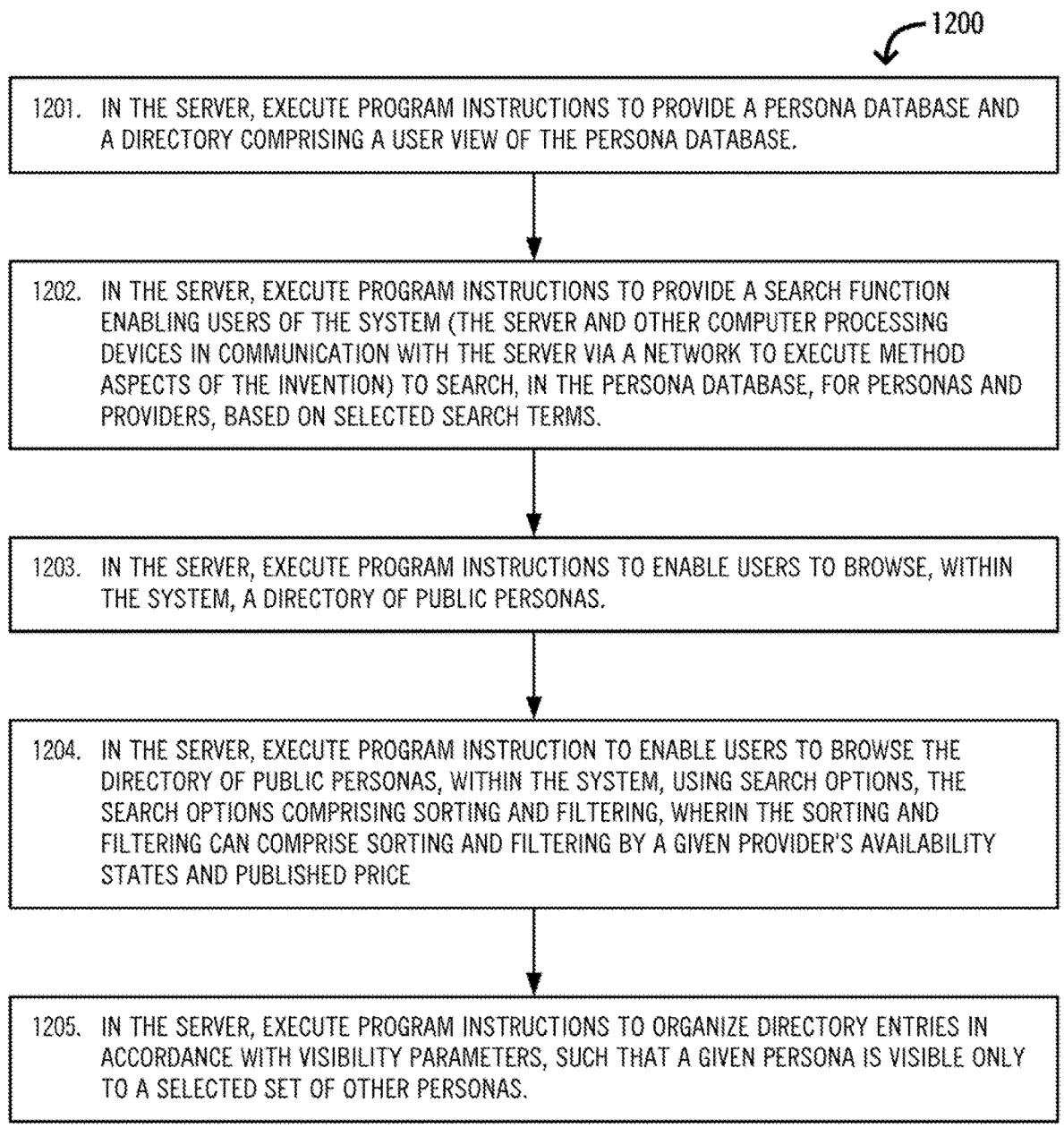

FIG. 27 is a flowchart of a technique 1200, comprising:

1201: In the server, execute program instructions to provide a persona database and a directory comprising a user view of the persona database.

1202: In the server, execute program instructions to provide a search function enabling users of the system (the server and other computer processing devices in communication with the server via a network to execute method aspects of the invention) to search, in the persona database, for personas and providers, based on selected search terms.

1203: In the server, execute program instructions to enable users to browse, within the system, a directory of public personas.

1204: In the server, execute program instruction to enable users to browse the directory of public personas, within the system, using search options, the search options comprising sorting and filtering, wherein the sorting and filtering can comprise sorting and filtering by a given provider's availability states and published price.

1205: In the server, execute program instructions to organize directory entries in accordance with visibility parameters, such that a given persona is visible only to a selected set of other personas.

FIG. 28 is a flowchart of a technique 1300, comprising the following:

1301: In the server, execute program instructions to enable a user of the server or system (the server and other computer processing devices in communication with the server via a communications network to execute method aspects of the invention) to create a user persona, wherein blocks of a given user persona's time can be made graphically visible to other user personas on a public calendar section of a system scheduling calendar, while other blocks of a given user persona's time can be kept private.

1302: In the server, execute program instructions to enable setting of selected priority levels for different blocks of available time in the system scheduling calendar for a given user persona, wherein the priority level indicates which blocks of time the user persona prefers to be booked first

1303: In the server, execute program instructions to enable a given user to elect to have a given persona owned by the given user be either listed or unlisted

1304: in the server, execute program instructions to enable a persona to be designated anonymous, wherein an anonymous persona does not indicate the persona owner's real-world identity

1305: In the server, execute program instructions to enable a user who owns an unlisted persona to elect to reveal the persona to selected other personas.

1306: In the server, execute program instructions to enable a listed or unlisted persona owner to selectively permit or block visibility of the owned persona to any other designated personas

1307: In the server, execute program instructions to enable the owner of an unlisted persona on the system to permit visibility of the owned persona to other personas in a specified range of price levels below and up to a price level of the owned persona

1308: In the server, execute program instructions so that visibility of a persona in a higher price level can be enabled for a persona of lower price level if the persona of lower price level purchases a selected amount of credit for services, content or time of the higher price level persona.

Figure 29:
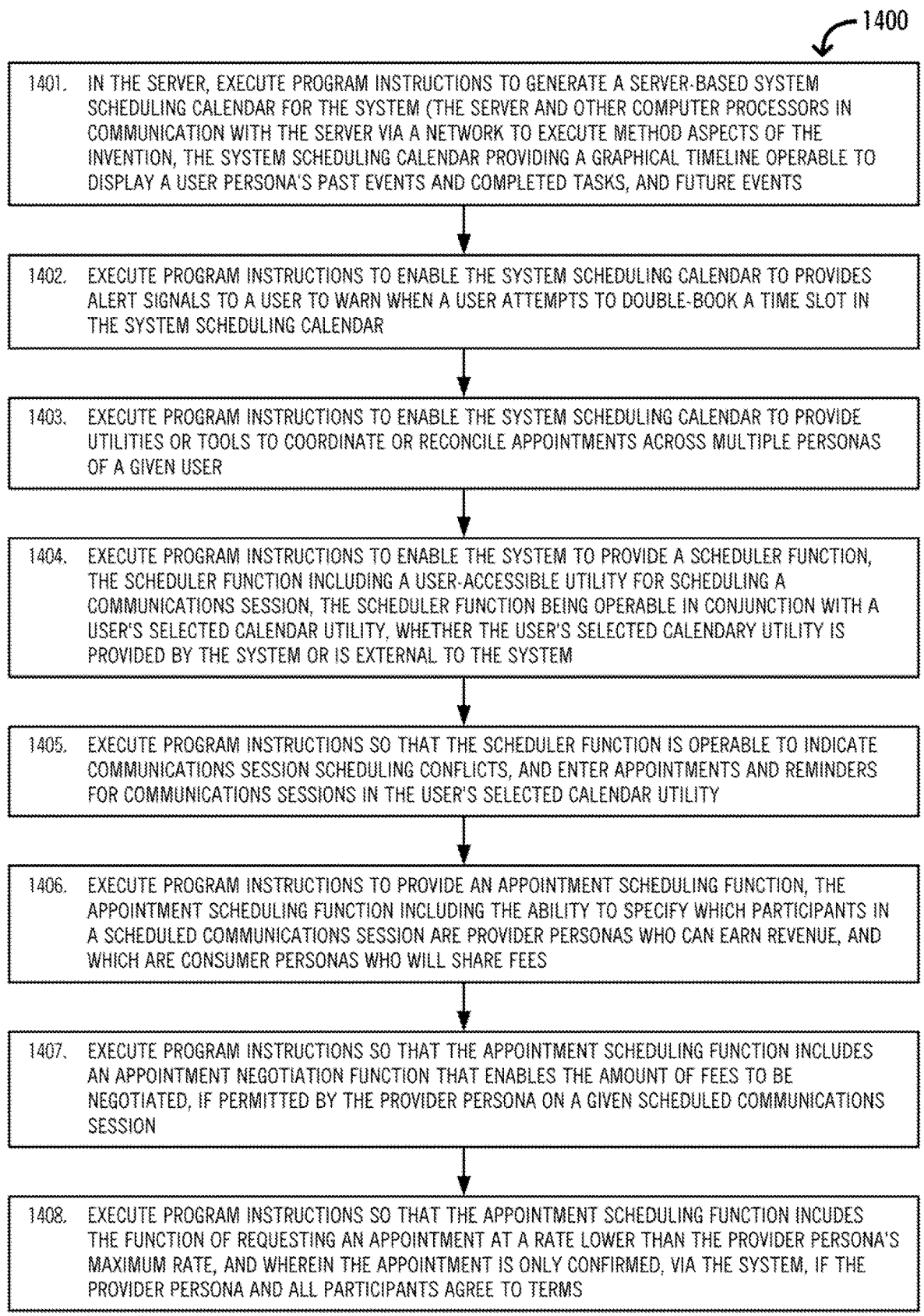

1309. In the server, execute program instructions so that references to an unlisted persona on the system are blanked or otherwise obscured to any persona without permission to view the unlisted persona FIG. 29 is a flowchart of a technique 1400, comprising the following:

1401: In the server, execute program instructions to generate a server-based system scheduling calendar for the system (the server and other computer processors in communication with the server via a network to execute method aspects of the invention, the system scheduling calendar providing a graphical timeline operable to display a user persona's past events and completed tasks, and future events.

1402: Execute program instructions to enable the system scheduling calendar to provides alert signals to a user to warn when a user attempts to double-book a time slot in the system scheduling calendar.

1403: Execute program instructions to enable the system scheduling calendar to provide utilities or tools to coordinate or reconcile appointments across multiple personas of a given user.

1404: Execute program instructions to enable the system to provide a scheduler function, the scheduler function including a user-accessible utility for scheduling a communications session, the scheduler function being operable in conjunction with a user's selected calendar utility, whether the user's selected calendar utility is provided by the system or is external to the system.

1405: Execute program instructions so that the scheduler function is operable to indicate communications session scheduling conflicts, and enter appointments and reminders for communications sessions in the user's selected calendar utility.

1406: Execute program instructions to provide an appointment scheduling function, the appointment scheduling function including the ability to specify which participants in a scheduled communications session are provider personas who can earn revenue, and which are consumer personas who will sham fees.

1407: Execute program instructions so that the appointment scheduling function includes an appointment negotiation function that enables the amount of fees to be negotiated, if permitted by the provider persona on a given scheduled communications session.

1408: Execute program instructions so that the appointment scheduling function includes the function of requesting an appointment at a rate lower than the provider persona's maximum rate, and wherein the appointment is only confirmed, via the system, if the provider persona and all participants agree to terms.

Figure 30:
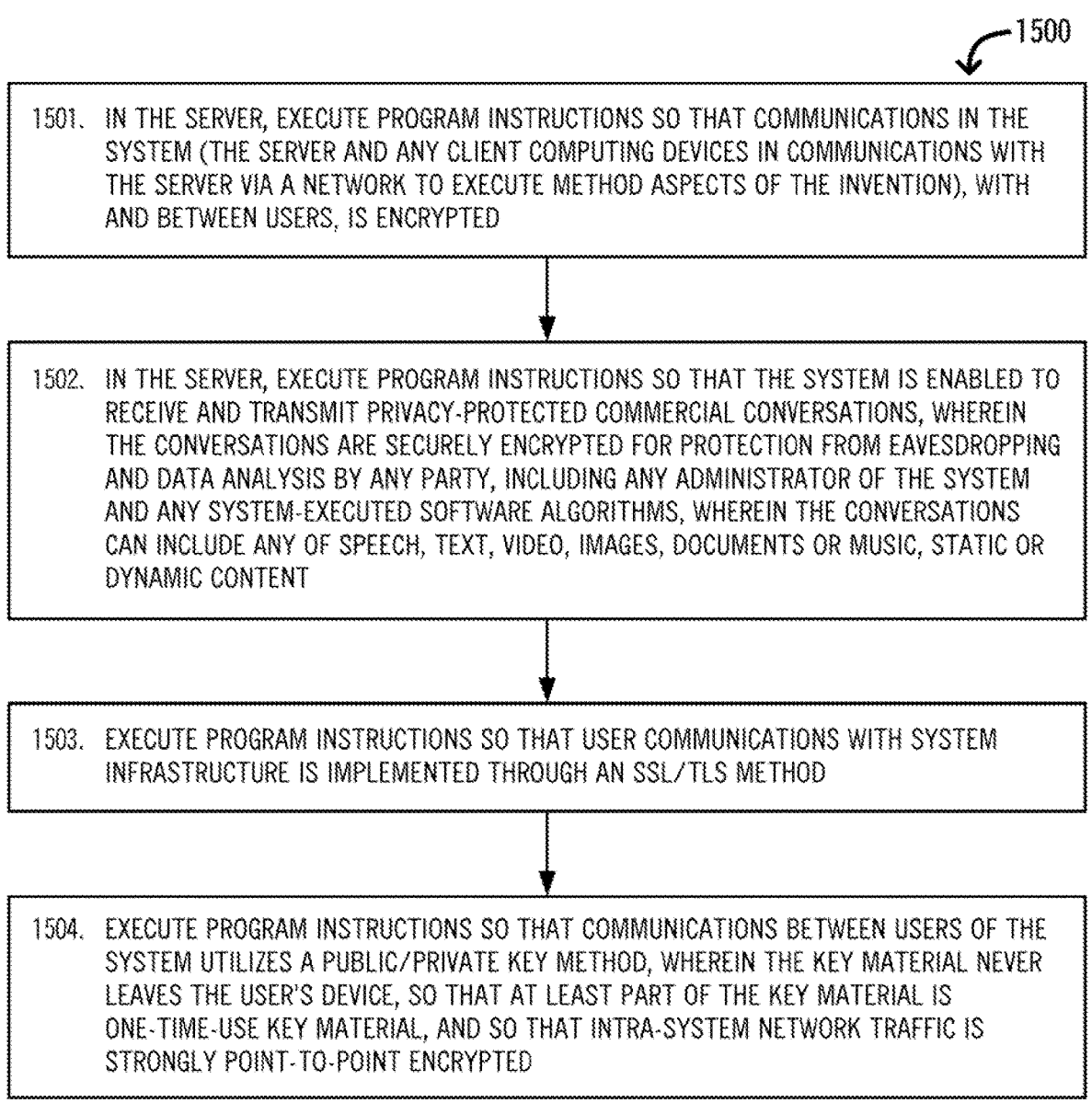

FIG. 30 is a flowchart of a technique 1500, comprising the following:

1501: In the server, execute program instructions so that communications in the system (the server and any client computing devices in communications with the server via a network to execute method aspects of the invention), with and between users, is encrypted.

1502: In the server, execute program instructions so that the system is enabled to receive and transmit privacy-protected commercial conversations, wherein the conversations are securely encrypted for protection from eavesdropping and data analysis by any party, including any administrator of the system and any system-executed software algorithms, wherein the conversations can include any of speech, text, video, images, documents or music, static or dynamic content.

1503: Execute program instructions so that user communications with system infrastructure is implemented through an SSL/TLS method.

1504: Execute program instructions so that communications between users of the system utilizes a public/private key method, wherein the key material never leaves the user's device, so that at least part of the key material is one-time-use key material, and so that intra-system network traffic is strongly point-to-point encrypted.

Figure 31A:
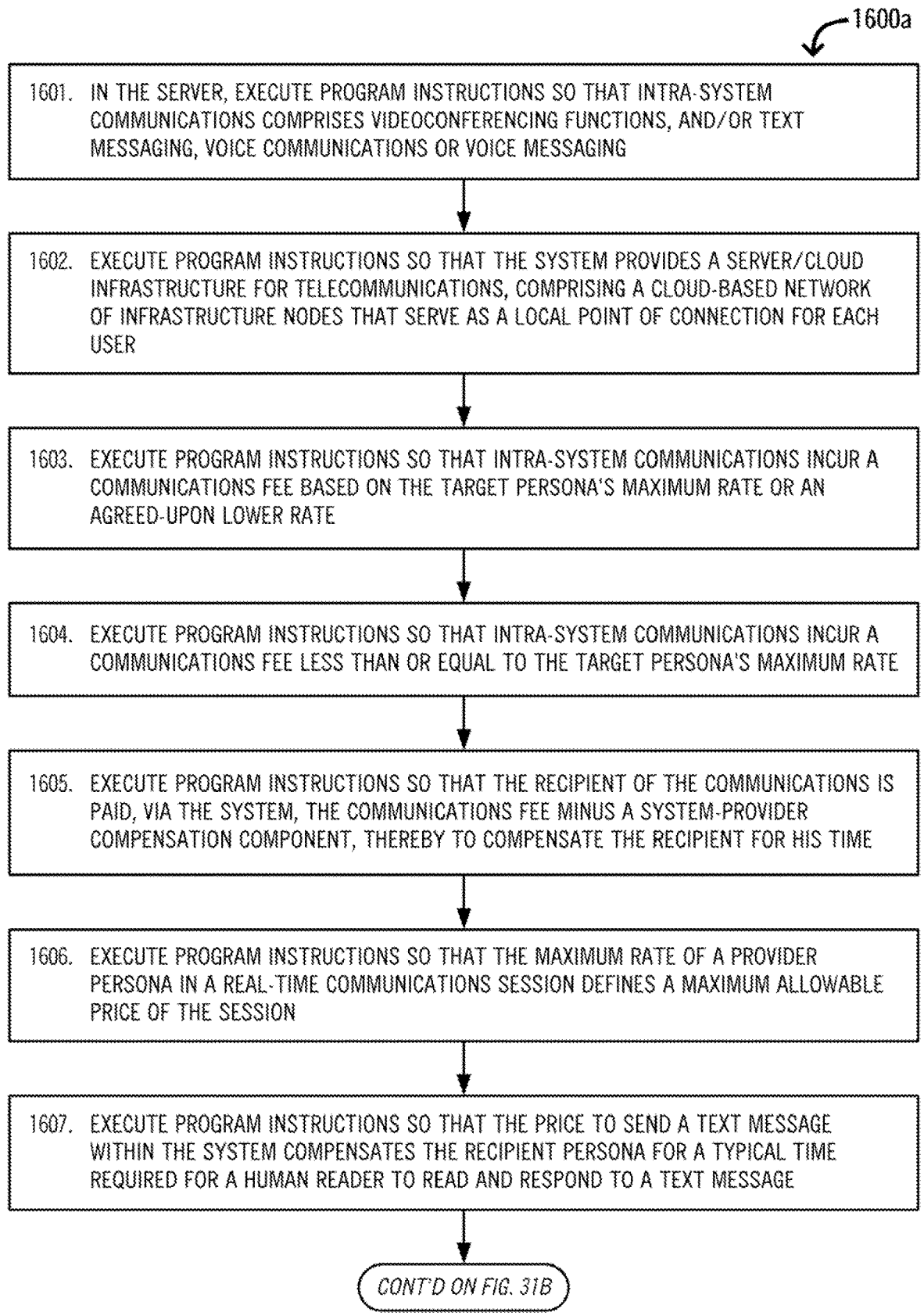
Figure 31B:
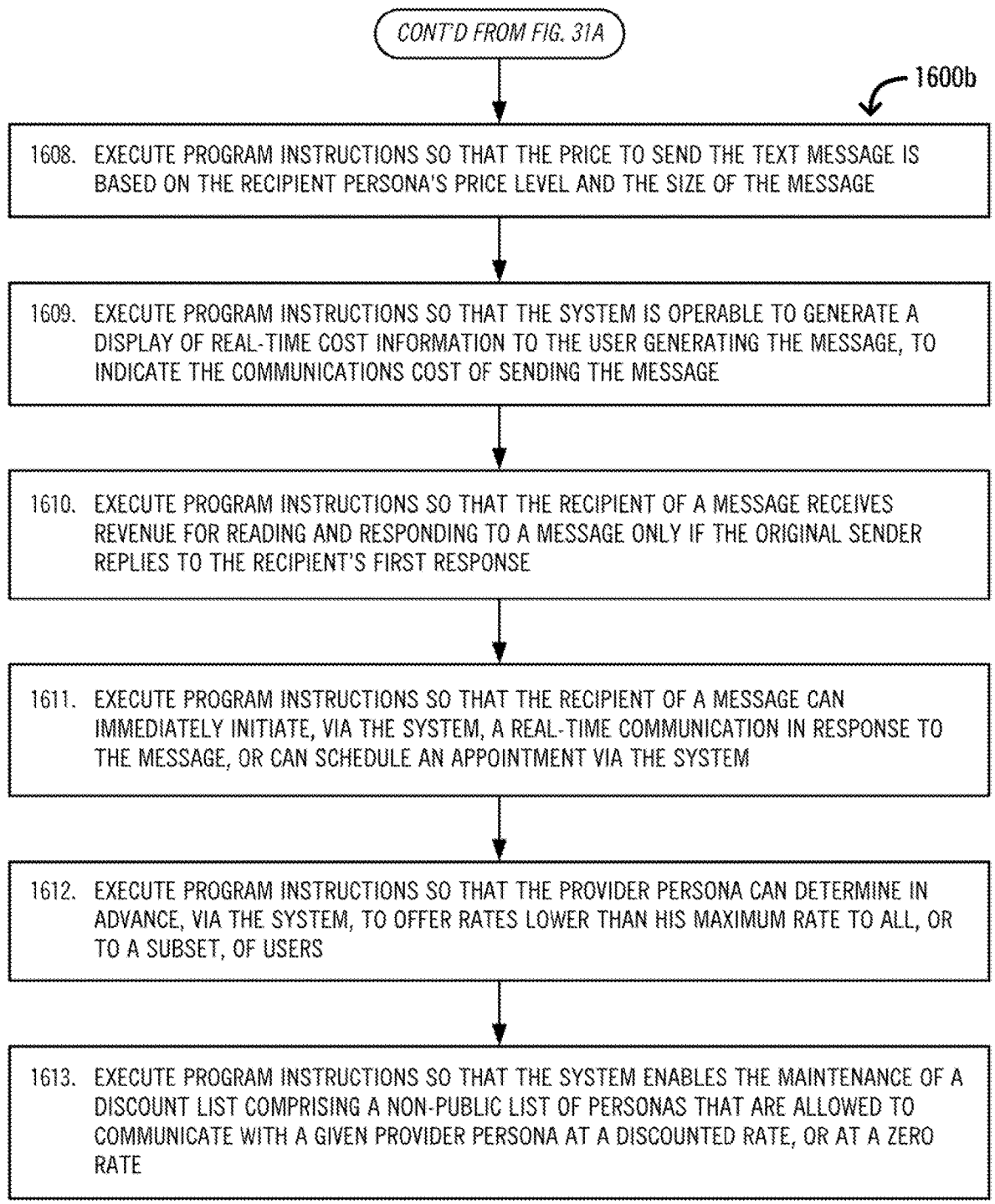

FIGS. 31A-B show a diagram of a technique 1600a-b, comprising the following:

1601: In the server, execute program instructions so that intra-system communications comprise videoconferencing functions, and/or text messaging, voice communications or voice messaging.

1602: Execute program instructions so that the system provides a server/cloud infrastructure for telecommunications, comprising a cloud-based network of infrastructure nodes that serve as a local point of connection for each user.

1603: Execute program instructions so that intra-system communications incur a communications fee based on the target persona's maximum rate or an agreed-upon lower rate.

1604: Execute program instructions so that intra-system communications incur a communications fee less than or equal to the target persona's maximum rate.

1605: Execute program instructions so that the recipient of the communications is paid, via the system, the communications fee minus a system-provider compensation component, thereby to compensate the recipient for his time.

1606: Execute program instructions so that the maximum rate of a provider persona in a real-time communications session defines a maximum allowable price of the session.

1607: Execute program instructions so that the price to send a text message within the system compensates the recipient persona for a typical time required for a human reader to read and respond to a text message.

1608: Execute program instructions so that the price to send the text message is based on the recipient persona's price level and the size of the message.

1609: Execute program instructions so that the system is operable to generate a display of real-time cost information to the user generating the message, to indicate the communications cost of sending the message.

1610: Execute program instructions so that the recipient of a message receives revenue for reading and responding to a message only if the original sender replies to the recipient's first response.

1611: Execute program instructions so that the recipient of a message can immediately initiate, via the system, a real-time communication in response to the message, or can schedule an appointment via the system.

1612: Execute program instructions so that the provider persona can determine in advance, via the system, to offer rates lower than his maximum rate to all, or to a subset, of users.

1613: Execute program instructions so that the system enables the maintenance of a discount list comprising a non-public list of personas that are allowed to communicate with a given provider persona at a discounted rate, or at a zero rate.

Figure 32:
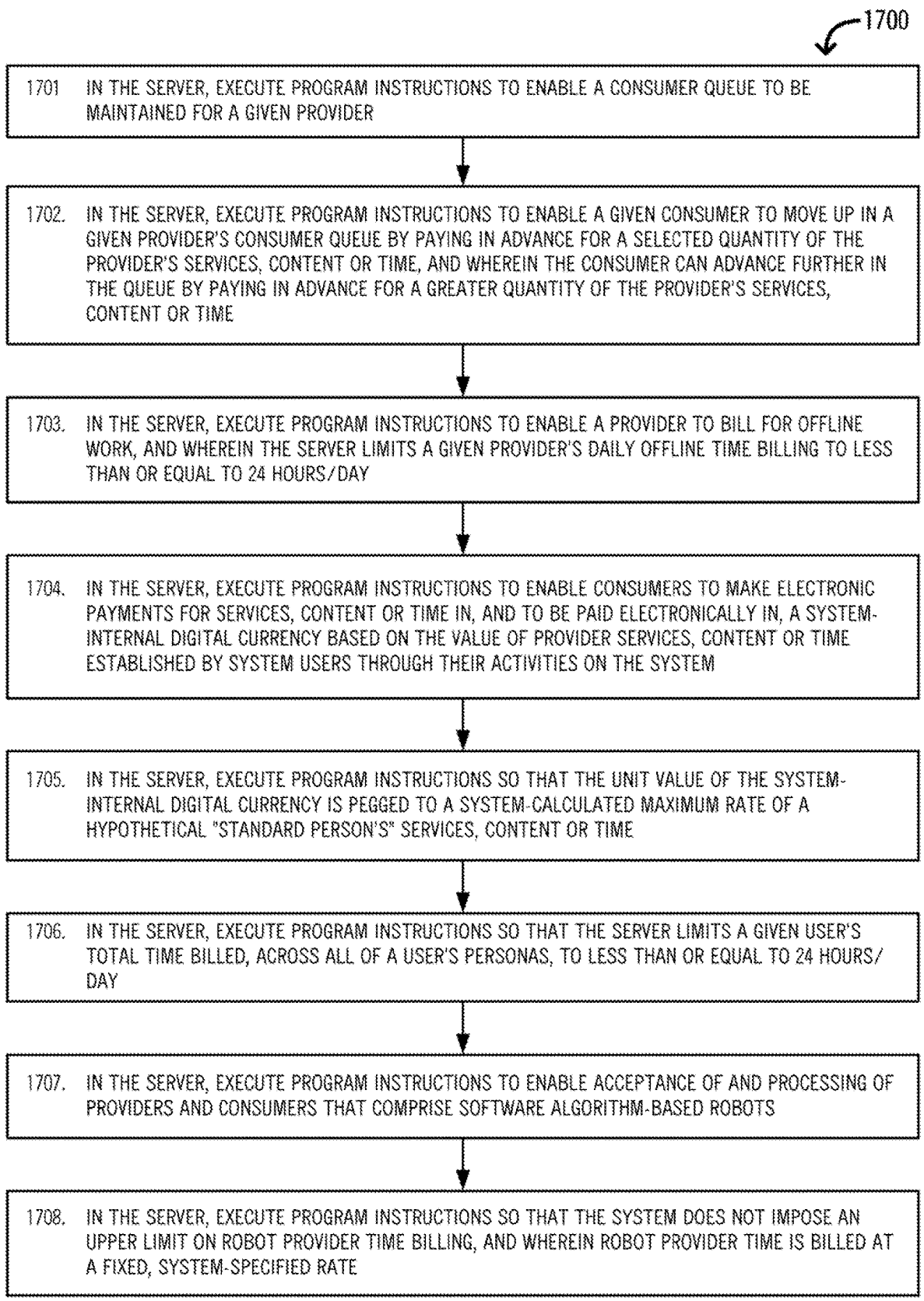

FIG. 32 is a flowchart of a technique 1700, comprising the following:

1701: In the server, execute program instructions to enable a consumer queue to be maintained for a given provider.

1702: In the server, execute program instructions to enable a given consumer to move up in a given provider's consumer queue by paying in advance for a selected quantity of the provider's services, content or time, and wherein the consumer can advance further in the queue by paying in advance for a greater quantity of the provider's services, content or time.

1703: In the server, execute program instructions to enable a provider to bill for offline work, and wherein the server limits a given provider's daily offline time billing to less than or equal to 24 hours/day.

1704: In the server, execute program instructions to enable consumers to make electronic payments for services, content or time in, and to be paid electronically in, a system-internal digital currency based on the value of provider services, content or time established by system users through their activities on the system.

1705: In the server, execute program instructions so that the unit value of the system-internal digital currency is pegged to a system-calculated maximum rate of a hypothetical "standard person's" services, content or time.

1706: In the server, execute program instructions so that the server limits a given user's total time billed, across all of a user's personas, to less than or equal to 24 hours/day.

1707: In the server, execute program instructions to enable acceptance of and processing of providers and consumers that comprise software algorithm-based robots.

1708: In the server, execute program instructions so that the system does not impose an upper limit on robot provider time billing, and wherein robot provider time is billed at a fixed, system-specified rate.

Figure 33:
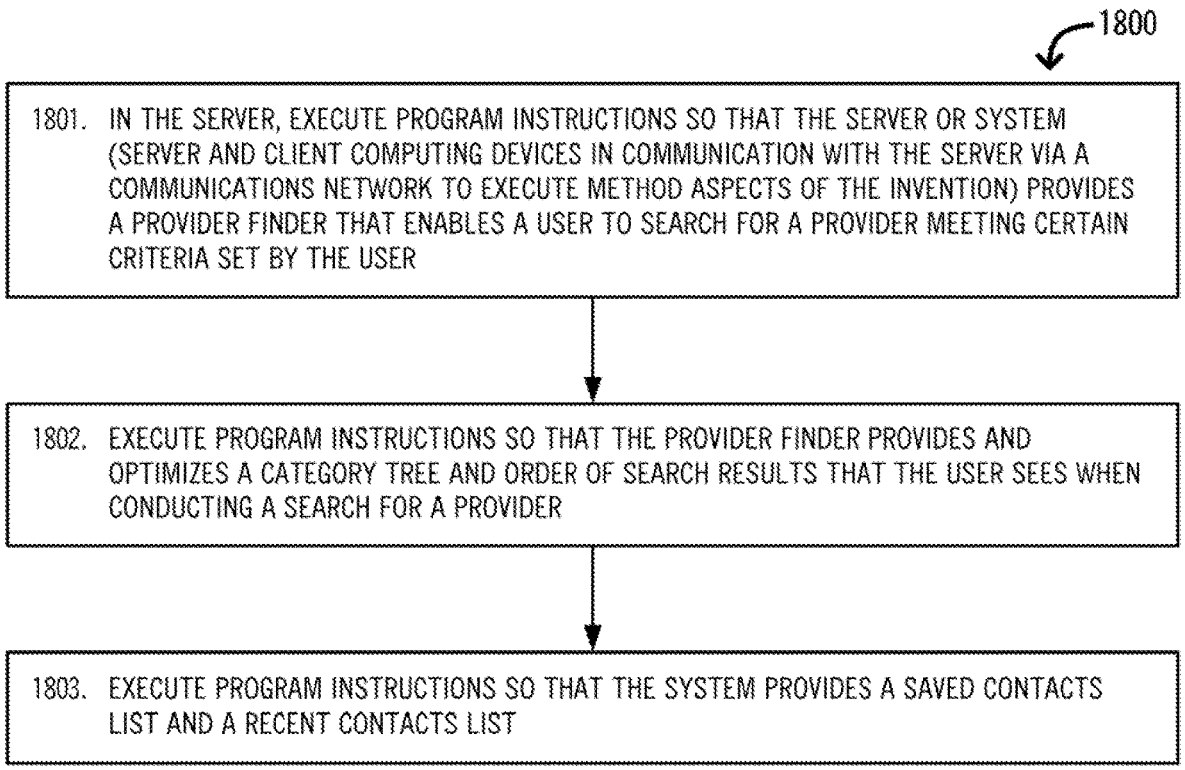

FIG. 33 is a flowchart of a technique 1800, comprising the following:

1801: In the server, execute program instructions so that the server or system (e.g., the server and client computing devices in communication with the server via a communications network to execute method aspects of the invention) provides a provider finder that enables a user to search for a provider meeting certain criteria set by the user.

1802: Execute program instructions so that the provider finder provides and optimizes a category tree and order of search results that the user sees when conducting a search for a provider.

1803: Execute program instructions so that the system provides a saved contacts list and a recent contacts list.

Figure 34:
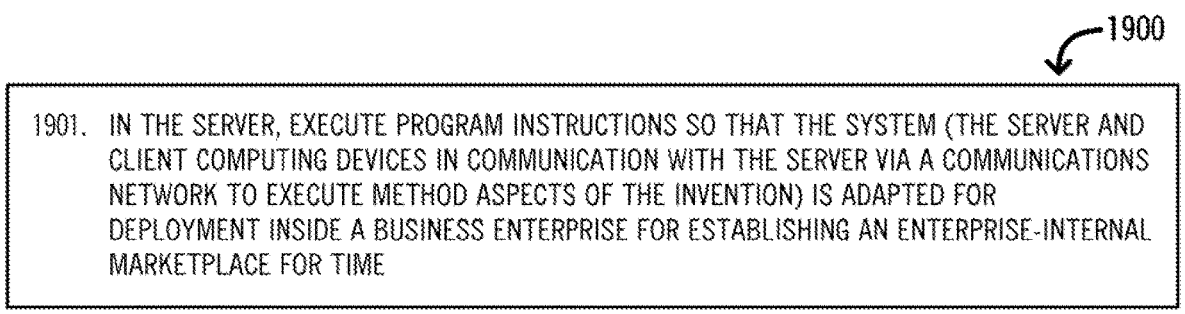

FIG. 34 is a flowchart of a technique 1900, comprising:
1901: In the server, execute program instructions so that the system (the server and client computing devices in communication with the server via a communications network to execute method aspects of the invention) is adapted for deployment inside a business enterprise for establishing an enterprise-internal marketplace for time.

Figure 35:
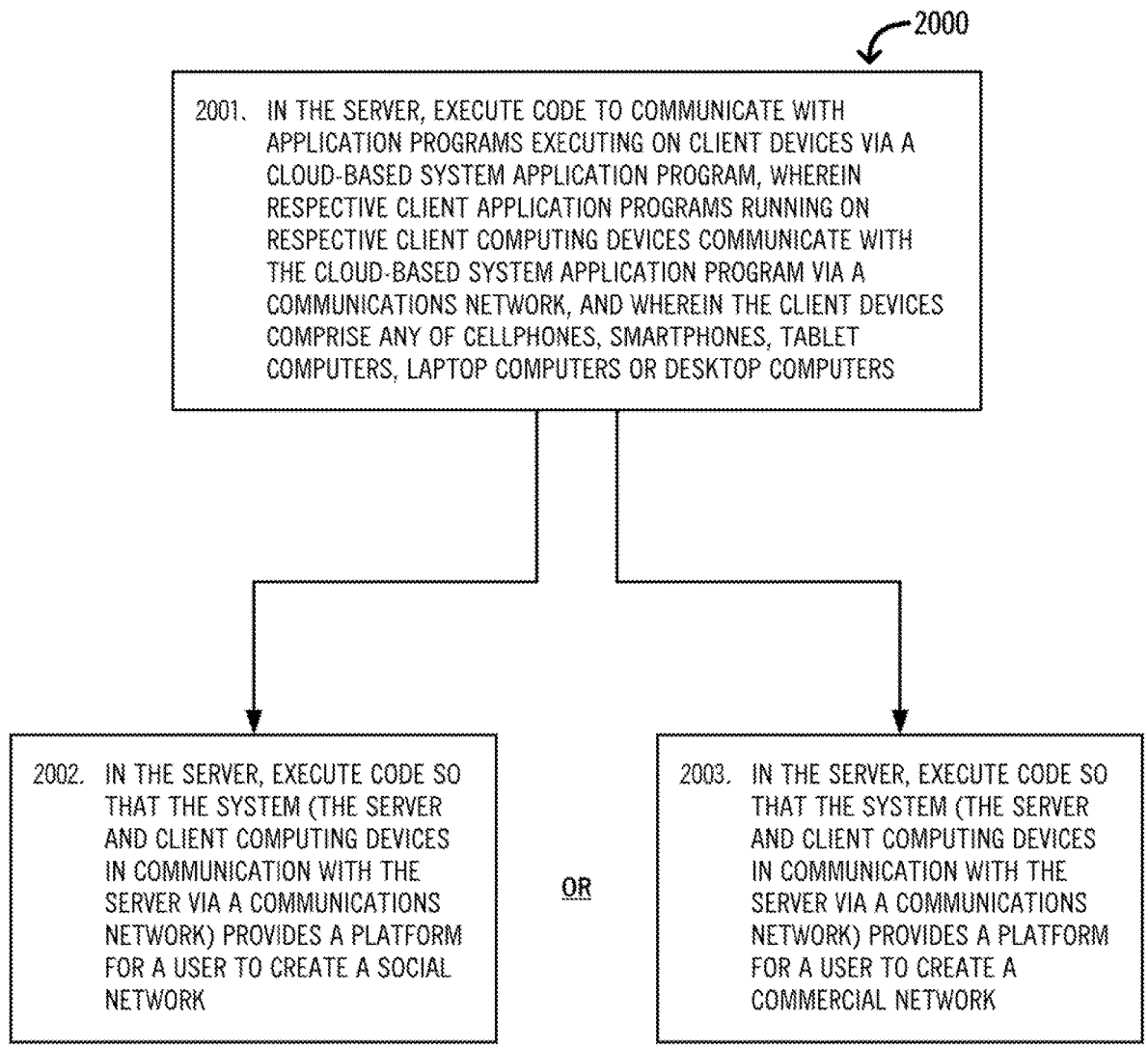

FIG. 35 is a flowchart of a technique 2000, comprising the following: 2001: In the server, execute code to communicate with application programs ("apps") executing on client devices via a cloud-based system application program, wherein respective client application programs running on respective client computing devices communicate with the cloud-based system application program via a communications network, and wherein the client devices comprise any of cellphones, smartphones, tablet computers, laptop computers or desktop computers.

2002: In the server, execute code so that the system (e.g., the server and client computing devices in communication with the server via a communications network) provides a platform for a user to create a social network.

Or:

2003: In the server, execute code so that the system (e.g., the server and client computing devices in communication with the server via a communications network) provides a platform for a user to create a commercial network.

CONCLUSION

While the foregoing description and the accompanying drawing figures provide details that will enable those skilled in the art to practice aspects of the invention, it should be recognized that the description is illustrative in nature and that many modifications and variations thereof will be apparent to those skilled in the art having the benefit of these teachings. It is accordingly intended that the invention herein be defined solely by any claims that may be appended hereto and that the invention be interpreted as broadly as permitted by the prior art.

I claim:

1. A digital server-based system for implementing a marketplace for online services, wherein a digital communications session is deliverable, via a digital server, from a provider to a consumer, for selling a quantity of the provider's time to the consumer and for financially compensating the provider for the value of the time sold, the system comprising:
 (A) a digital server accessible to a plurality of users through respective client application programs executing on respective client devices capable of digital communications with the server via a digital communications network, the server comprising at least a first digital processor; and
 (B) a digital storage element accessible to the digital server and storing digital computer-readable instructions executable by the server, which when executed by the server enable the system to:
 (1) match, in the server, a system user who offers to provide his time ("Provider") with a system user who wishes to buy the Provider's time ("Consumer");
 (2) calculate, in the server, a market price for the time of the Provider, the market price being based at least in part on a metric of demand for the Provider's time;
 (3) receive a digital indication, at the server, of the Consumer's request to purchase the Provider's time at the calculated market price;
 (4) arrange for payment from the Consumer to the Provider, via the server, for the Provider's time purchased by the Consumer at the calculated market price; and
 (5) deliver, via the server, a digital communications session having a duration corresponding to the amount of the Provider's time purchased by the Consumer, from the Provider to the Consumer, the digital communications session comprising a user-perceptible visual display of session-related information capable of being displayed to a user on a display element, and the price of the Provider's time being at least in part a function of the metric of demand for the Provider's time, wherein:
 (a) the system is organized into functional digital processing layers comprising at least an Application Layer and a Communications Infrastructure Layer;
 (b) the Application Layer comprises social network, communication, Persona, scheduling, and payment handling functions;
 (c) the Communications Infrastructure Layer comprises communications encryption and privacy settings functions, billing detail functions, personal contact lists, text-based conversations and history, audio and video chat functions, and document sharing functions;
 (d) system communications with and between users is encrypted, and communications between users of the system utilizes a public/private key method, wherein the key material never leaves the user's device, and at least part of the key material is one-time-use key material;
 (e) user communications with system infrastructure is implemented through an SSL/TLS method;
 (f) intra-system network traffic is strongly point-to-point encrypted, and intra-system communications comprise any of: videoconferencing functions, text messaging, voice communications or voice messaging;
 (g) the system provides a server/cloud infrastructure for telecommunications, comprising a cloud-based network of infrastructure nodes that serve as a local point of connection for each user:
 (h) the respective client application programs communicate with a cloud-based system application program; and
 (i) the digital server and the digital storage element are collectively operable to deliver to the Consumer the communications session having a duration corresponding to the amount of the Provider's time purchased by the Consumer, the price of the Provider's time being at least in part a function of the metric of demand for the Provider's time.

2. The system of claim 1, wherein the system is operable to carry privacy-protected conversations, the privacy-protected conversations being securely encrypted for protection from eavesdropping and data analysis by any entity, including any administrator of the system and any system-executed software algorithms.

3. The system of claim 1 wherein:
(A) the system enables a user to create and maintain a Persona for use on the system, wherein the Persona is a fictional identity associatable by the system with the user;
(B) user-to-user and Provider/Consumer communication across the system is executed through Personas;
(C) the Personas comprise Provider Personas and Consumer Personas; and
(D) the system enables a given user to elect to have the given user's Persona be any of: (1) anonymous, such that the Persona does not indicate the user's real-world identity; or (2) visible to (i) no other users of the system, (ii) a selected set of other users of the system, or (iii) all other users of the system.

4. The system of claim 1 wherein:
(A) communications carried on the system between users of the system are treated as chargeable communications that incur a monetary fee in the system; and
(B) the system enables a given user to designate selected other users, or groups of users, of the system, as Friends of the given user, and communications between designated, corresponding Friends are not treated as chargeable communications.

5. The system of claim 1 wherein:
(A) the system calculates a system revenue component based on a subscription fee charged by a system-providing entity to users of the system; and
(B) in a given transaction the system collects a monetary fee from the Consumer and pays the Provider the fee, less a system commission calculated by the system and payable to the system-providing entity.

6. The system of claim 1 wherein the system enables a real-time private conversation, via the system, between individual users, or between groups of users.

7. The system of claim 3 wherein the system enables a Provider to create and maintain at least one Provider Persona for use on the system to interact with a Consumer, and wherein the system calculates a Maximum Rate that a given Provider Persona may charge for providing time via the system.

8. The system of claim 7 wherein the sum of time provided by all Provider Personas of a given Provider is limited by the system to less than or equal to a system-selected Daily Maximum, wherein the selected Daily Maximum is a system-selected percentage of 24 hours.

9. The system of claim 1 wherein:
(A) the system enables a Consumer Queue to be maintained for a given Provider;
(B) a given Consumer can move up in a given Providers Consumer Queue by paying in advance for a selected quantity of the Provider's time; and
(C) the given Consumer can advance further in the given Provider's Consumer Queue by paying in advance for a greater quantity of the Provider's time.

10. The system of claim 1 wherein the system is adapted for deployment inside a business enterprise for establishing an enterprise-internal marketplace for time.

11. The system of claim 1 wherein the delivering of a communications session is on any of a one-to-one or one-to-many basis.

12. A method of implementing a marketplace for online services, wherein a digital communications session is deliverable, via a digital server, from a provider to a consumer, for selling a quantity of the provider's time to the consumer and for financially compensating the provider for the value of the time sold, the method comprising:
(A) providing a digital server accessible to a plurality of users through respective client application programs executing on respective client devices capable of digital communications with the server via a digital communications network, the server comprising at least a first digital processor; and
(B) providing a digital storage element accessible to the digital server and storing digital computer-readable instructions executable by the server, which when executed by the server enable the server to:
(1) match, in the server, a system user who offers to provide his time ("Provider") with a system user who wishes to buy the Provider's time ("Consumer");
(2) calculate, in the server, a market price for the time of the Provider, the market price being based at least in part on a metric of demand for the Provider's time;
(3) receive a digital indication, at the server, of the Consumer's request to purchase the Provider's time at the calculated market price;
(4) arrange for payment from the Consumer to the Provider, via the server, for the Provider's time purchased by the Consumer at the calculated market price; and
(5) deliver, via the server, a digital communications session having a duration corresponding to the amount of the Provider's time purchased by the Consumer, from the Provider to the Consumer, the digital communications session comprising a user-perceptible visual display of session-related information capable of being displayed to a user on a display element, and the price of the Provider's time being at least in part a function of the metric of demand for the Provider's time, wherein:
(a) server operations are organized into functional digital processing layers comprising at least an Application Layer and a Communications Infrastructure Layer;
(b) the Application Layer comprises social network, communication, Persona, scheduling, and payment handling functions;
(c) the Communications Infrastructure Layer comprises communications encryption and privacy settings functions, billing detail functions, personal contact lists, text-based conversations and history, audio and video chat functions, and document sharing functions;
(d) server communications with and between users is encrypted, and communications between users of the server utilizes a public/private key method, wherein the key material never leaves the user's device, and at least part of the key material is one-time-use key material;
(e) user communications with the server is implemented through an SSL/TLS method;
(f) intra-system network traffic is strongly point-to-point encrypted, and intra-system communications comprise any of: videoconferencing functions, text messaging, voice communications or voice messaging;
(g) the server provides a server/cloud infrastructure for telecommunications, comprising a cloud-based network of infrastructure nodes that serve as a local point of connection for each user;
(h) the respective client application programs communicate with a cloud-based system application program; and (i) the digital server and the digital storage element collectively operate to deliver to the Consumer the communications session having a duration corresponding to the amount of the Provider's time purchased by the Consumer, the price of the Provider's time being at least in part a function of the metric of demand for the Provider's time.

13. A computer program product comprising digital computer-executable program instructions stored in a non-transitory, tangible, computer-readable digital medium, the computer-readable digital medium being accessible by a digital server, the digital server comprising a computer processor and being accessible to a plurality of users through respective client application programs executing on respective client devices capable of communicating with the digital server via a digital communications network, the instructions being executable by the digital server, and which, when executed by the digital server, cause the digital server to:

(1) match, in the server, a system user who offers to provide his time ("Provider") with a system user who wishes to buy the Provider's time ("Consumer");

(2) calculate, in the server, a market price for the time of the Provider, the market price being based at least in part on a metric of demand for the Provider's time;

(3) receive a digital indication, at the server, of the Consumer's request to purchase the Provider's time at the calculated market price;

(4) arrange for payment from the Consumer to the Provider, via the server, for the Provider's time purchased by the Consumer at the calculated market price; and (5) deliver, via the server, a digital communications session having a duration corresponding to the amount of the Provider's time purchased by the Consumer, from the Provider to the Consumer, the digital communications session comprising a user-perceptible visual display of session-related information capable of being displayed to a user on a display element, and the price of the Provider's time being at least in part a function of the metric of demand for the Provider's time, wherein:

(a) server operations are organized into functional digital processing layers comprising at least an Application Layer and a Communications Infrastructure Layer;

(b) the Application Layer comprises social network, communication, Persona, scheduling, and payment handling functions;

(c) the Communications Infrastructure Layer comprises communications encryption and privacy settings functions, billing detail functions, personal contact lists, text-based conversations and history, audio and video chat functions, and document sharing functions;

(d) server communications with and between users is encrypted, and communications between users of the server utilizes a public/private key method, wherein the key material never leaves the user's device, and at least part of the key material is one-time-use key material;

(e) user communications with the server is implemented through an SSL/TLS method;

(f) intra-system network traffic is strongly point-to-point encrypted, and intra-system communications comprise any of: videoconferencing functions, text messaging, voice communications or voice messaging;

(g) the server provides a server/cloud infrastructure for telecommunications, comprising a cloud-based network of infrastructure nodes that serve as a local point of connection for each user;

(h) the respective client application programs communicate with a cloud-based system application program; and (i) the digital server and computer-readable digital medium collectively operate to deliver to the Consumer the communications session having a duration corresponding to the amount of the Provider's time purchased by the Consumer, the price of the Provider's time being at least in part a function of the metric of demand for the Provider's time.

* * * * *